(12) United States Patent
Barich et al.

(10) Patent No.: US 6,955,100 B1
(45) Date of Patent: Oct. 18, 2005

(54) METHOD AND ARRANGEMENT FOR INSPECTION AND REQUALIFICATION OF VEHICLES USED FOR TRANSPORTING COMMODITIES AND/OR HAZARDOUS MATERIALS

(75) Inventors: Daniel M. Barich, Frankfort, IL (US); Timothy Donahue, Wheaton, IL (US); Ade O. Audifferen, Simpsonville, SC (US)

(73) Assignee: General Electric Railcar Services Corporation, Chicago, IL (US)

( * ) Notice: Subject to any disclaimer, the term of this patent is extended or adjusted under 35 U.S.C. 154(b) by 362 days.

(21) Appl. No.: 09/672,793

(22) Filed: Sep. 29, 2000

Related U.S. Application Data
(60) Provisional application No. 60/157,058, filed on Oct. 1, 1999.

(51) Int. Cl.[7] ............................................. G01M 19/00
(52) U.S. Cl. ..................................................... 73/865.8
(58) Field of Search .......................... 73/865.8; 702/83, 702/84

(56) References Cited

U.S. PATENT DOCUMENTS

| | | | |
|---|---|---|---|
| 4,247,757 A | | 1/1981 | Crump, Jr. |
| 4,368,644 A | | 1/1983 | Wentzell et al. |
| 4,490,833 A | | 12/1984 | Inomata et al. |
| 4,658,649 A | | 4/1987 | Brook |
| 5,008,661 A | | 4/1991 | Raj |
| 5,036,707 A | | 8/1991 | Paciej et al. |
| 5,216,612 A | * | 6/1993 | Cornett et al. ............... 700/96 |
| 5,256,966 A | | 10/1993 | Edwards |
| 5,347,551 A | * | 9/1994 | Kervinen ..................... 376/248 |
| 5,536,353 A | * | 7/1996 | Fonseca ....................... 156/257 |
| 5,619,423 A | | 4/1997 | Scrantz |
| 5,631,831 A | | 5/1997 | Bird et al. |
| 5,648,619 A | | 7/1997 | Gustafsson et al. |
| 5,717,595 A | | 2/1998 | Charrington et al. |
| 5,856,931 A | * | 1/1999 | McCasland ................. 364/550 |
| 5,956,077 A | | 9/1999 | Qureshi et al. |
| 5,964,811 A | | 10/1999 | Ishii et al. |
| 6,052,631 A | | 4/2000 | Busch et al. |
| 6,070,111 A | | 5/2000 | Takakura et al. |
| 6,101,433 A | | 8/2000 | Flicker, Jr. |

OTHER PUBLICATIONS

AAR Rule 80, "Painting and Stencilling" from http://www.aidtrain.com/products/AIDTANKDemo/inspect/pages/002/rules.htm.*

Sandy Dunn, Integrating RCM with Effective Planning and Scheduling—Part 1, West Australian Optimising Maintenance Conference paper of May 14, 1999.*

AAR Memo dated Jun. 10, 1995, O&M Circular No. 1, Supplement No. 3, Tank Car Stub Sill Inspection Program, CPC-1047.

AAR Memo dated Oct. 18, 1996, Casualty Prevention Circular, "Tank Cars Manufactured to the RIC-RIC Stub Sill Design", CPC-1070.

(Continued)

*Primary Examiner*—Charles Garber
(74) *Attorney, Agent, or Firm*—McDermott Will & Emery LLP

(57) ABSTRACT

In order to improve the safety with which commodities (including regulated hazardous materials) can be shipped by rail around the country in tank cars and the like, each tank and associated undercarriage and structure is inspected and requalified according to an exhaustive predetermined list of sites, tests, parameters and apparatus comprising, broadly, determining which type of vehicle is under inspection and selecting an exhaustive list of sites to be inspected for the identified type of vehicle from an instruction set. Each of the listed sites is inspected in accord with the instructions set forth for each of the listed sites in the instruction set and the data derived from implementation of the tests conducted at each of the exhaustive list of sites is recorded.

10 Claims, 85 Drawing Sheets

OTHER PUBLICATIONS

AAR Memo dated Dec. 5, 1996, Casualty Prevention Circular, "Tank Cars Manufactured to the RIC–RIC Stub Sill Design", CPC–1072.

AAR Memo dated Jun. 6, 1997, Casualty Prevention Circular, Requirements for Tank Car Owners to Perform Stub Sill Damage Tolerance Analyses, CPC–1082.

EO–17, FRA Order No. 17, Notices 1 and 2, "Owners of Railroad Tank Cars".

AAR Memo dated Jul. 17, 1992, O&M Circular No. 1, "Tank Car Stub Sill Inspection Program".

49 Code of Federal Regulations, Subpart F Sec. 180.500–509 (Oct. 1, 2000 Ed.).

49 Code of Federal Regulations, Sec. 179.100–6, 179.101–1, 179.7(d) (Oct. 1, 2000 Ed.).

Rule 88—Interchange of Freight Cars, "Mechanical Requirements For Acceptance", pp. 518–532.

AAR Memo dated Sep. 7, 1999, Casualty Prevention Circular, "New Requirements for Inspections of Stub Sills on Tank Cars", CPC–1097.

Co–Pending U.S. Appl. No. 09/676,752 (Ref. No. 47440–013 at top left corner of first page of application).

Co–Pending U.S. Appl. No. 09/672,099 (Ref. No. 47440–016 at top left corner of first page of application).

Paper No. 6 (Office Action dated Oct. 24, 2001) in Co–Pending U.S. Appl. No. 09/672,099.

Feb. 26, 2002 Amendment responsive to Paper No. 6 (Office Action dated Oct. 24, 2001) in Co–Pending U.S. Appl. No. 09/672,099.

Apr. 26, 2002 Supplemental Amendment responsive to Paper No. 6 (Office Action dated Oct. 24, 2001) in Co–Pending U.S. Appl. No. 09/672,099.

Paper No. 13 (Office Action dated Sep. 4, 2002) in Co–Pending U.S. Appl. No. 09/672,099.

Feb. 4, 2003 Responsive Under 37 CFR 1.116 to Paper No. 13 (Office Action dated Sep. 4, 2002) in Co–Pending U.S. Appl. No. 09/672,099.

Paper No. 17 (Notice of Allowance dated Feb. 24, 2003) in Co–Pending U.S. Appl. No. 09/672,099.

49 Code of Federal Regulations, Subpart F Sections 180.509–180.511 (Oct. 1, 1999 Ed.).

PCT International Preliminary Examination Report dated Dec. 26, 2001.

"Ensuring Tank Car Safety", A Government and Industry Partnership, Proceedings from the Planning Committee Meeting, Federal Railroad Administration, Washington, DC Jan. 14, 1997.

International Search Report dated Jan. 8, 2001.

International Search Report dated Jan. 29, 2001.

Appendix B to DOT–E 12095 "Alternative Tank Car Qualification Program", pp. 1–12.

Appendix R, AAR Manual of Standards and Recommended Practices, Specifications for Tank Cars, pp. 319–331.

AAR Memo dated Apr. 5, 1999, Casualty Prevention Circular, "New Requirements for Inspections of Stub Sill on Tank Cars", CPC–1094.

AAR Memo dated Nov. 15, 1999, Casualty Prevention Circular, "Inspections of Stub Sills on Tank Cars–Availability of SILSPEC3 Software and Correction to Form SS–3", CPC–1100.

AAR Memo dated Aug. 10, 1994, O&M Circular No. 1, Supplement No. 2, "Tank Car Stub Sill Inspection Program", CPC–1030.

49 Code of Federal Regulations, Subpart F Sec. 180.500–509.

49 Code of Federal Regulations, Sec. 179.100–6, 101–1, 179.7(d).

* cited by examiner

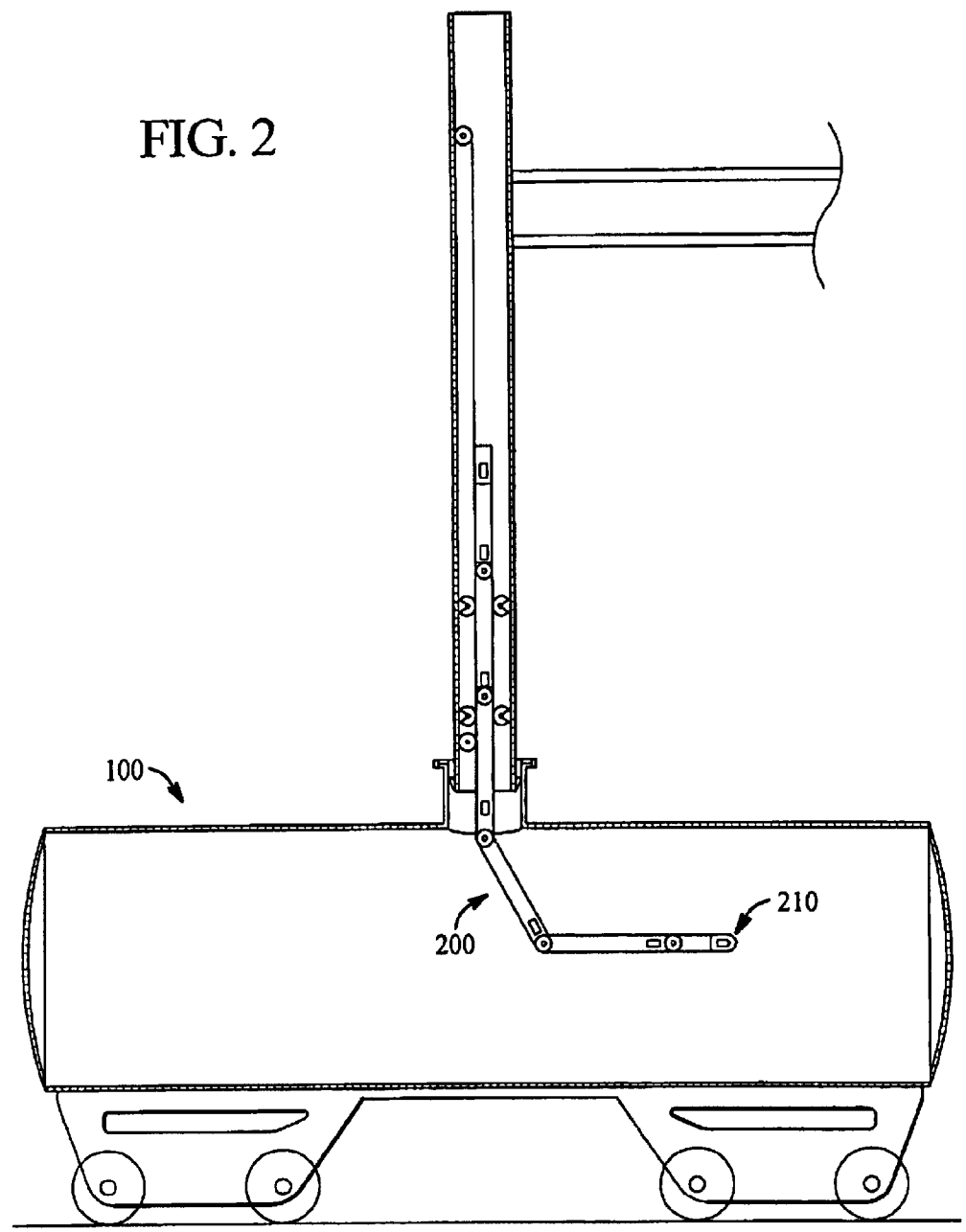

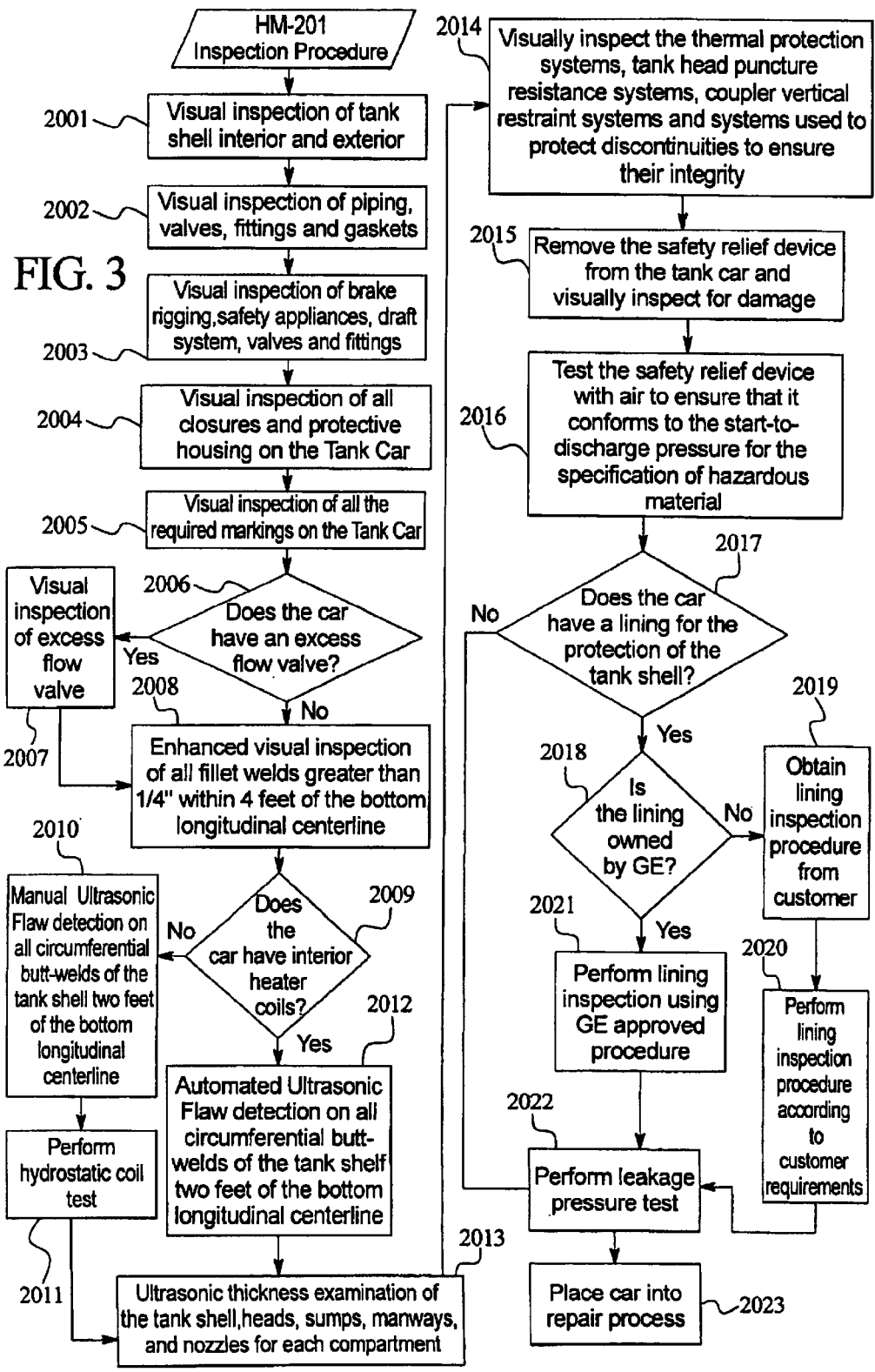

|  | STATION STENCIL | QUALIFIED | DUE |
|---|---|---|---|
| TANK QUALIFICATION |  |  |  |
| SERVICE EQUIPMENT |  |  |  |
| (1a)         (1b) |  |  |  |
| (2a)         (2b) |  |  |  |
| COATING/LINING |  |  |  |
| TYPE         (3a) |  |  |  |
| DATE APPLIED (3b) |  |  |  |
| 88.B.2.INSPECTION |  |  |  |

← 41 3/4" →

17 1/4"

FIG. 5C
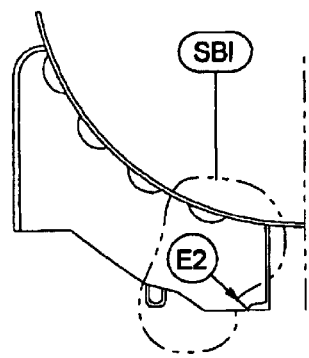
FIG. 1
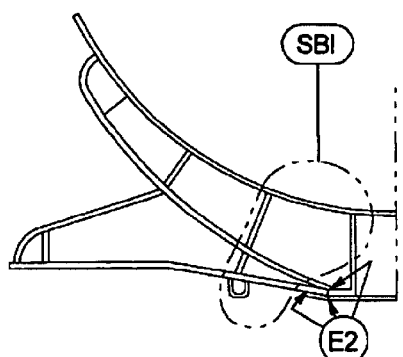
FIG. 2
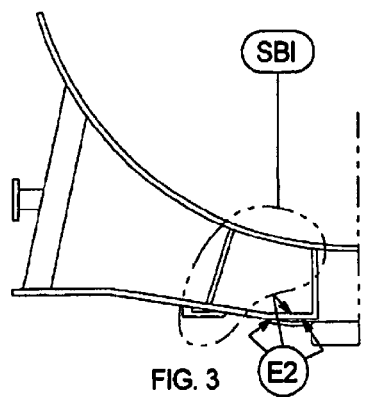
FIG. 3
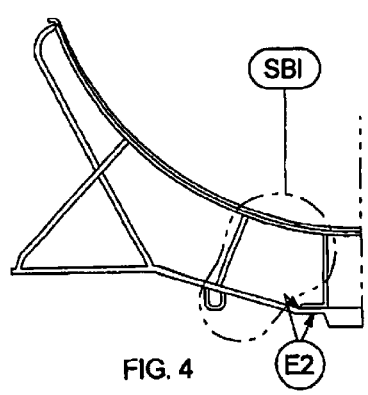
FIG. 4
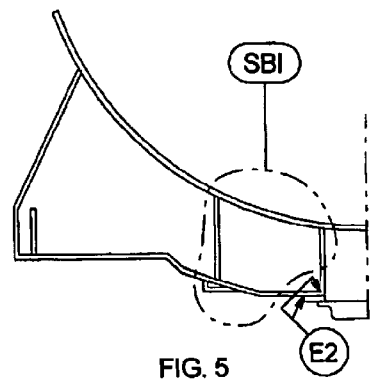
FIG. 5

FIG. 6A
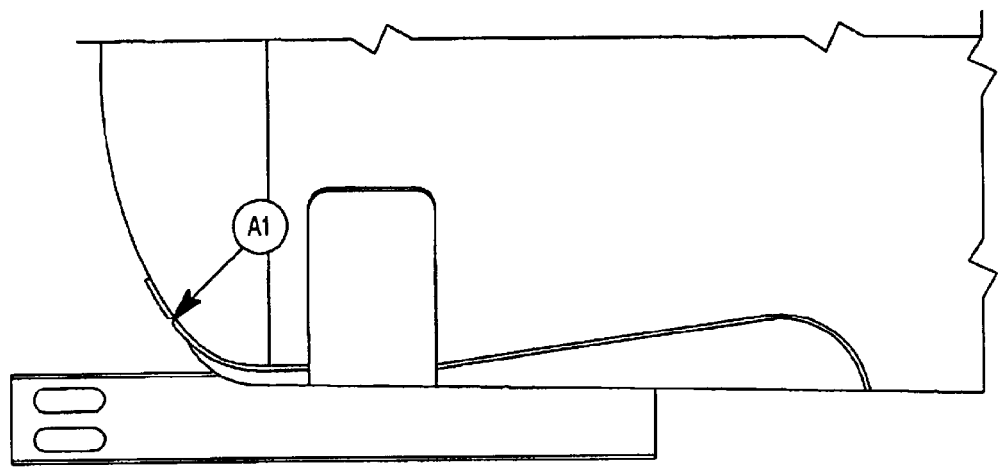
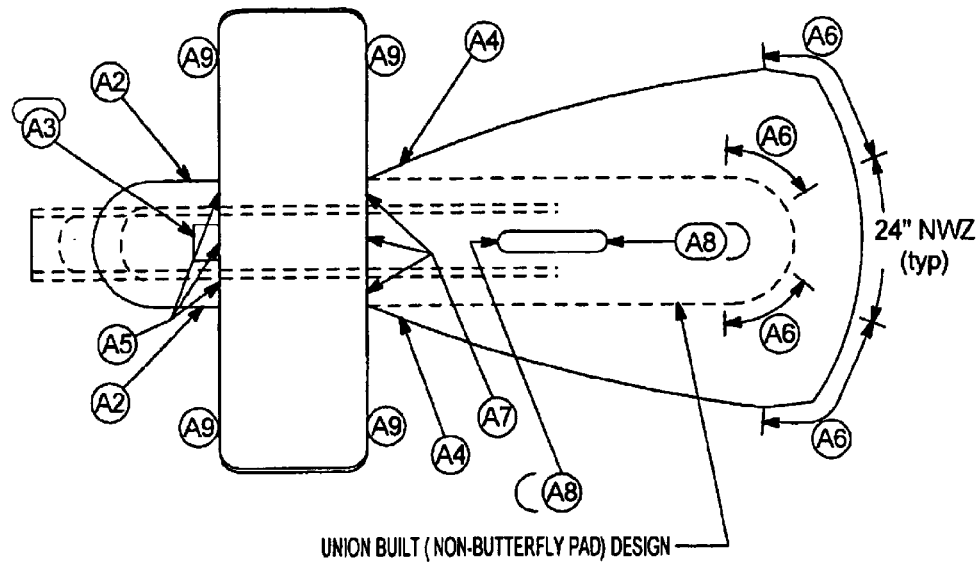
UNION BUILT (NON-BUTTERFLY PAD) DESIGN

FIG. 6C
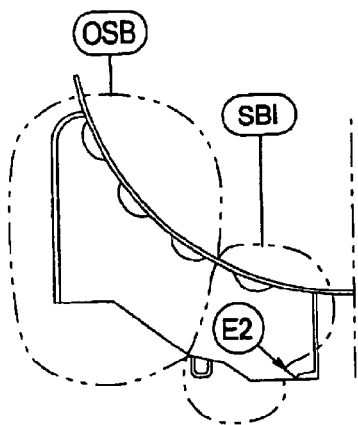
FIG. 1
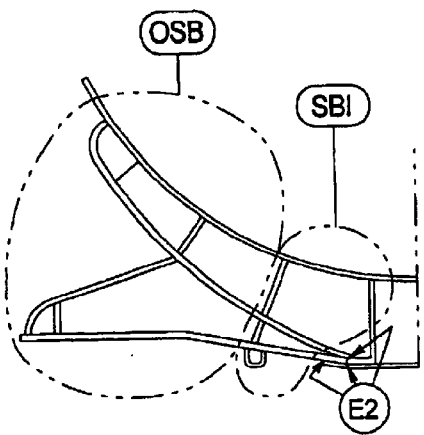
FIG. 2
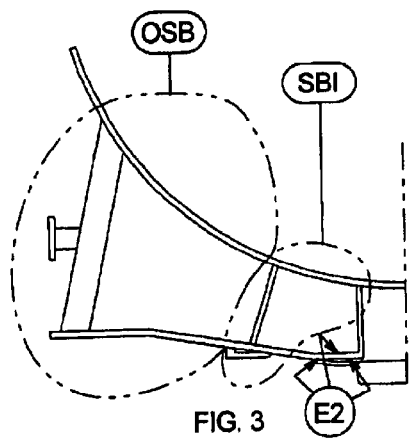
FIG. 3
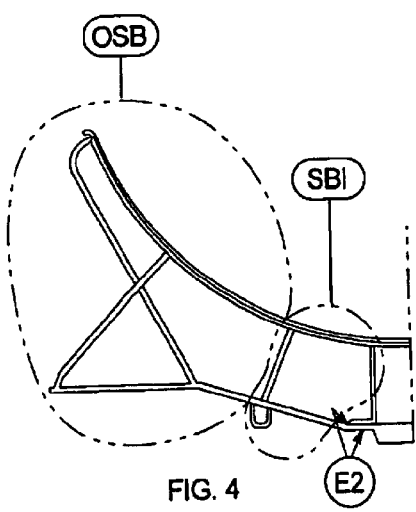
FIG. 4
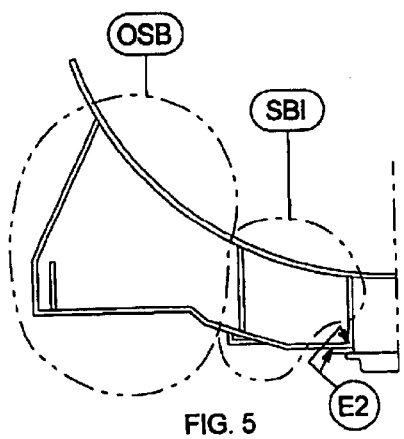
FIG. 5

FIG. 7B
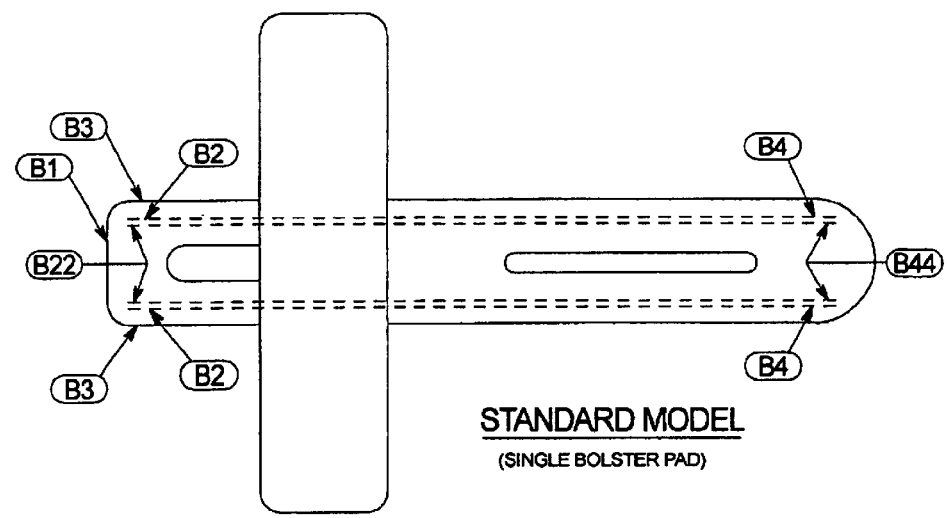
STANDARD MODEL
(SINGLE BOLSTER PAD)
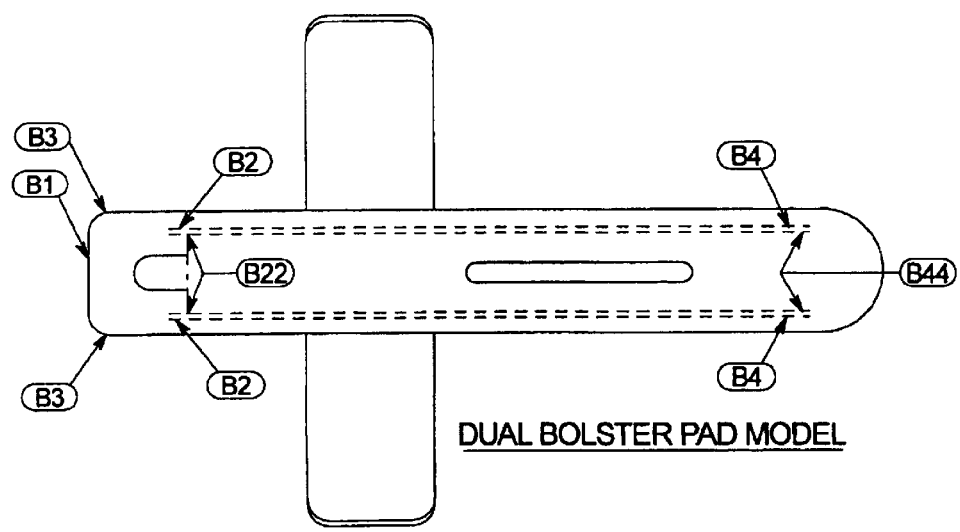
DUAL BOLSTER PAD MODEL

FIG. 7C
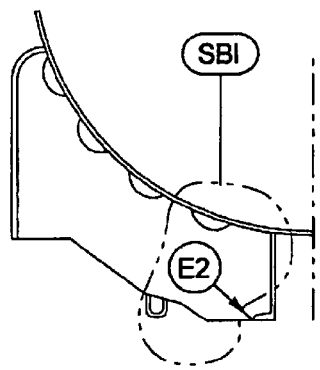
FIG. 1
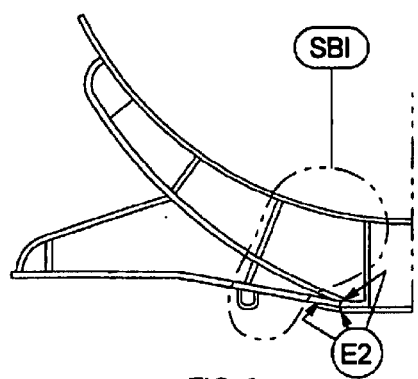
FIG. 2
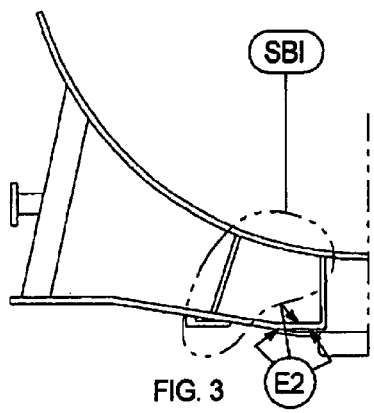
FIG. 3
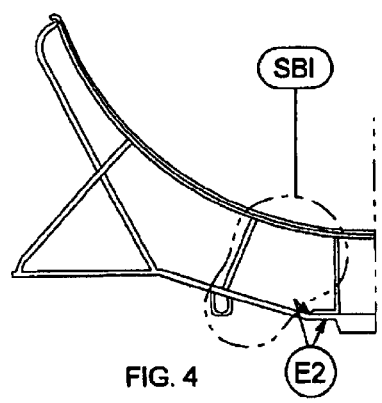
FIG. 4
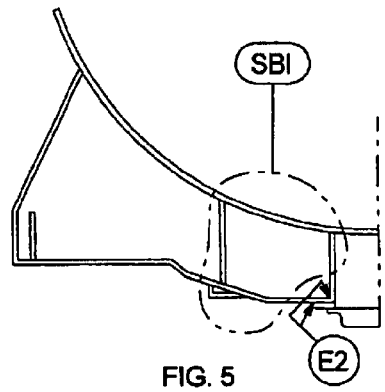
FIG. 5

FIG. 8C
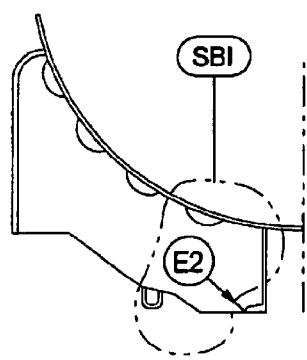
FIG. 1
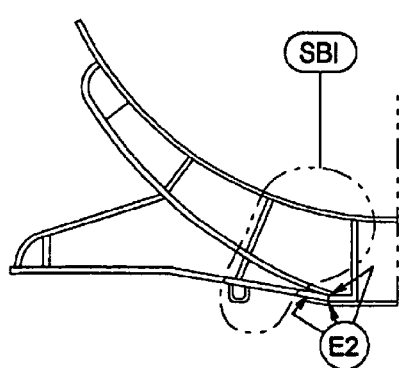
FIG. 2
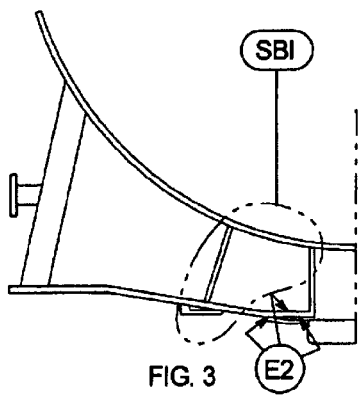
FIG. 3
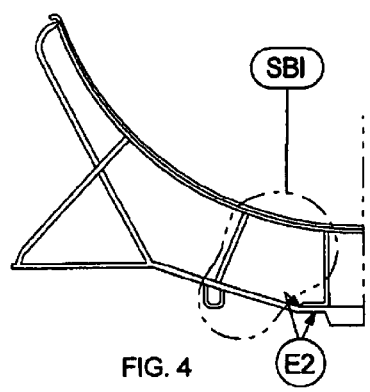
FIG. 4
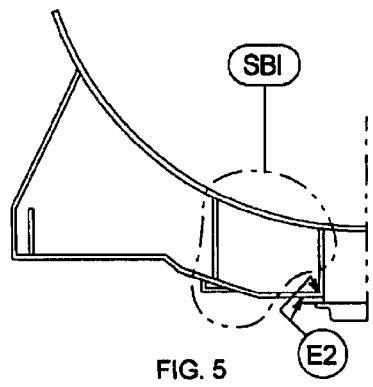
FIG. 5

FIG. 9C
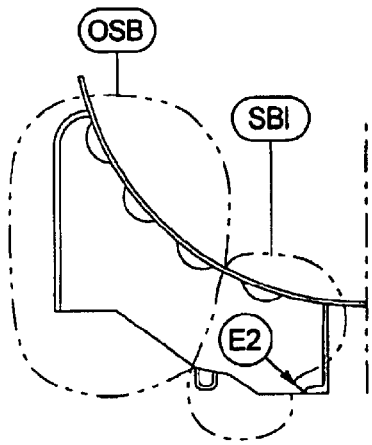
FIG. 1
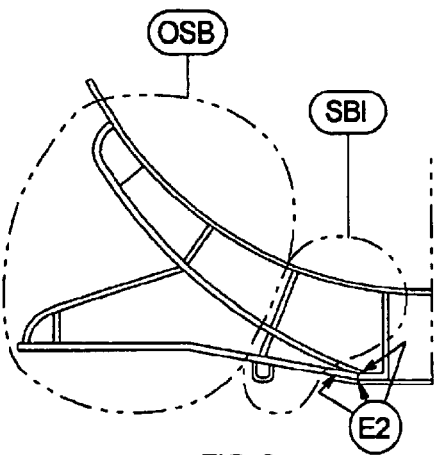
FIG. 2
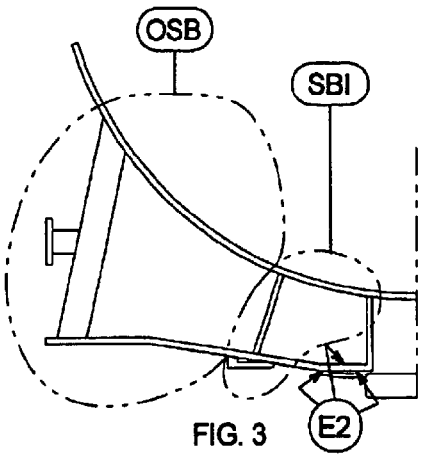
FIG. 3
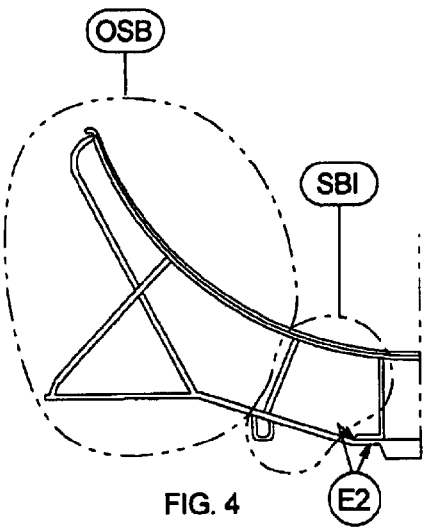
FIG. 4
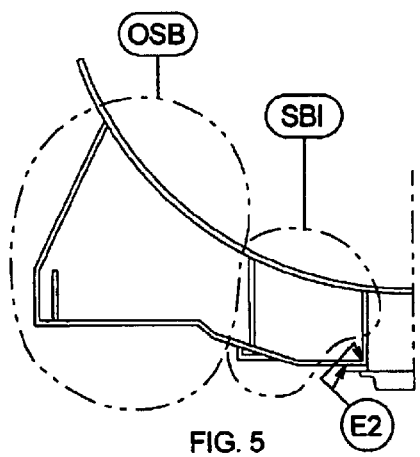
FIG. 5

FIG. 10B
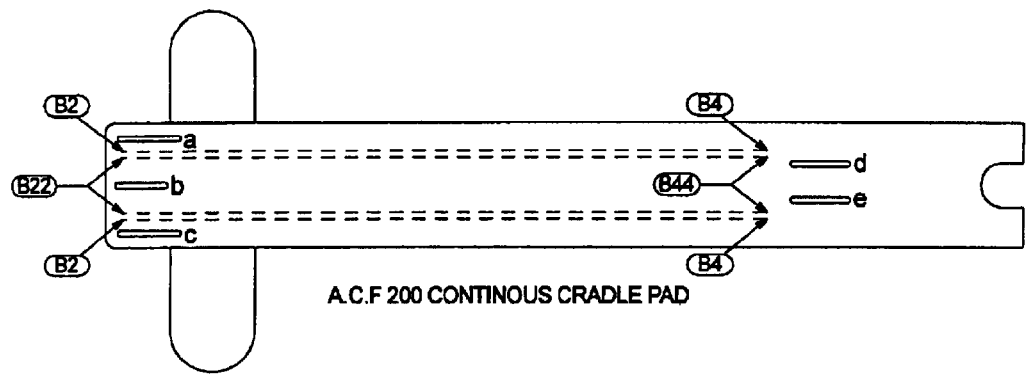
A.C.F 200 CONTINOUS CRADLE PAD
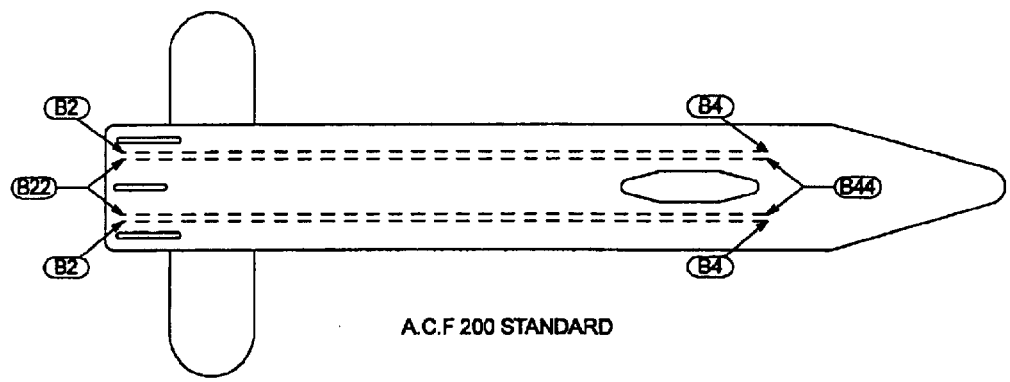
A.C.F 200 STANDARD
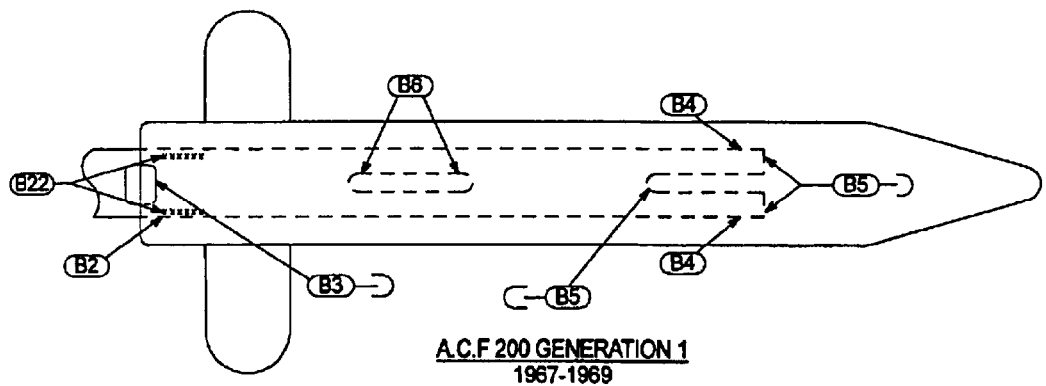
A.C.F 200 GENERATION 1
1967-1969

FIG. 10C
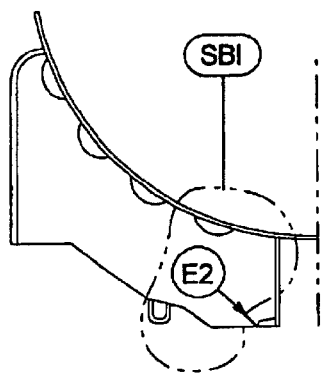
FIG. 1
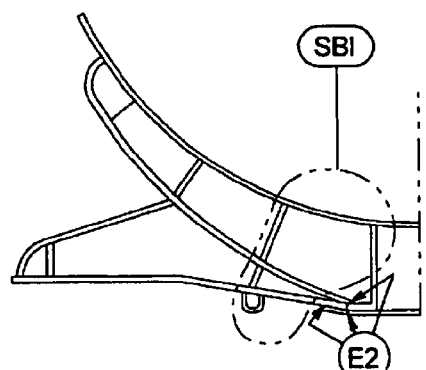
FIG. 2
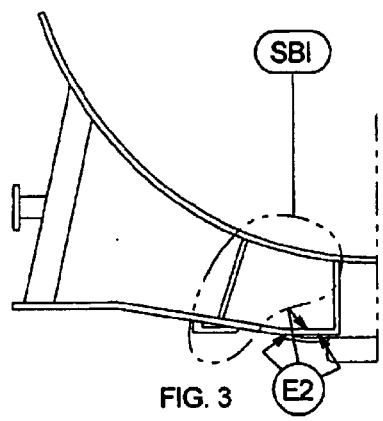
FIG. 3
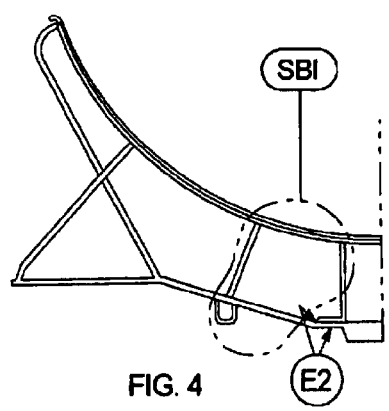
FIG. 4
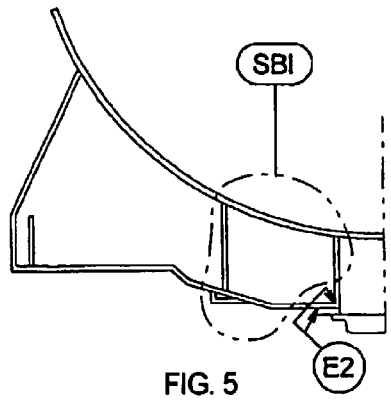
FIG. 5

FIG. 10H
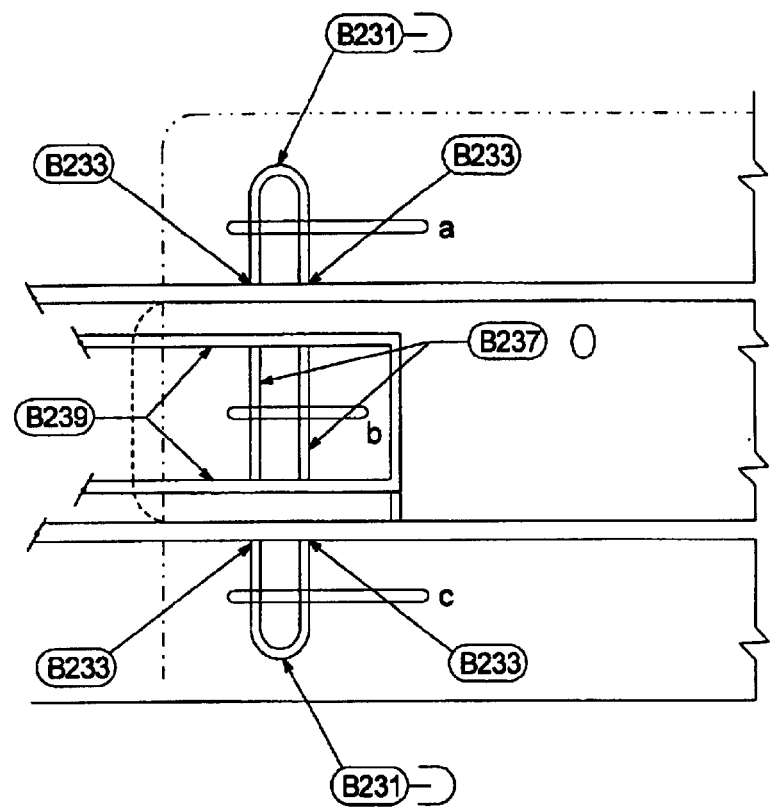
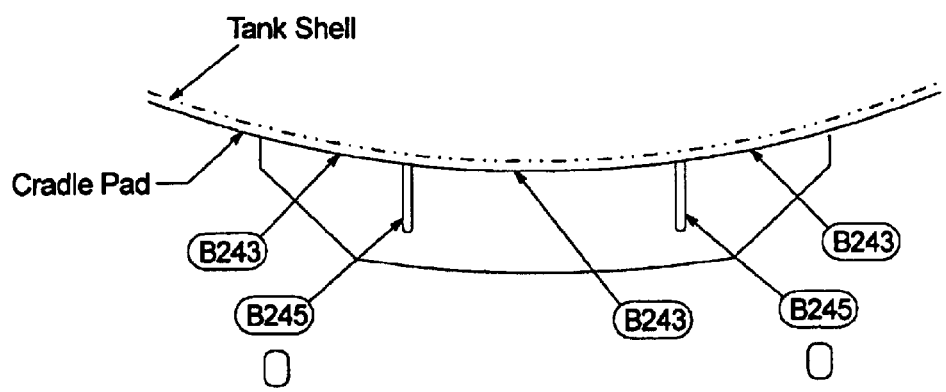

FIG. 10J
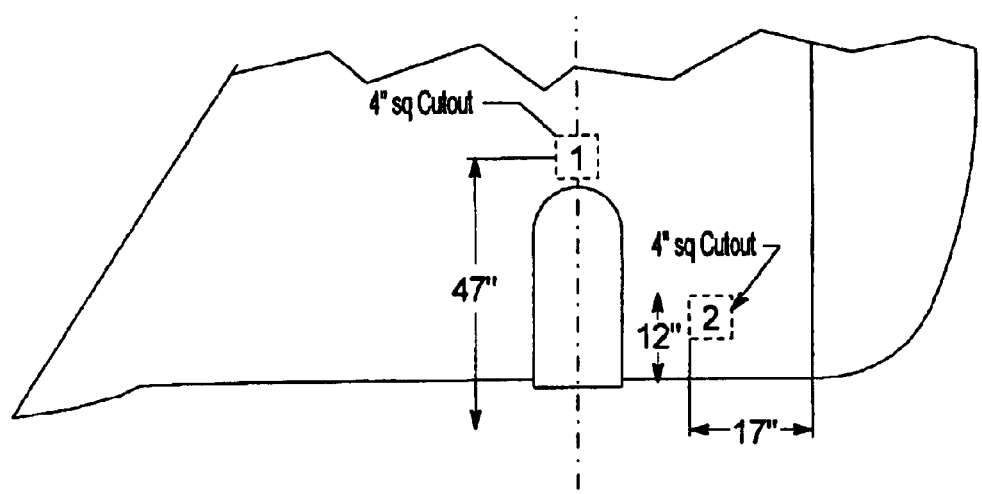
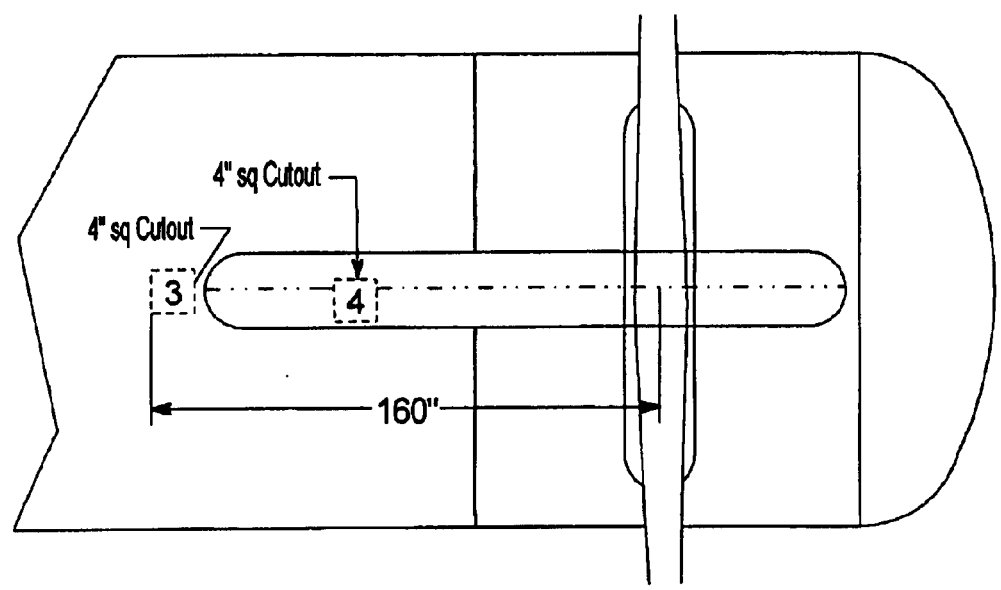

FIG. 11B
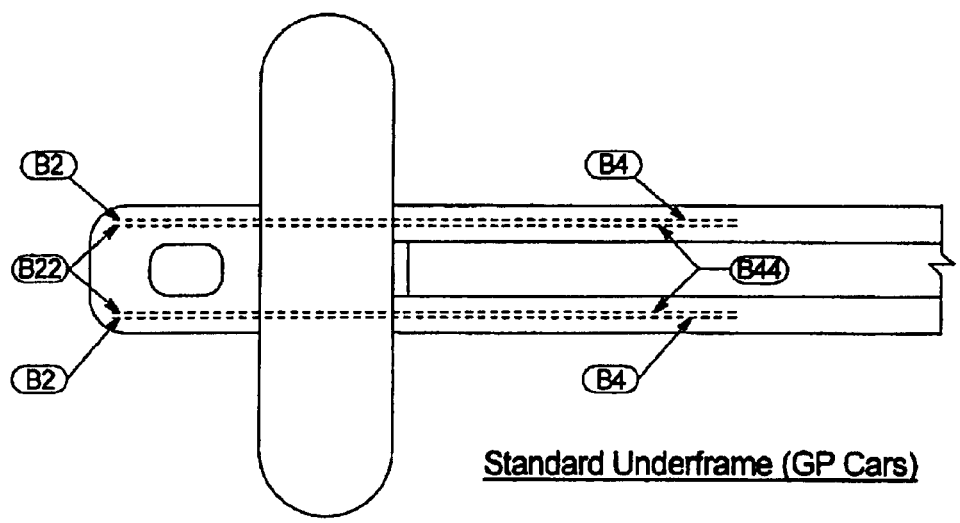
Standard Underframe (GP Cars)
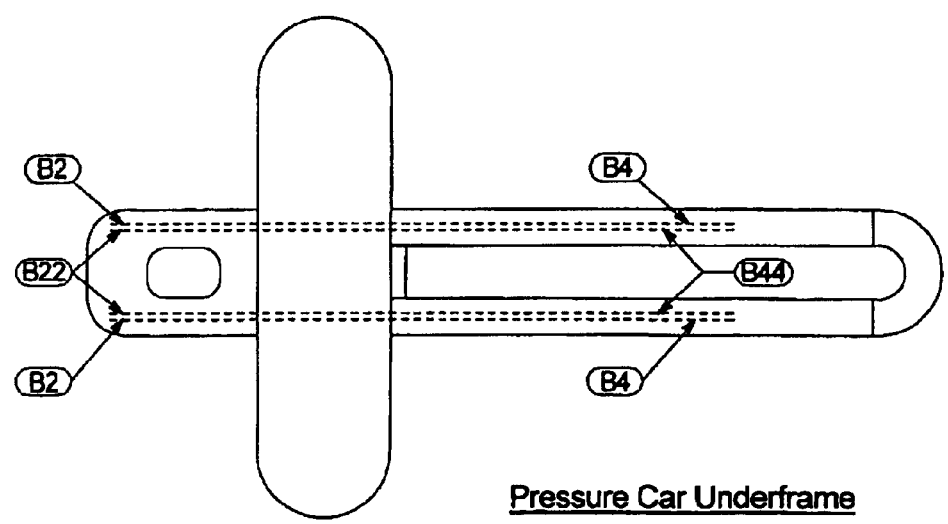
Pressure Car Underframe

FIG. 11C
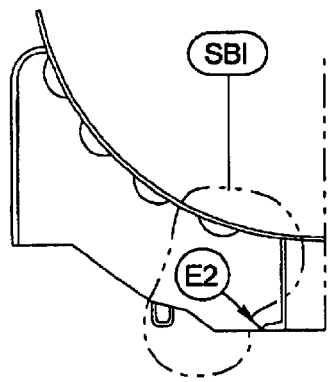
FIG. 1
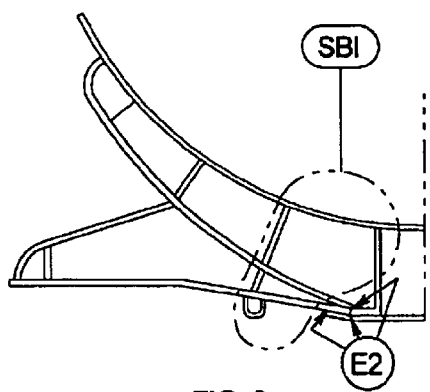
FIG. 2
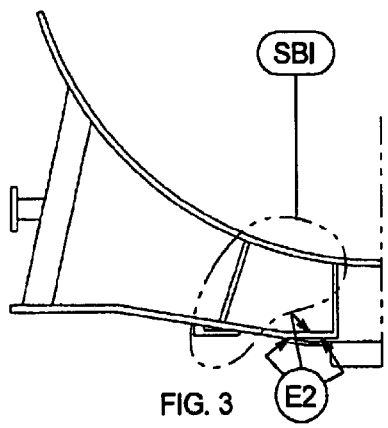
FIG. 3
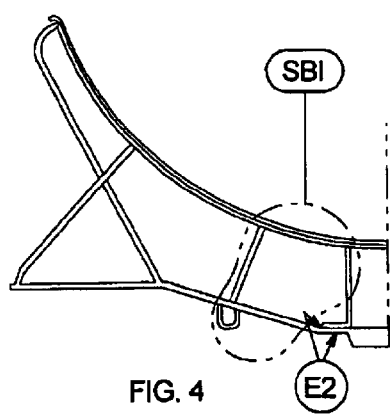
FIG. 4
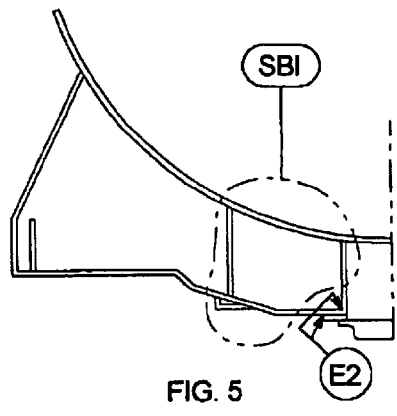
FIG. 5

FIG. 12A
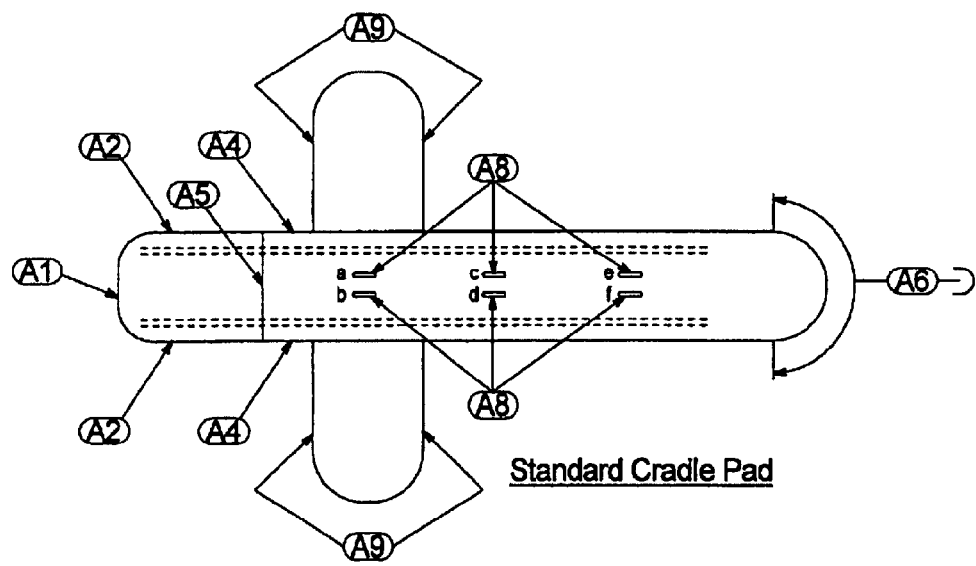
Standard Cradle Pad
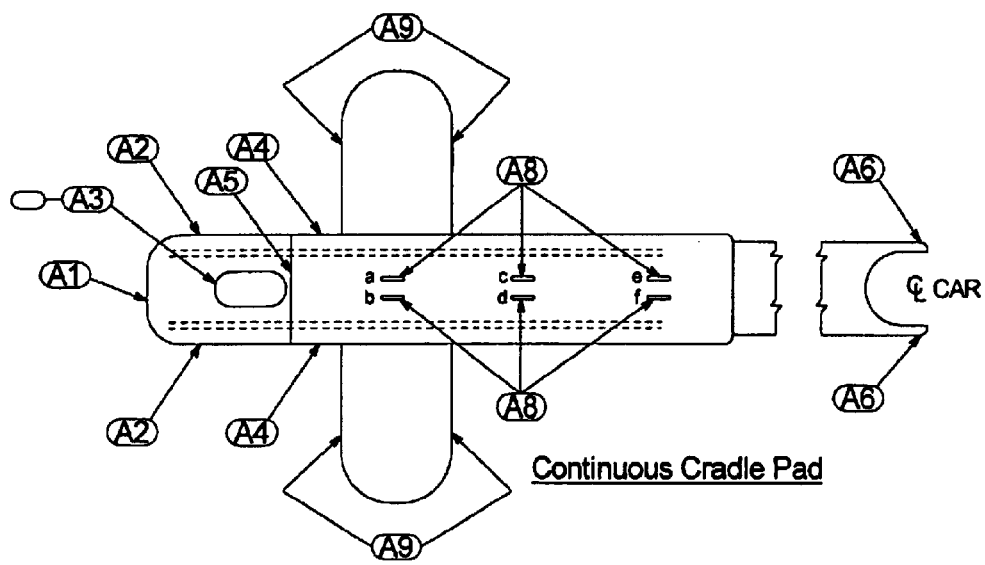
Continuous Cradle Pad

FIG. 12B
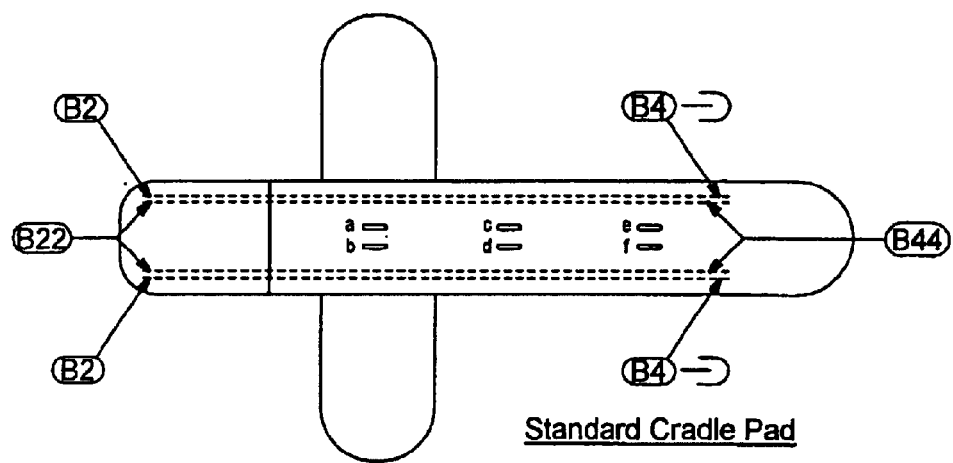
Standard Cradle Pad
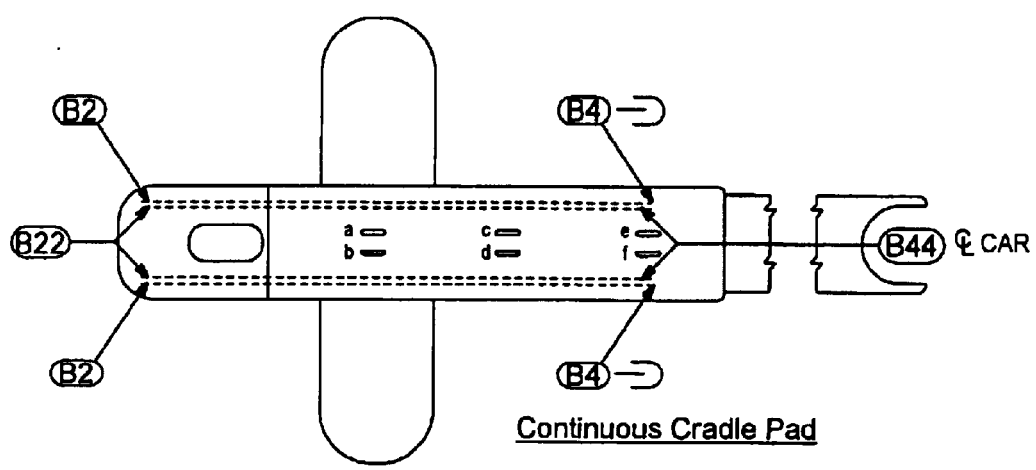
Continuous Cradle Pad

FIG. 12C
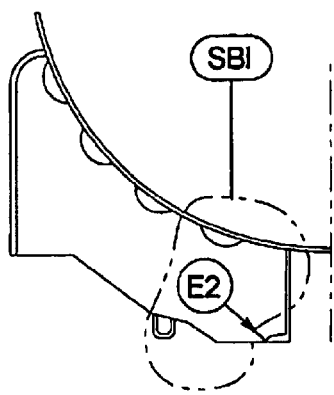
FIG. 1
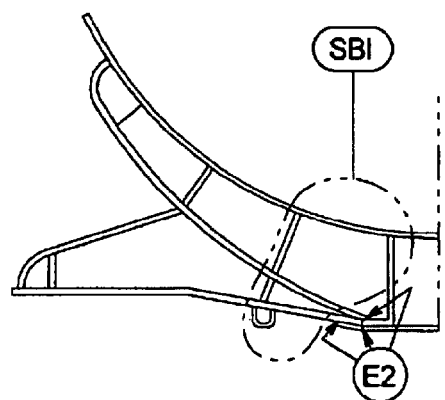
FIG. 2
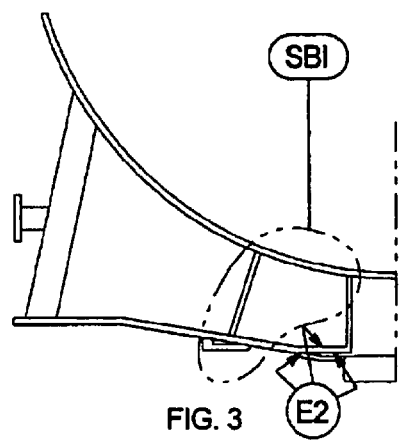
FIG. 3
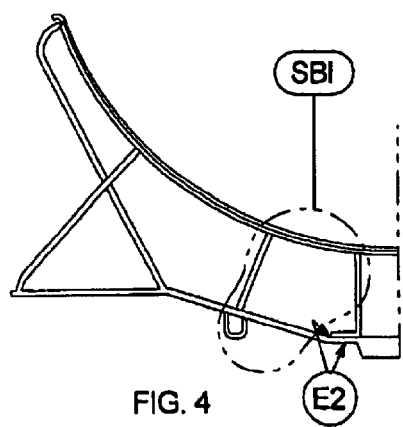
FIG. 4
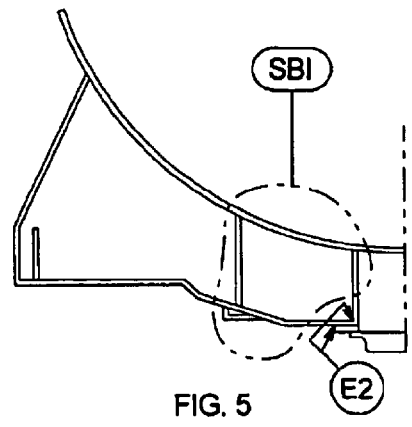
FIG. 5

FIG. 13A
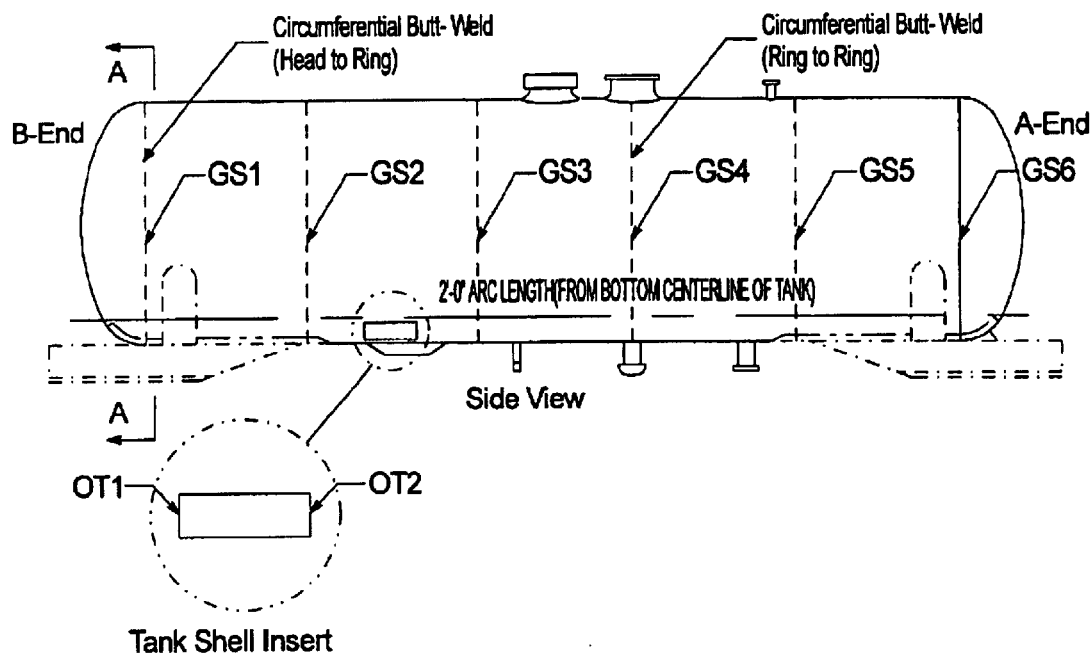
Tank Shell Insert
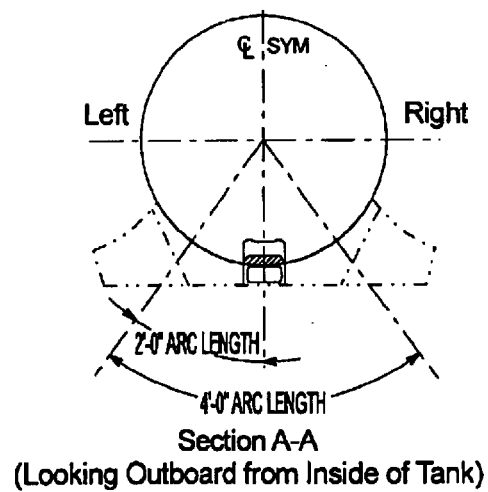
Section A-A
(Looking Outboard from Inside of Tank)

FIG. 14A
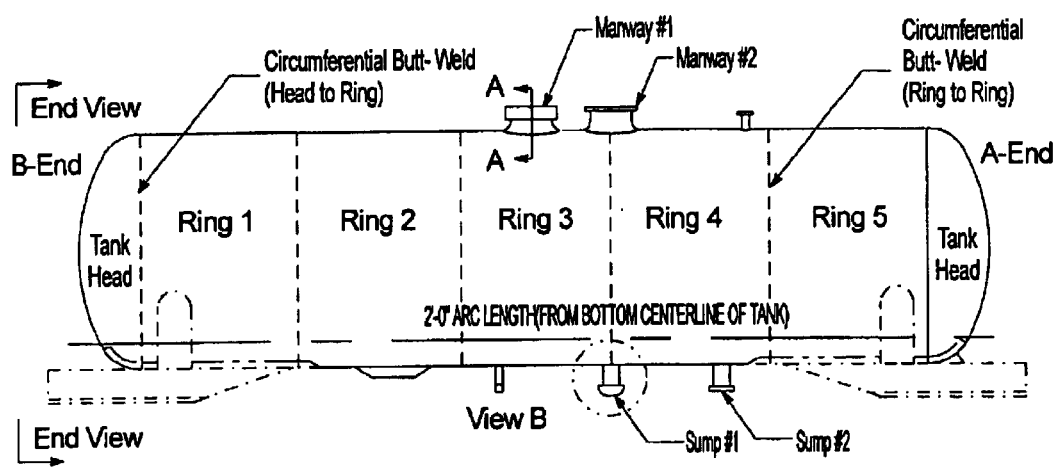
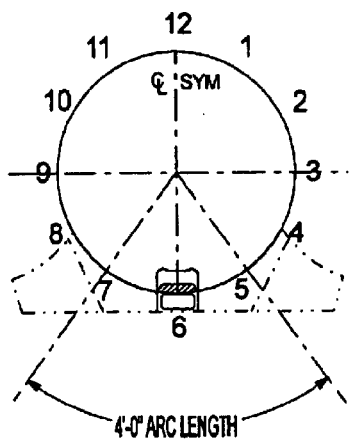

FIG. 15A

ALLOWABLE SAFETY RELIEF VALVE PRESSURE TOLERANCES

| Nominal STD[1] (psig) | Tolerance (+/-)[4] (psig) | Minimum STD[1] (psig) | Maximum STD[1] (psig) | Minimum VTP[1] (psig) | Gauge Range[5] (psig) | Maximum Gauge Increment[5] (psig) |
|---|---|---|---|---|---|---|
| 35 | 3 | 32 | 38 | 28 | 0-100 | 1 |
| 75 | 3 | 72 | 78 | 60 | 0-150/160 | 1 |
| 150 | 4.5 | 145.5 | 154.5 | 120 | 0-300 | 2 |
| 225 | 6.75 | 218.25 | 231.75 | 180 | 0-400 | 5 |
| 247.5 | 7.4 | 240.1 | 254.9 | 196 | 0-400 | 5 |
| 255 | 7.7 | 247.3 | 262.7 | 204 | 0-400 | 5 |
| 280.5 | 8.4 | 272.1 | 288.9 | 224 | 0-500 | 5 |
| 300 | 9 | 291 | 309 | 240 | 0-500 | 5 |
| 330 | 10 | 320 | 340 | 264 | 0-500 | 5 |
| 375 | 11.25 | 363.75 | 386.25 | 300 | 0-600 | 10 |
| 450 | 13.5 | 436.5 | 463.5 | 360 | 0-750 | 10 |

NOTES:
1. STD indicates start-to-discharge.
2. VTP indicates vapor-tight pressure.
3. Valves should be set or reset to NOMINAL STD pressure.
4. DOT requirements for tolerance are given in 49CFR173.31(c)(6). Pressure tolerances listed above have been shown here to assist testing personnel and are not intended to alter any DOT requirements.
5. Digital or dial gauges of greater range may be used if accuracy and sensitivity levels are equal to or better than required above.

1100

1130
1120
1140

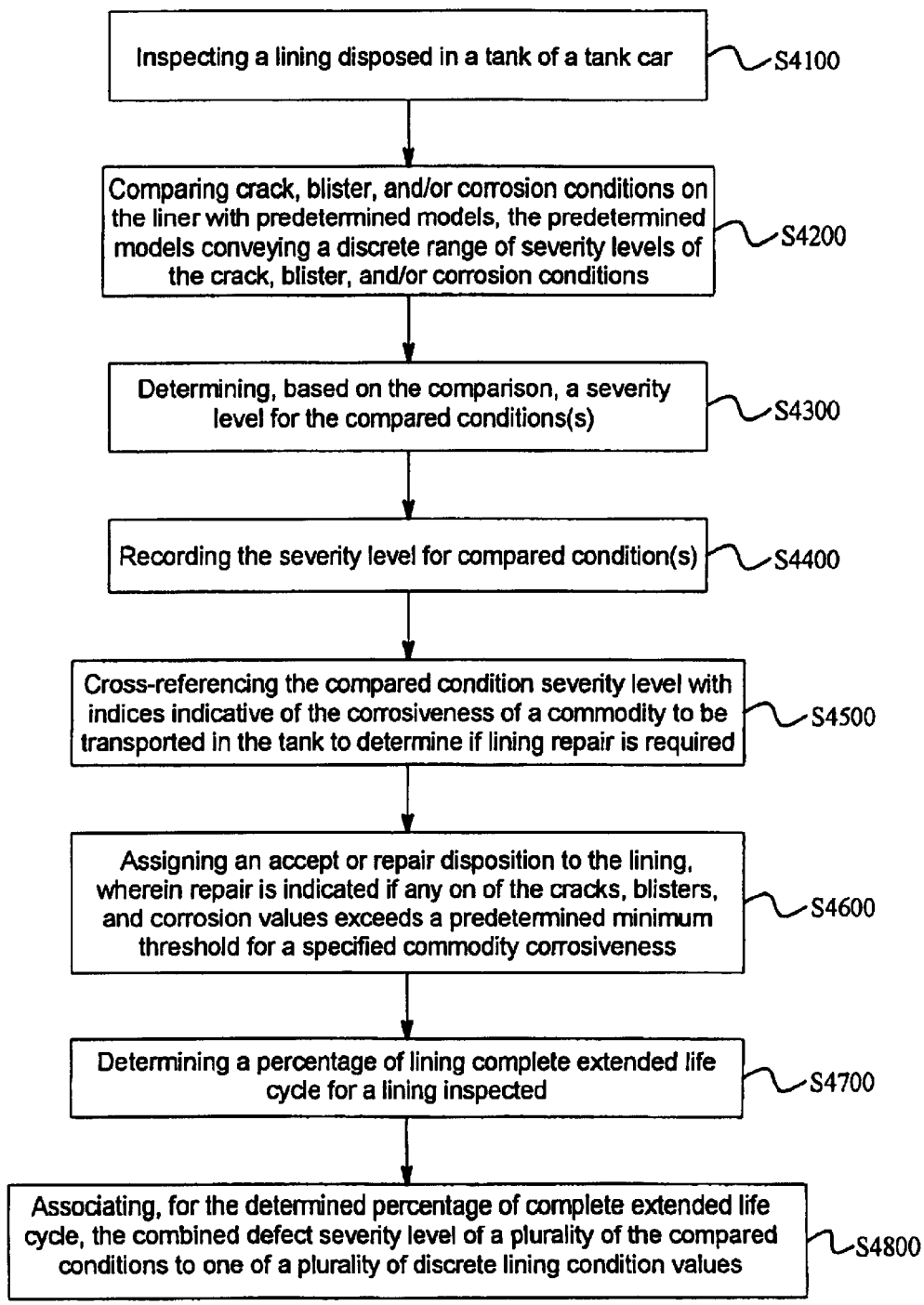

FIG. 18A

TABLE 1: Accept/Repair Disposition

| Defect | Condition | P.P. | 6 | 4 | 3 | 2 |
|---|---|---|---|---|---|---|
| Cacks | 8 | R | R | A | A | A |
|  | 6 | R | R | R | A | A |
|  | 4 | R | R | R | R | R |
| Blisters | 8 | R | A | A | A | A |
|  | 6 | R | R | A | A | A |
|  | 4 | R | R | R | A | A |
|  | 2 | R | R | R | R | A |
| Corrosion | RE1 | R | R | R | A | A |
|  | RE2 | R | R | R | A | A |
|  | RE3 | R | R | R | A | A |

A = Accept as is disposition

R = Repair disposition

FIG. 18B  Lining System Operating Characteristics

| Lining System | approx. dft | Properties | Recommended Service | Failure Criteria | Estimated Life |
|---|---|---|---|---|---|
| (Unmodified) High Bake Phenolic (400°F) | 8 to 10 mils in multiple coats | Very good Water Resistance Good Corrosion Resistance High Temperature Resistant Difficult to repair or to touch-up | Organic and Inorganic Acids (concentrated and diluted) Less suitable for strong Alkalis Resistant against most Solvents Can be used for Food Grade Chemicals | Cracking due to mechanical impact (direct or reverse), temperature cycling or vibration. Hydrogen grooving of steel under coating in highly concentrated sulfuric acid. | 8 years |
| (Modified) High Bake Phenolic (400°F) | 8 to 10 mils in multiple coats | Very good Water Resistance Good Corrosion Resistance Less brittle than unmodified phenolics | Diluted Organic and Inorganic Acids Good resistance against strong Alkalis Can be used for Food Grade Chemicals Resistant to most Solvents | Cracking due to mechanical impact (direct or reverse), temperature cycling or vibration. | 8 years |
| (Modified) High Bake Epoxy/Amine (400°F) | 12 to 15 mils in 2 coats | Very good Water Resistance Good Corrosion Resistance Two-pack materials | Diluted Organic and Inorganic Acids Very good resistance against hot alkalis Good Solvent Resistance | Becomes brittle on aging. May blister in unsuitable chemicals. May crack under impact and bending. | 7 years |
| (Modified) High Bake Epoxy/Amine (250°F) | 12 to 15 mils in 2 coats | Good Water Resistance Good Corrosion Resistance Two-pack materials | Diluted, non oxidizing Inorganic Acids Very good resistance against hot alkalis Good Solvent Resistance | Becomes brittle on aging. May blister and/or soften in certain chemicals. May crack under impact and bending. | 7 years |
| Epoxy/Phenolic/Amine air-dry or force curing | 12 to 15 mils | Good Water Resistance Good Corrosion Resistance Two-pack materials | Acidity not lower than pH 2 Very good Alkali Resistance Good Solvent Resistance | Becomes brittle on aging. May blister and/or soften in certain chemicals. May crack under impact and bending. | 7 years |
| Epoxy/Amine Solvent Free. Air dry of force Curing (*) | 12 to 15 mils in 1 coat | Good Water Resistance Good Corrosion Resistance Plural Component Appl. | Diluted, non oxidizing Inorganic Acids Very good resistance against Alkalis Good Solvent resistance | Becomes brittle with aging. May slightly soften in certain solvents. Better Crack and Impact Resistant | 8 years |
| Epoxy/Polyamidoamine Force curing | 10 - 14 mils 2 coats | Good Water Resistance Good Corrosion Resistance Two-pack materials | Good resistance against diluted alkalis Resistant against some solvents Can be Food Grade Compliant | Becomes slightly brittle with aging. May blister and/or soften in certain solvents. Fair Crack and Impact Resistant | 6 years |
| Rubber Sheet Lining | N/A | Application using in-situ vulcanizing and adhesives | Good Acid and Alkali Resistance Not suitable for most Solvents Maximum Temperature 150°F Hard rubber better resistant than soft rubber | Oxidizing chemicals may attack the sheet lining and embrittle. Sheets may loose adhesion. Welds may deteriorate (corrosion) | 12 years |

TABLE 2: Lining Condition Matrix

| Complete Extended Life Cycle | Defect Type | Lining Condition ||||
|---|---|---|---|---|---|
| | | Excellent A | Good B | Fair C | Poor D |
| 0 - 25% | Crack<br>Blister<br>Corrosion<br>DFT<br>Stains | No Defects<br>No Defects<br>No Defects<br>> 8 mils<br>No Spots | No Defects<br>> No. 8 (2.5%)<br>No Defects<br>> 7 mils<br>No Spots | > No. 8<br>> No. 6 (15%)<br>> Re 1<br>> 6 mils<br>< 10 Sq. Ft | > No. 6<br>> No. 6 (45%)<br>> Re 2<br>< 6 mils<br>> 10 Sq. Ft |
| 26 - 42% | Crack<br>Blister<br>Corrosion<br>DFT<br>Stains | No Defects<br>No. 6 (2.5%)<br>No Defects<br>> 7 mils<br>No Spots | No Defects<br>> No. 6 (15%)<br>No Defects<br>> 7 mils<br>No Spots | > No. 8<br>> No. 4 (45%)<br>> Re 2<br>< 6 mils<br>< 20 Sq. Ft | > No. 6<br>> No. 2 (15%)<br>< Re 2<br>< 6 mils<br>> 20 Sq. Ft |
| 43 - 58% | Crack<br>Blister<br>Corrosion<br>DFT<br>Stains | No Defects<br>> No. 6 (2.5%)<br>No Defects<br>> 6 mils<br>No Spots | No Defects<br>> No. 6 (15%)<br>No Defects<br>> 5 mils<br>< 10 Sq. Ft | > No. 8<br>> No. 4 (15%)<br>> Re 2<br>< 5 mils<br>< 20 Sq. Ft | > No. 4<br>> No. 4 (15%)<br>< Re 2<br>< 5 mils<br>> 20 Sq. Ft |
| 59 - 83% | Crack<br>Blister<br>Corrosion<br>DFT<br>Stains | No Defects<br>No. 6 (15%)<br>No Defects<br>> 5 mils<br>< 10 Sq. Ft | No Defects<br>> No. 4 (15%)<br>No Defects<br>> 5 mils<br>< 10 Sq. Ft | > No. 6<br>> No. 2 (15%)<br>< Re 2<br>< 5 mils<br>< 20 Sq. Ft | > No. 4<br>> No. 2 (45%)<br>< Re 2<br>< 5 mils<br>> 20 Sq. Ft |
| > 83% | Crack<br>Blister<br>Corrosion<br>DFT<br>Stains | No Defects<br>> No. 4 (15%)<br>No Defects<br>> 5 mils<br>< 10 Sq. Ft | No Defects<br>> No. 4 (15%)<br>No Defects<br>> 5 mils<br>< 10 Sq. Ft | > No. 4<br>> No. 4 (15%)<br>< Re 2<br>< 5 mils<br>> 20 Sq. Ft | > No. 4<br>> No. 4 (15%)<br>< Re 3<br>< 5 mils<br>> 20 Sq. Ft |

Work Instruction:

1. Blistering:
A phenomenon peculiar to painted surfaces is the formation of blisters relative to some system weakness. This procedure describes the procedure for determining the size and density of the blisters so that comparisons can be made.

Procedure
Inspect the lining surface for evidence of blistering. Match the visual standards with the actual condition of the lining to determine the size and frequency of the blistering.

Size - There are 5 degrees of size on a numerical scale.
Number 10 - no blistering
Number 8 - smallest blister easily seen by eye
Number 6 - Small blistering
Number 4 - Medium blistering
Number 2 - Large blistering Frequency - There are 3 degrees of frequency for each category of size which describe the density of the number of blisters formed in a local area Code MD - Medium Dense
Code M - Medium
Code F - Few

Reporting:
Record the size of the largest area of damage. This will be a No. code.
Record the density of the largest area of damage. This will be a letter code.
Indicate weather the Blistering is scattered or localized
If it is localized indicate the number of areas.

Sketch/Description:

FIG. 21

| Work Instruction: | Sketch/Description: |
|---|---|
| 2 Cracking<br><br>Cracking is a condition that occurs when there is a break in the film surface that extends to the substrate. Where this is difficult to determine the break should be evaluated with a minimum of 10X magnification and only be called a crack if the underlying surface is visible.<br><br>Procedure<br><br>Visually compare the surface with the photographic reference standards to determine the size and density of the cracking.<br><br>Three categories of cracking:<br><br>Code I- Irregular Pattern Type – Cracking in which the breaks in the film are in no definite pattern.<br><br>Code L- Line Type – Cracking in which the breaks in the film are generally arranged in parallel lines usually horizontally or vertically over the surface.<br><br>Code S- Sigmoid Type – Cracking in which the breaks in the film are form a pattern consisting of curves meeting and intersecting usually on a large scale. See adjacent Visual Standards.<br><br>Since the type and degree of failure may vary over any given area a representative portion should be rated.<br><br>Reporting:<br>Record the combination size and density of the largest area of damage. This will be a No.<br>Code.<br>Record the type of cracking. This will be a letter code.<br>Indicate weather the cracking is scattered or localized.<br>If it is localized indicate the number of areas. | 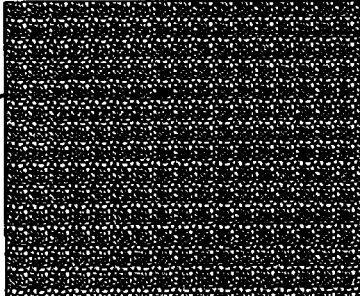 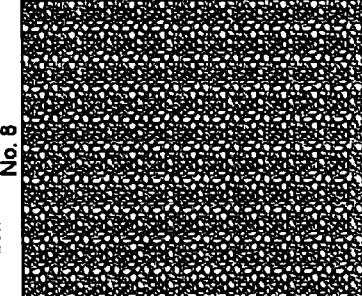<br>No. 8    No. 5<br><br>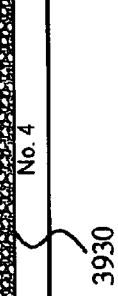 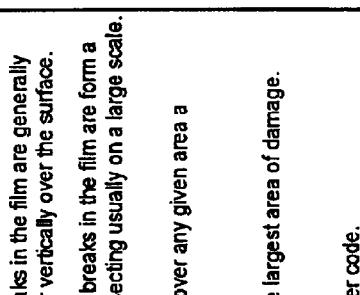<br>No. 4    No. 2 |

FIG. 24A

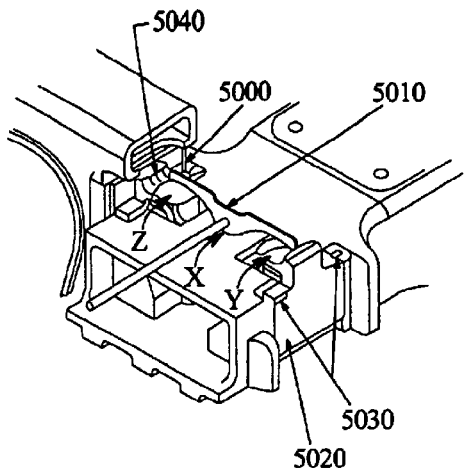

FIG. 24B

| Type of Truck | Repair When Total Clearance Between Bolster and Truck Side Frame Columns Reaches: | | Repair to These Nominal Clearance Dimensions Between Bolster and Truck Side Frame: | | |
|---|---|---|---|---|---|
| | Lateral (inches) | Longitudinal (inches) | Lateral | | Total Longitudinal (inches) |
| | | | Inside (inches) | Outside (inches) | |
| Trucks WITH built-in snubbing features having roller bearings which provide lateral (all bearing sizes): or having 5" x 9" or 5 1/2" x 10" roller bearings which provide no bearing lateral. | 1 1/8" | * | 1/4" | 1/4" | * |
| Trucks with built-in snubbing features having 6" x 11", 6 1/2 x 12" or 7" x 12" roller bearings which provide no bearing lateral. | 1 1/2" | * | 1/2"** | 1/2"** | * |

\* Longitudinal clearances are primarily a matter of wear of frame or bolster column wear plates, friction shoes and bolster or frame column surfaces. See maintenance instructions from truck designer of manufacturer.

\*\* 1/4" and 5/8" clearances are acceptable on bolster manufactured prior to 1987.

1.5" Minimum
5050
1/2" Maximum

| Bettendorf | Buckeye | ASF | Pittsburgh Steel Foundry | Scullin Steel | | |
|---|---|---|---|---|---|---|
| UT456 | 3-1776 | 7273 | 3-1673 | 4665 | 5364 | 5869-B |
| | F-420 | 7323 | 3-1674 | 4770 | 5364-C | 5917-A |
| Dresser | F-535 | 21182 | 4-1862 | 4891 | 5364-E | 6260-C |
| TF5105 | | 21362 | 4-2045 | 4942 | 5413-B | 6260-D |
| Dominion | | | 12897 | 5171 | 5483-A | 6428-A |
| TF-5100 | | | 12921 | 5220 | 5483-B | 6577-A |
| | | | 21263 | 5321-A | 5600-A | 6656 |
| Canadian Steel Foundry | | | | 5321-B | 5600-B | 6673-A |
| | | | | 5321-C | 5600-C | 7207 |
| 26565 | | | | 5321-F | 5811-A | 42-CS-180 |
| | | | | 5321-H | 5869-A | |

FIG. 24H

| AAR Designation | Load Carrying Spring Condemning Free Height |
|---|---|
| D3 | 8 5/8" |
| D4 | 9 1/16" |
| D5 | 9 5/8" |
| D6 | 9 5/16" |
| D6A | 8 3/8" |
| D7 | 10" |

½" NORM.

5100

COUPLER

A

| Coupler Type | Min. Clearance Top of Shank to Striker Dimension "A" (inches) | Min. Clearance Spring Basket Top to Underside of Carrier Lip. Dimension "B" (inches) |
|---|---|---|
| F70,F71,F72,SF70 29 1/4" Length | 1 1/8" | 1 5/8" |
| F79,SF79 43" Length | 2 3/8" | 3 1/2" |

FIG. 25J
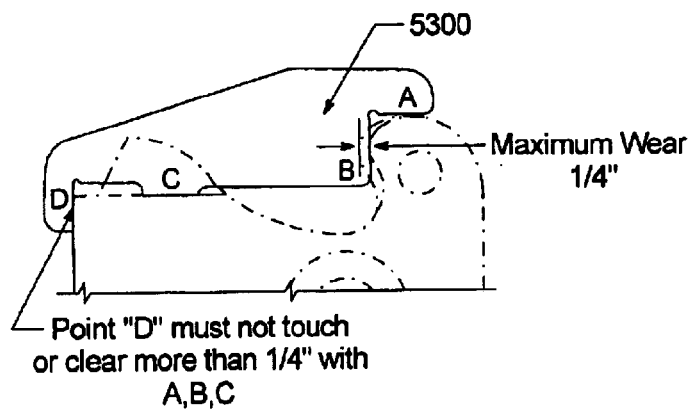
FIG. 25K
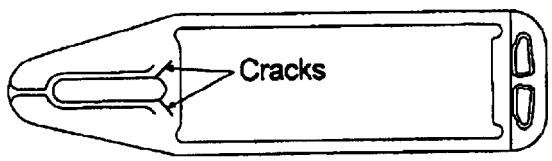
Y45, SY40, OR YS93 DESIGN YOKES
FOR USE WITH TYPE E COUPLER
Y41 DESIGN YOKES
FOR USE WITH TYPE E COUPLER
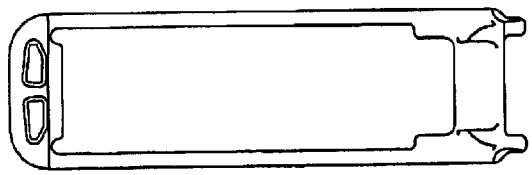
Y45 DESIGN YOKES
FOR USE WITH TYPE E/F AND F COUPLERS
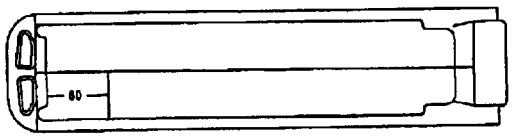
Y49 DESIGN YOKES
FOR USE WITH TYPE E/F AND F COUPLERS

METHOD AND ARRANGEMENT FOR INSPECTION AND REQUALIFICATION OF VEHICLES USED FOR TRANSPORTING COMMODITIES AND/OR HAZARDOUS MATERIALS

CROSS-REFERENCE TO PROVISIONAL APPLICATION

This application-claims priority from U.S. provisional patent application Ser. No. 60/157,058 filed Oct. 1, 1999, the entire disclosure of which is incorporated herein by reference.

BACKGROUND OF THE INVENTION

1. Field of the Invention

The invention relates generally to safety inspections and requalification of transport arrangements. More specifically, the invention relates to a method and arrangement for the inspection and requalification of tank cars and the like type of cargo carrying vehicles adapted to transport commodities including regulated and un-regulated materials.

2. Description of the Related Art

Until recently, the inspection process for Department of Transportation (DOT) specified rail-borne tank cars transporting either hazardous or non-hazardous commodities was relatively simple. The inspections consisted of hydrostatically testing the tank-car, typically performed on a 10-year interval. However, this conventional testing methodology only detected through-wall cracks and was insufficient to detect cracks that were slightly less than a through-wall crack. Consequently, some tanks failed shortly after being hydro-tested. HM-201, later codified in 49 C.F.R. Subpart F §§180.500 et al. (hereinafter 49 C.F.R. §180) was developed to provide a more comprehensive inspection process using a variety of non-destructive testing (NDT) methods. Namely, 49 C.F.R. §180 includes a (1) Visual Inspection, (2) Structural Inspection, (3) Service Life Shell Thickness Inspection, (4) Safety System Inspection, (5) Lining/Coating Inspection, and (6) Leakage Pressure Test.

As set forth in 49 C.F.R. §180.509, the visual inspection entails external and internal inspection of (1) the tank shell interior and exterior; (2) piping, valves, fittings, & gaskets; (3) missing or loose elements, (4) all closures and protective housings; (5) excess flow valves (when applicable), and (6) all the required markings on the Tank Car. The Structural Inspection requires, at a minimum, inspection of all transverse fillet welds greater than 0.25 inches within 4 feet of the bottom longitudinal centerline; the termination of longitudinal fillet welds greater than 4 feet from the bottom longitudinal center line; and all tank shell butt welds within 2 feet of the bottom longitudinal center line. These structural inspections may be performed by dye penetrant, radiography, magnetic particle, ultrasonic, or optically-aided tests. The Service Life Shell Thickness Inspection requires inspection of the thickness of the tank car shell, heads, sumps, domes, and nozzles with a device accurate to within +/−0.002 inches. A tank car with a shell thickness below a required minimum thickness (set forth in 49 C.F.R. §§179.100-6 and 179.101-1) may be permitted to continue operation under 49 C.F.R. §180.509 if certain additional criteria are met, set forth therein.

The Safety System Inspection requires, at a minimum, inspect the thermal protection systems, tank head puncture resistance systems, coupler vertical restraint systems, and systems used to protect discontinuities (i.e., skid protection and protective housings) to ensure their integrity. It also requires removing the safety relief device from the Tank Car and testing of the device with air or another gas to ensure that it conforms to the start-to-discharge pressure for the specification or hazardous material. The Lining and Coating Inspection requires, at a minimum, inspection of the lining or coating installed on the tank car according to the inspection interval, test technique, and acceptance criteria established by the owner of the lining or coating. Finally, 49 C.F.R. §180.509 requires a Leakage Pressure Test after re-assembly of a tank car or service equipment, wherein a tank car facility must perform a leak test on the tank or service equipment to detect leakage, if any, between manway covers, cover plates, and service equipment.

These inspections are generally to be performed on an inspection interval set in accord with the type of tank car and the transported commodity. For cars transporting materials not corrosive to the tank, the inspections above are to be performed at a maximum of every 10 years for the tank and service equipment. For non-lined or non-coated tank cars transporting materials corrosive to the tank, an interval (i) may be set in accord with the difference between the actual thickness and the allowable minimum thickness divided by the corrosion rate of the transported commodity, per year. In cases where a lining or coating is applied to protect the tank shell from the lading, the owner of the lining is charged to determine the periodic inspection interval, test technique, and acceptance criteria for the lining or coating. 49 C.F.R. §180 has since been supplemented by Alternative Tank Car Requalification Program, Appendix B to DOT-E 12095 (hereinafter "DOT 12095"). DOT 12095 is substantially similar to 49 C.F.R. §180; however, it eliminates the dependence of the allowable minimum thickness on corrosion and, instead, sets forth a list of forty corrosive materials in Attachment A thereto and, for non-lined and non-coated tanks, ties the tank shell thickness qualification frequencies to both the transport of a material listed in Attachment A and the measured remaining shell and head thickness. Thus, the revised standard provides more definite criteria for determination of tank thickness in the absence of corrosion rates required by the formula of 49 C.F.R. §180. However, DOT 12095 requires that owner's follow the alternative program provided therein to develop written procedures to ensure tank car safety, as required by 49 C.F.R §179.7(d), but places the burden, as 49 C.F.R. §180, on the owner's to develop qualification programs for each tank car, or a fleet of tank cars, identifying where to inspect, how to inspect, and the inspection criteria to complement the minimal guidance provided therein.

Other inspection guidelines have been issued to improve tank car safety. Rule 88.B.2 issued by the Federal Railroad Administration (FRA) requires, every five years, a "thorough inspection must be performed and repairs where necessary be made to the following: (1) Body bolsters and center plates; (2) Center sills; (3) Crossbearers; (4) Crossties; (5) Draft systems and components; (6) End sills; (7) Side sills; (8) Trucks; and (9) Car jackets. In addition, various AAR (Association of American Railroads) circulars prescribe inspection intervals and guidelines for stub sill tank cars based on a damage tolerance analysis (DTA) philosophy or at a default inspection interval of five years or 75,000 miles. However, the AAR Tank Car Stub Sill Inspection Program, requests owners to develop written procedures that encompass: (1) Identifying structurally significant components and welds; (2) a means of access to these components and welds, including removal of the jacket, insulation, or thermal coating, if required; (3) inspection techniques to ensure the detection of damage; and (4) proper identification, measurement, and reporting of cracks by line item on the required inspection report form (AAR Form SSIP).

Thus, to improve the level of safety and security with which hazardous materials can be transported from one place to another, it has been proposed to increase the requirements for the qualification and maintenance of tank cars which are used to transport such materials along the rail systems of the country. However, these requirements impose a significant burden on the tank car and tank car lining owners to develop and implement procedures to provide the mandated level of safety and ensure this level of safety between inspections of the tank cars, tank car linings, and appurtenant equipment. The actual manner in which the tests may be satisfactorily carried out have not been defined in terms sufficiently specific to detail just what type of tests are required and how these tests need to be actually carried out to ensure that all of the features and structures which tend to be at high risk, are examined in a proper manner. In other words, a worker skilled in the art of inspecting tank cars, even with many years of experience, would need guidance as to the totality of how many parameters to test for, how many sites need to be examined and with what equipment should the tests be implemented.

A further shortcoming in the art is that there has been no concerted effort to record the results which are derived and to compile this data in a form which will enable the status of each of the vessels, tanks bogies and the like which are inspected, to be tracked over a period of time and enable a relatively accurate prediction as to the status of each of a fleet of units.

Further, the revised inspection requirements impose additional and varied inspection cycles, including for example, unique test cycles for lined cars in corrosive service versus unlined cars in corrosive service. The cycle for unlined cars in corrosive service is determined by rate of corrosion versus remaining allowable shell thickness, whereas the cycle for lined cars in corrosive service is set to 10 years. However, for lined cars in corrosive service the service equipment must be inspected every five years, thus requiring the tank car to be brought in for inspection every five years. Additionally,there are two separate required stub sill inspections—SSIP and Rule 88.B.2, which may run on staggered inspection cycles. Therefore, for a given tank car, an SSIP inspection may be required and performed in year 1, a Rule 88.B.2 inspection may be required and performed in the following year, and a HM-201 inspection may be required and performed in year 3, the staggered sequence to be continued into future years.

Historically, the industry has deferred tank car inspections and maintenance as long as possible to minimize and defer immediate expenditures. Conventional wisdom, therefore, permits cars to be brought into a facility on multiple occasions over a 10 year period. Although in one respect this minimizes costs for a particular, it is inefficient over longer time periods. Further,the increased non-destructive testing mandated by 49 C.F.R. §180 is likely to increase backlogs at test facilities. The average time a car remains in the shop facility is approximately 30 days. In accord with common business practices, the tank car will "come off of lease" after five days of inactivity and rental credits are issued to the entity leasing the car since the entity does not want to be liable for periods of inactivity of the leased tank car. The increased inspection requirements will necessarily entail longer periods of tank car inactivity in the facility and increased backlogs, further resulting in additional losses to the facility due to cars coming off lease and staying off lease for longer periods. In short, the facility loses money if a tank car is brought in too frequently.

It is therefore evident that there is a need for some form of highly detailed inspection system to increase the interval between required inspections and reduce overall inspection costs.

SUMMARY OF THE INVENTION

The invention broadly provides a method of inspecting DOT specification tank cars, AAR tank cars and the like type vehicles which are used to transport commodities including both regulated (e.g. hazardous) and un-regulated materials that at the very least meets and/or exceeds currently imposed federal government standards and provides a level of certainty with respect features and structures which tend to be at high risk, and that accordingly enables the use, lease or sale of the units, with a high degree of confidence.

In one aspect of the invention, an inspection and requalification method for a wheeled vehicle adapted to transport commodities includes determining which type of vehicle is under inspection and selecting an exhaustive list of sites to be inspected for the identified type of vehicle from an instruction set. Each of the listed sites in accord with the instructions set forth for each of the listed sites in the instruction set and data derived from implementation of the tests conducted at each of the exhaustive list of sites is recorded.

In one aspect thereof, the exhaustive list of sites includes, for example, a visual structural integrity inspection of at least the following sites as applicable to an inspected tank car: at least one pad-to-tank weld, at least one sill-to-pad weld, at least one bolster-to-bolster pad weld, at least one BOV saddle weld, at least one sump weld, at least one BOV skid weld, at least one weld greater than about 0.25 inches located within approximately 4 feet of the bottom longitudinal centerline of said vehicle; and at least one draft sill weld.

In another aspect thereof, the invention includes an inspection and requalification procedure arrangement for a wheeled vehicle adapted to transport commodities, including compiling (a) a list of vehicle types, (b) an exhaustive list of sites to be inspected, for each type and structure of the vehicle, and (c) a list of inspection procedures for each of the listed sites. From these,a report list is produced recording data derived from implementation of the tests conducted at each of said exhaustive list of sites.

These and other aspects and advantages of the invention will be apparent to those skilled in the art from the following detailed description and accompanying drawings.

BRIEF DESCRIPTION OF THE DRAWINGS

The various features and advantages of the present invention will become more clearly appreciated as a detailed description of a preferred embodiment is given with reference to the appended drawings and several appendices, wherein:

FIG. 2 is a schematic representation of a tank car which is being inspected robotically using an arrangement which could be used with the present invention in order to assist in inspecting/measuring the interior of a cylindrical vessel which forms a vital part of the tank car structure;

FIG. 3 is a flow chart depicting the general procedure in accord with the present invention;

FIGS. 5A–5H depict an aspect of the enhanced inspection of tank car welds as they relate to tank cars built using the Richmond Tank Car Company (RIC) and WBR (original RIC design modified to include head brace) stub sill configurations in accord with the invention.

FIGS. 6A–6J show an aspect of the enhanced inspection of tank car welds as they relate to NAC/DEF-GHI built tank cars.

FIGS. 7A–7H depict an aspect of the enhanced inspection of tank car welds as they relate to Evans Railcar (EVA) and WBR (original EVA design modified to include head brace) stub sill configurations.

FIGS. 8A–8H depict yet another aspect of the invention wherein the detailed weld inspection relates to welds on tank cars built using ABC and JKL stub sill designs, such as those built by North American Car (NAC), AMF Beaird (AMF), Davie Shipbuilding Ltd. (DSL), and Hawker Siddeley Ltd. (HST).

FIGS. 9A–9G illustrate another aspect of the invention wherein the detailed weld inspection relates to welds on tank cars built using ACF-100 stub sill designs.

FIGS. 10A–10J depict another aspect of the invention wherein the detailed weld inspection relates to welds on tank cars built using the 200, 230, & 270 stub sill configurations.

FIGS. 11A–11H depict an aspect of the invention wherein the detailed weld inspection relates to welds on tank cars built using the TY3, 021, 022, and 023 stub sill designs.

FIGS. 12A–12H depict an aspect of the invention wherein the detailed weld inspection relates to welds on tank cars built using the ZBN stub sill design.

FIG. 13A illustrates a side view and a cross-sectional view of a tank car circumferential butt-welds.

FIGS. 14A–14C show various views of tank car circumferential butt welds in accord with ultrasonic inspection.

FIG. 15A shows a table of allowable safety relief valve pressure tolerances.

FIG. 17 is a flowchart illustrating a method of inspection in accord with the invention.

FIG. 18a is a table showing a liner condition acceptability matrix.

FIG. 18b shows a table of lining system operating characteristics.

FIG. 19 show a table used to assign a liner condition value in accord with a remaining life of the tank and inspection results in accord with the invention.

FIG. 20 shows models generated in accord with the invention for a blistering defect condition.

FIG. 21 shows models generated in accord with the invention for a cracking defect condition.

FIGS. 24a–h depict a visual truck inspection method.

DETAILED DESCRIPTION OF THE PREFERRED EMBODIMENTS

Figure 1:
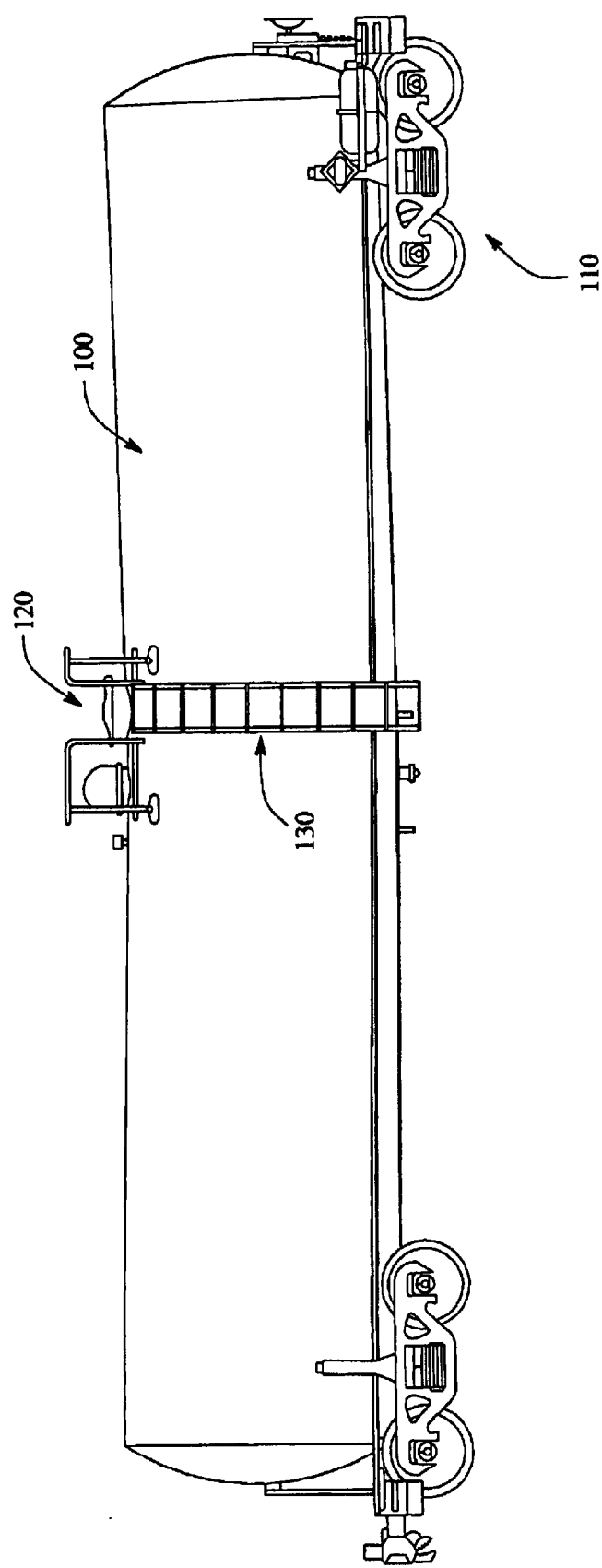
FIG. 1 is a side view showing a typical tank car configuration.

FIG. 1 depicts a typical tank car which is subjected to examination and requalification according to the present invention. As shown, this vehicle is used to transport commodities and possesses a tank structure 100 with wheeled carriages 110 connected to the underside. It should be noted that, independent of the type of tank car which is involved, the tank per se is invariably a self-contained structure sufficiently rigid/strong to support not only its own weight but the weight of the cargo which is introduced into the tank. The understructure includes two or more wheeled carriage members or bogies 110 secured to the tank, such as by connectors or by the weight of the tank itself, to complete the basic unit. While various other conventional structures, such as a hatch 120, ladder 130, etc., are illustrated, these elements will for brevity not be discussed.

FIG. 2 depicts a tank car being inspected robotically via an arrangement provided in U.S. Pat. No. 5,956,077 issued on Sep. 21, 1999 to Qureshi et al. As shown, the tip of the snake-like probe 200 is provided with a sensor 210. Sensor 210 can, for the purposes of the present invention, take the form of an ultrasonic sensor or any other form of non-destructive sensing arrangement. Alternatively and/or in addition to the sensor, the tip can be provided with a camera and powerful illumination means for facilitating tank interior inspection. This type of arrangement has merit in the instances that the tank has not been cleaned out to the degree that it is safe for a person or persons to physically enter the tank and perform the required inspections, tests and data recordation. Non-limiting examples of sensor types and configurations compatible with the present invention are provided in U.S. Pat. No. 5,256,966 issued on Oct. 26, 1993; U.S. Pat. No. 5,036,707 issued on Aug. 6, 1991 to Paciej et al.; U.S. Pat. No. 4,368,644 issued on Jan. 18, 1983 to Wentzell et al.; U.S. Pat. No. 4,658,649 issued on Apr. 21, 1987; U.S. Pat. No. 5,648,619 issued to Gustafsson et al. on Jul. 15, 1997; U.S. Pat. No. 4,490,833 issued to Inomata et al. on Dec. 25, 1984; or U.S. Pat. No. 5,619,423 issued on Apr. 8, 1997 to Scrantz.

It is to be noted, however, that these arrangements are only exemplary of devices/arrangements which can be used to inspect, repair both the interior and the exterior of the tanks and associated structural components, such as under frame, carriage, or wheels. It is to be further noted that these arrangements are only ancillary with respect to the crux of the invention which is seen as residing in the procedures and requirements set forth below. These procedures and requirements, although augmentable by sensors for various reasons including the safety of those implementing the procedure, do not necessarily require sensors and may equally be accomplished visually in conformance with applicable regulations, such as OSHA regulations, governing inspection of hazardous containers or "closed containers".

The inspection and requalification method and procedures in accord with the present invention, also referred to herein generally as the GE HM-201, includes the six basic types of inspection outlined in 49 C.F.R. §180. Namely, it includes a (1) Visual Inspection, (2) Structural Inspection, (3) Service Life Shell Thickness Inspection, (4) Safety System Inspection, (5) Lining and Coating Inspection, and a (6) Leakage Pressure Test. Significantly,the GE HM-201 methods and procedures provide a comprehensive and exhaustive list of sites to be inspected for the identified types of vehicles so as to enable a worker skilled in the art of inspecting tank cars as to the totality of tested parameters, the number of sites to be examined, and the equipment required for each test. Specifically, these GE HM-201 methods and procedures comprise, for each area or element to be inspected, a compilation of the requirements set forth in the relevant regulations and guidelines specific to that area or element, to be executed during the course of the inspection of that area or element. In other words, the present invention incorporates requirements of 49 C.F.R. §180, DOT 12095, Rule 88.B.2, and AAR CPC-1094 (i.e., Stub Sill Inspection Program II/III, hereinafter SSIP) into a universal inspection procedure designed to assure compliance with all aspects of relevant safety regulations for regulated tank cars. In addition, GE HM-201 is advantageously applied to non-regulated tank cars (i.e., those not regulated by DOT or the Federal Railroad Administration (FRA)). Still further, the requalification method and procedures of the invention are designed to align all inspection dates for all inspections by simultaneously performing all required procedures at once to minimize vehicle down time.

Figure 16:
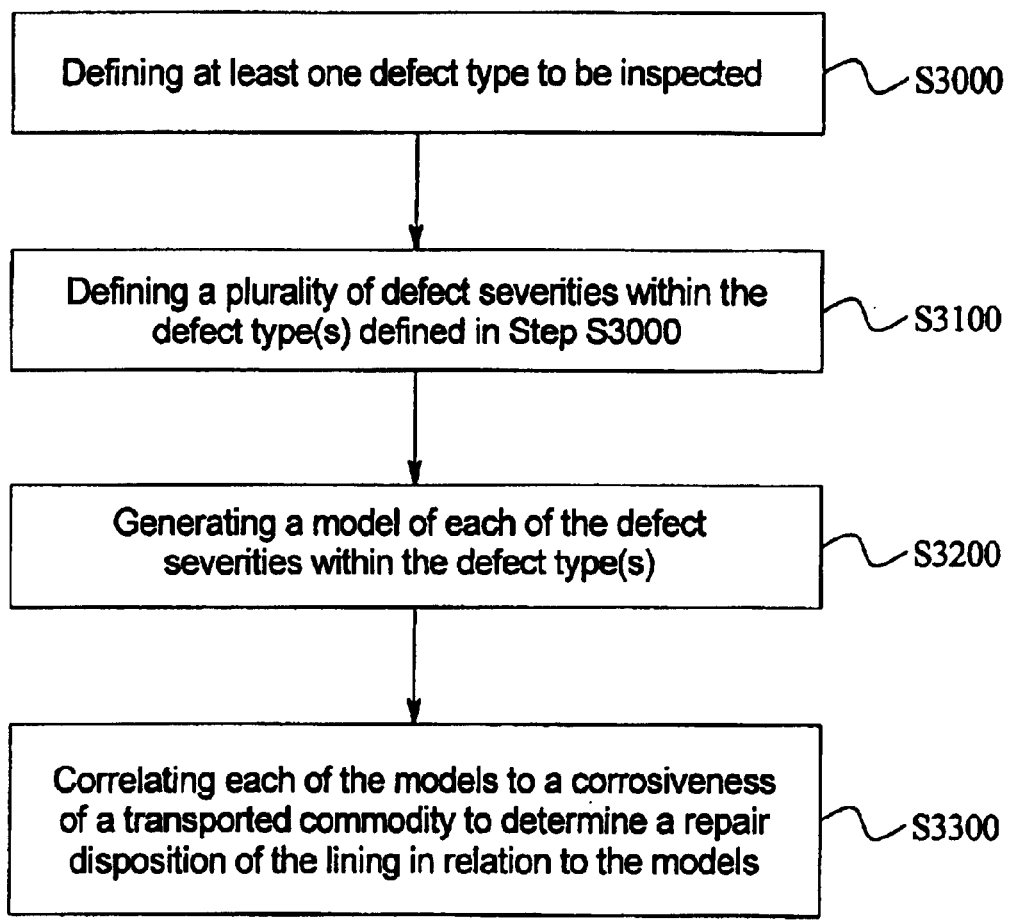
FIG. 16 is a flowchart illustrating a method of standardizing a test procedure in accord with the invention.

GE HM-201 additionally incorporates additional criteria not required by regulation and, in those respects, is broader than even the combination of all of above regulations. For example, the methods and procedures of GE HM-201 are applied not only to regulated commodities (i.e., "hazardous" materials) regulated by DOT and the Federal Railroad Administration(FRA) in, for example, 49 C.F.R. §180, DOT 12095, and Rule 88.B.2, but to all commodities transported by tank car. FIG. 16 shows that under GE HM-201, a corrosion rate is assigned to every commodity transported in a tank car (lined or unlined). This corrosion is preferably linked to the environment internal to the tank car used to transport the commodity. For example, vegetable oil (a non-regulated commodity) is a very aggressive commodity with respect to carbon steel, corroding the carbon steel at a rate of approximately 15 mils/year. However, vegetable oil is not-corrosive with respect to linings, such as product purity (PP) linings or corrosion linings. Thus, the corrosivity of the material depends on the tank shell material and the lining, if any. Using this example, vegetable oil is not a regulated commodity. Therefore, the commodity is not subject to 49 C.F.R. §180 and, under conventional practice, would not be inspected to this standard. In accord with the present invention, however, all commodities transported by tank car—regulated and un-regulated—may be inspected to the same standard, set forth herein.

As noted above, the requalification according to the present invention can be classified into six separate types of inspection delineated in 49 C.F.R. §180.509: (1) Visual Inspection, (2) Structural Inspection, (3) Service Life Shell Thickness Inspection, (4) Safety System Inspection, (5) Lining and Coating Inspection, and (6) Leakage Pressure Test. The flow chart in FIG. 3 depicts the general flow of the process in accord with the invention.

The visual inspection is generally performed in accord with steps 2001 to 2007. In step 2001, the visual inspection of both the interior and the exterior of the tank shell is carried out. Next in step 2002, a visual inspection of piping, valves, fittings, and gaskets are carried out. This is followed in step 2003 by a visual inspection of brake rigging, safety appliances, draft systems, valves and fitting. When this is completed, a visual inspection of all closures and protective housing on the tank car is carried out in step 2004, followed by a visual inspection of the required markings on the tank car in step 2005. In the event the tank car has an excess flow valve, as determined in step 2006, a visual inspection of this element is carried out in step 2007.

Generally, steps 2001 to 2007 are performed on all cars that require requalification under the guidelines of the 49CFR, Section 180.509 and Alternative Tank Car Qualification Program TCQ-1 Appendix B to DOT-E 12095. Further, it is preferred that these steps be performed on all tank cars going on an assignment order and on all tank cars that visually indicate mechanical or corrosion damage without regard to the qualification dates stenciled on the tank car or indicated by corresponding records. The visual inspections may be performed using any visual enhancement devices or aids, such as but not limited to flashlights, 10× power magnifiers, fiber optic boroscopes, mirrors, or a straight edge ruler.

Figure 4A:
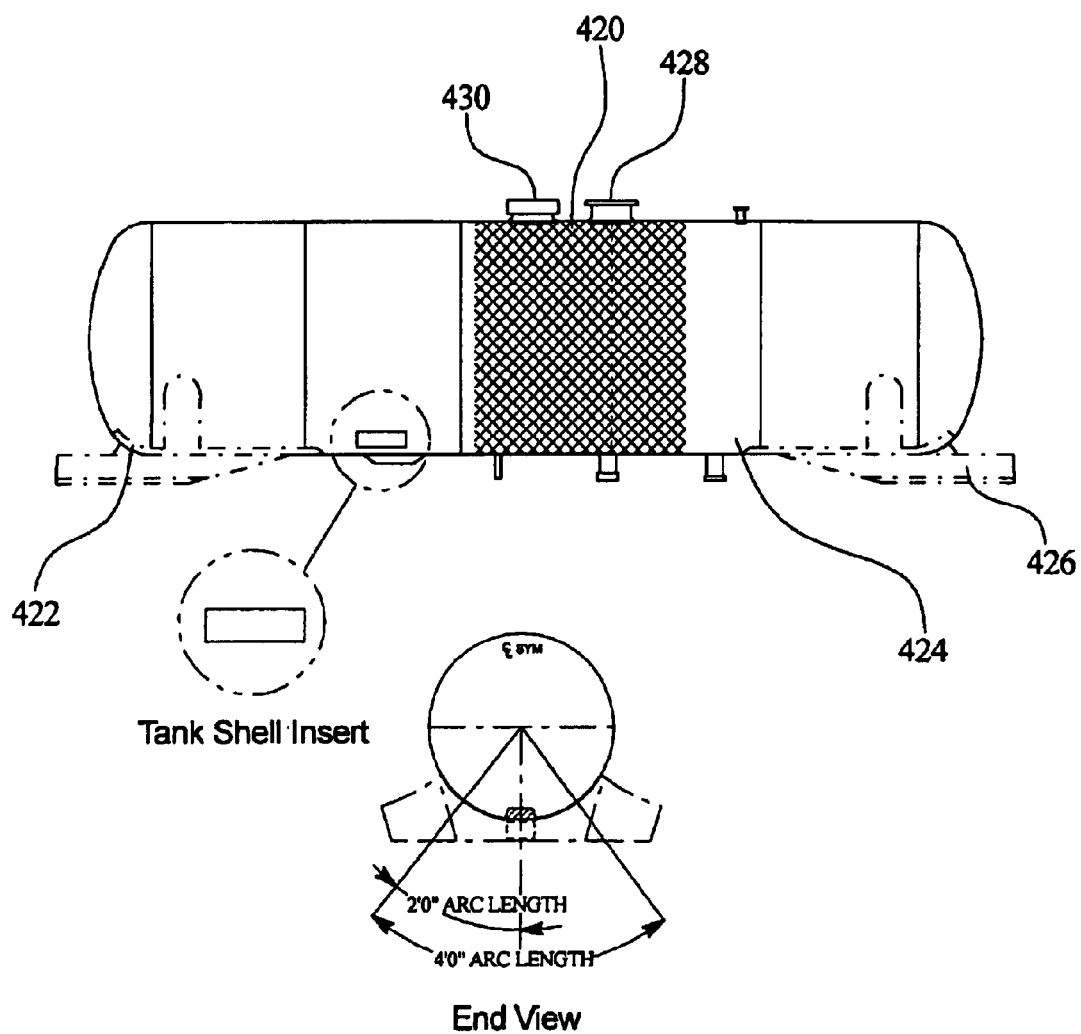
FIGS. 4A–4G illustrate various aspects of a visual inspection performed on a tank car in accord with the invention.

With reference to FIG. 4A, the tank shell interior and exterior inspection, step 2001, generally includes checking for dents, particularly in the area of the end of the bolster cradle (i.e. wheel burn) 422, which exceed the following rejection criteria. Dents are rejected as unacceptable if the dent radius is less than 4 times the tank shell thickness or if the dent shows signs of sharp transition or are bent abruptly, as shown for example, in Rule 98 illustration A of the AAR Field Manual. Dents are also typically rejected if they exceed 1" in depth, but may be accepted on a case-by-case basis. Further, any dents that exceed a depth of $\frac{1}{8}$" and a length of 1", a depth of $\frac{1}{4}$" and a length of $1\frac{7}{8}$", a depth of $\frac{1}{2}$" and a length of $2\frac{5}{8}$", a depth of $\frac{3}{4}$" and a length of 3", a depth of 1" and a length of $3\frac{3}{8}$", are rejected as unacceptable. Step 2001 also includes inspecting the area near the bolsters 422 for inward distortion (bending or buckling), if the distortion exceeds 2" from the true profile over a 6-foot span of the tank shell. Further, any gouges that exceed $\frac{1}{32}$" in depth are to be rejected, regardless of length. Naturally, if any of the above defects are found during the exterior inspection, a focused interior inspection in the area of the damaged should be conducted.

For jacketed tank cars, step 2001 includes a tank jacket inspection. The entire visible tank car jacket is inspected for abrasion, cracks, dents, distortions, defects in welds, or any other condition that prevents the jacket from protecting the insulation, maintaining commodity temperature, and protecting the exterior of the of the tank shell and coils from corrosion and mechanical damage. The tank jacket is visually inspected for corrosion and all areas that may allow for the insulation to become exposed to the outside environment should be rejected. All corroded areas should be inspected using a chipping hammer to ensure material integrity. Particular emphasis should be placed on the area of the centerband 420 around the loading platform and bottom outlet valves (not shown) due to commodity spillage from chemical service (i.e. acid, sulfur, asphalt, etc.). This inspection may require removal of excessive commodity spillage for an accurate inspection. Focus should also be placed in the area of the bottom of the tank jacket sheets 424 to detect moisture or evidence of moisture trapped between the jacket and shell. Additionally, this step includes inspection for jacket shifting around the body bolster 422, stub sill 426, manway 428, and service openings 430 and for damage or missing flashing that exposes the insulation to possible weather damage.

For non-jacketed tank cars, step 2001 focuses on the entire visible exterior surface of the tank shell and heads for abrasion, corrosion, cracks, dents, distortions, defects in welds, or any other condition that makes the tank car unsafe for transportation in accordance with the criteria listed in this procedure. The structural welds in the top section of the tank shell are inspected for defects such as, but not limited to, all detected cracks, which are to be considered relevant indications and are to be repaired, all welds having rounded indications if the major dimension exceeds 3/16", and all welds that exhibit more than one pore in 4" of weld. No pore shall be greater than 3/32" in diameter. In accord with other aspects of the invention, a more inclusive inspection of welds in the higher stress area of the bottom section of the tank will be performed during an Enhanced Visual Structural Inspection process, such as that later described in step 2008. The entire tank shell exterior is inspected for corrosion, focusing in the area of the centerband 420 around the loading platform and bottom outlet valves (not shown) due to commodity spillage from chemical service (i.e. acid, sulfur, asphalt, etc.) and noting particularly any indications of corrosion that exceed 8" across if the pits are greater than 1/32" in depth or that are less than 8" across and the pits are greater than 1/16" in depth. It may be necessary in some cases to remove excessive commodity spillage for an accurate inspection. This step also includes inspection for bent or fractured tank hold down rods (not shown).

For tank cars in chlorine service, the inspection in accord with the invention requires visual inspection of the draft sills outside of the jacket (inboard area) and around the bolster 422 for evidence of corrosion damage. Any evidence of corrosion damage is cause for stub sill thickness, and attachment weld evaluation in accord with criteria set forth below.

Lastly, the visual inspection requires inspection of the interior of the tank shell. The inspection of the interior of the tank shell in accord generally with the corrosion, weld defect, distortion, gouge, and dent acceptance criteria above may advantageously be performed in conjunction with other procedures requiring access to an interior of the tank shell Ultrasonic Thickness Inspections performed in accord with, for example, step 2013.

Next, in step 2002, the piping, valves, fittings, and gaskets are visually inspected for indications of corrosion and other conditions that make the tank car unsafe for transportation. Valves are inspected for any obvious signs of mechanical damage such as a bent nozzle or leaking commodity. With reference to the conventional tank car shown in FIG. 4C, manway 440 gaskets are inspected for cuts or abrasions and any evidence of leaking commodity. Also depicted in FIG. 4C are handrails 442, corner posts 444, safety valve 446, platform grating 448, ladder stile 450, step tread 452, support bracket 454, manway ring 456, and anti-skid coating 458, known to those skilled in the art.

Figure 4B:
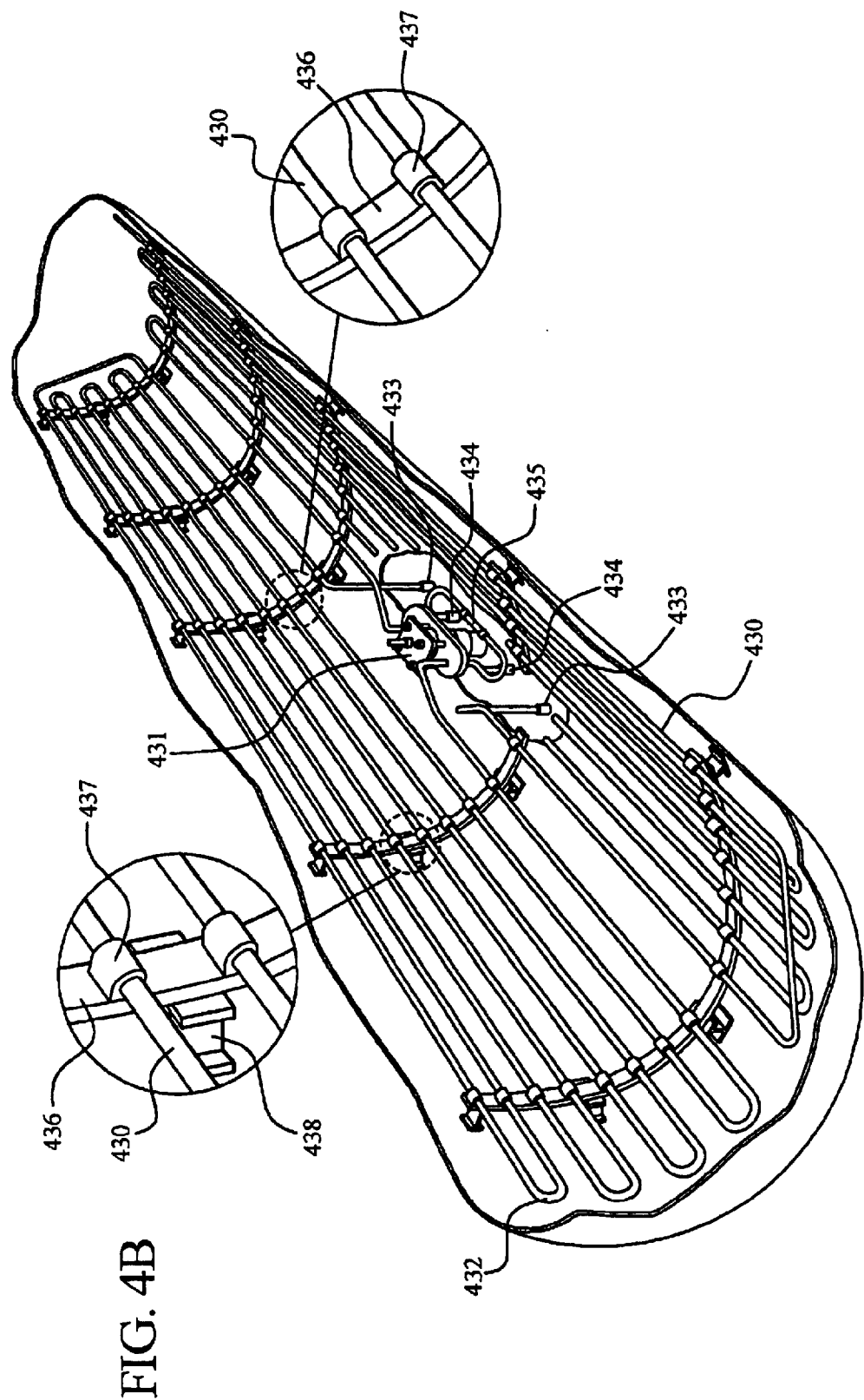
Figure 4C:
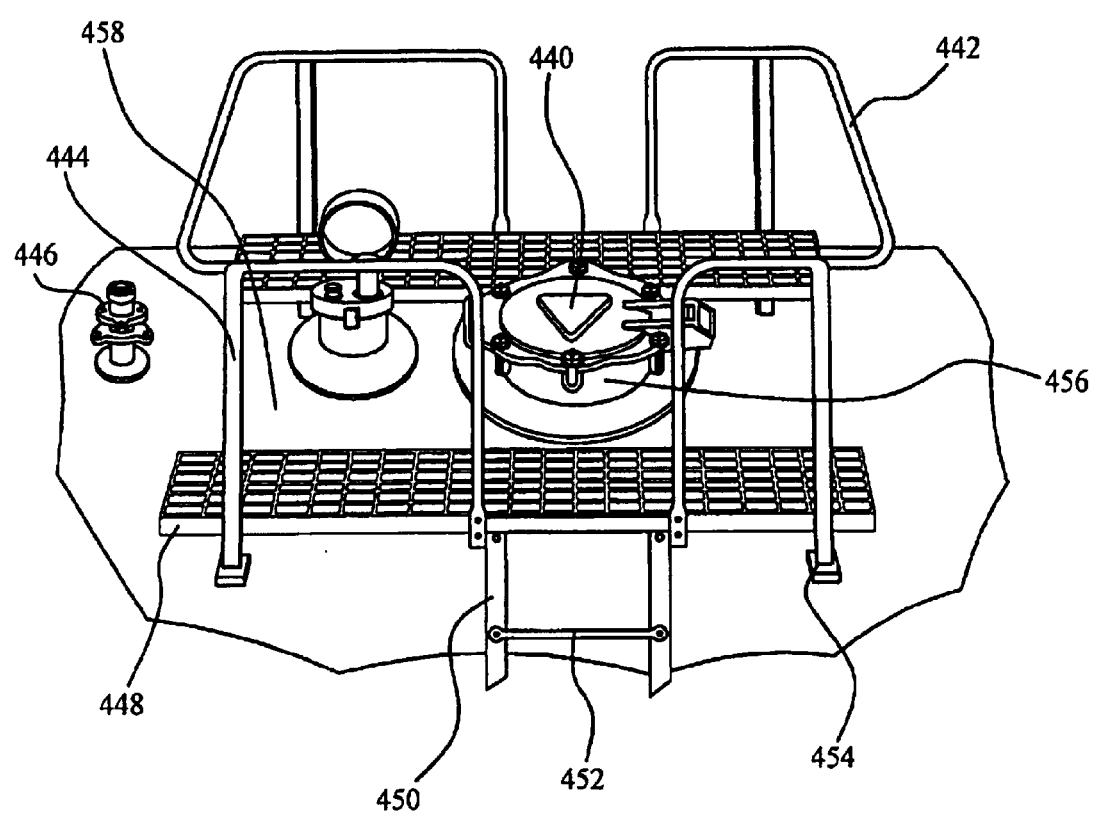
Figure 4D:
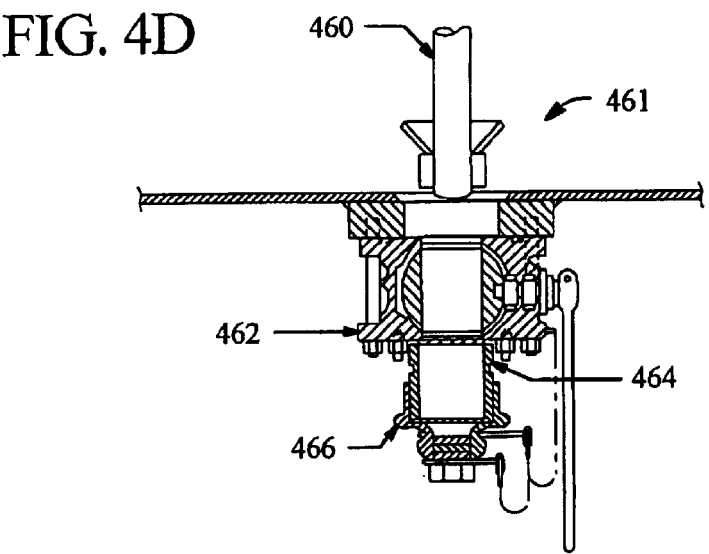

If the tank car is equipped with interior coils, as shown in the conventional tank car depicted in FIG. 4B, the interior coils 430 are inspected for corrosion and evidence of leaks. The coil leg nipple threads (not numbered) are also to be inspected to ensure the threads show no signs of wear, galling, elongation, or corrosion damage. The interior coils 430 are arranged, in a manner known to those skilled in the art, with bottom outlet assembly 431, coil return bend 432, coil inlet cap 433, coil outlet cap 434, cut-out valve 435, cradle bar 436, pipe clamp 437, and bar support 438. For those tank cars having eduction pipes, such as shown in FIG. 4D, the eduction pipes 460 are to be visually inspected for cracks in the welds and loose attachment to the accessory plate, as well as for any evidence of corrosion and mechanical damage. Also shown are the bottom outlet ball valve 462, the bottom outlet adapter 464, and the bottom outlet cap with plug 466. If the pipes are bent, battered, broken, or show signs of excessive corrosion they should be repaired or replaced. Further, the bottom of the eduction pipes 460, the eduction pipe guide 461, and the bottom of the tank in the area of the eduction pipe guide are visually inspected in this step, as applicable, for signs of wearing damage or interference.

Step 2003 relates to inspection for missing or loose bolts, nuts, and elements that may make the tank car unsafe for transportation. The dome platform, handrails, ladders, running board, brake rigging, pipe bracket, brake reservoir and pipe, brake piston and rod supports for loose nuts are to be visually inspected. Loose nuts are those that can be moved by hand without the aid of a hammer.

Step 2004 provides for inspection of the tank car closures in accord with the invention. Generally, all of the tank car closures and the protective housing are inspected for proper securement in a tool tight condition. For pressure tank cars, the protective housing assembly is visually inspected in step 2004 for corrosion and mechanical damage. If the housing assembly is bent, battered, broken, or shows signs of excessive corrosion it should be repaired or replaced. The swivel port covers are also inspected for proper operation and evidence of damage. If the swivel port covers are bent, battered, broken or shows signs of excessive corrosion they should be repaired or replaced. The dome hinge pin and brackets are also to be inspected for evidence of corrosion and mechanical damage. Further, the hinge pin bracket welds are to be inspected for defects (i.e. cracks, undercut, porosity, lack of penetration, etc.) and undersized welds. If the dome hinge pin assembly is bent, battered, broken, or shows signs of excessive corrosion it should be repaired or replaced. Also, the cover of the safety relief device is to be inspected for proper securement to the pressure plate. Regarding the pressure plate assembly, the pressure plate assembly is to be removed and both sides are to be inspected for corrosion and mechanical damage. If the pressure plate is bent, battered, broken, or show signs of excessive corrosion it should be repaired or replaced. All studs and threads are visually inspected for signs of wear, scoring, galling, elongation, and corrosion. If the studs are damaged or show signs of excessive corrosion they should be replaced. Also included in this step, the visual inspection is to ensure that all studs on the pressure plate, valves, and fittings have the stud marking (B7 or L7) visible on the exposed end of the stud. Remove and replace all studs not in compliance. Additionally inspected are the pressure plate and tank opening machined tongue and groove areas, bolt hole openings, and threads for excessive wear, gouges, nicks, scratches, and scoring. If the pressure plate shows signs of damage it should be repaired or replaced. If the tank opening shows signs of damage it should be repaired. After re-assembly of the pressure plate to the tank car, proper pressure plate attachment is verified.

For general purpose tank cars, step 2004 requires, in the preferred embodiment, visual inspection of the bottom outlet cap, bottom outlet nozzle, bottom outlet plug, manway cover, and manway nozzle, as described below. The bottom outlet cap, inclusive of the bottom outlet reducers, closures, and their attachments are inspected to ensure that they are secured to the car by a 3/8" chain or equivalent. All threaded surfaces and gasket seating surfaces are visually inspected for corrosion and/or mechanical damage and threads. Thread adequacy if determined, for example, using gages to determine for a 4" diameter cap, whether the inside thread diameter is 5.032" and the depth of threads (with no gasket) is 1 5/8" and, for a 6" diameter cap, whether the inside thread diameter is 7.782" and the depth of threads (with no gasket) is 1 1/2". Likewise, the threaded surfaces of the bottom outlet nozzle are visually inspected for corrosion and/or mechanical damage. The threads are inspected to determine for a 4" diameter nozzle, whether the outside thread diameter is 5.141" and the depth of threads is 1 5/8" and, for a 6" diameter nozzle, whether the outside thread diameter is 7.782" and the depth of threads is 1 1/2".

Additionally, step 2004 includes inspection of the bottom outlet plugs to ensure a ¼" chain secures the plugs. The manway cover is inspected for indication of warping or out-of-round condition. The manway cover gasket is to be removed and the mating surface cleaned. The mating surfaces should be inspected for cuts, corrosion, cracks, warping and other damage. Gouges and nicks are acceptable up to ⅛" in diameter and 1/32" in depth, however, no high spots allowed. Machined gasket surface shall be free of corrosion and rust. Surface finish to be a maximum of 500 micro-inches RMS. While the gasket is removed, the manway cover should be lightly closed to check to see if the hinge pin is free. Next, the gasket is reinstalled and the manway cover should be closed lightly, followed by a check to ensure that a minimum ⅛" clearance is maintained at all contact interference points.

The manway nozzle is also to be inspected in step 2004. The manway eyebolt assemblies are to be inspected for serviceability and pressure release provisions in accord with 49 C.F.R. §179.201-6. No cracks, corrosion or distortion are allowed. The assemblies are also inspected to ensure that the threads are not damaged and that there is no excess paint or residual commodity buildup. Any condition that prevents the nut engagement by hand is considered defective and must be repaired. The hinge pins are also inspected for wear or corrosion. A decrease of more than 25% of the original dimension shall be considered defective. The gasket-seating surface is inspected for nicks, gouges and other defects and no defects are allowed if they are greater than 1/32" deep and are continuous across the gasket surface. To determine whether or not there is raised metal, a straight edge may be used. Surface finish is to be a maximum of 500 micro-inches RMS.

Figure 4E:
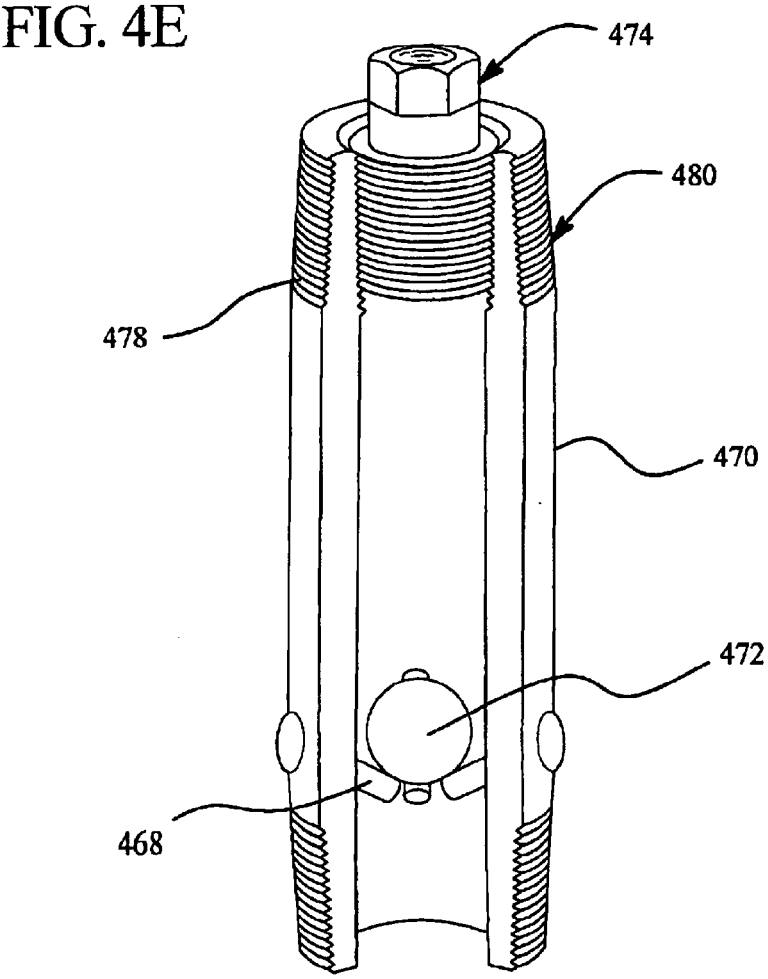
Figures 4F, 4G:
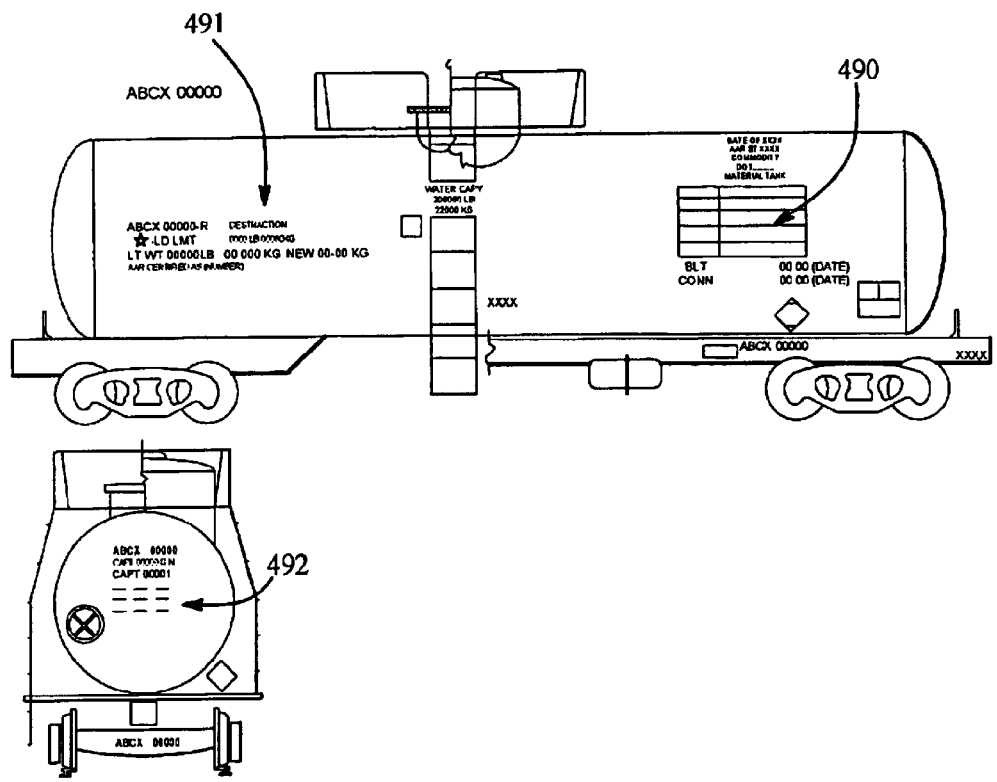

In step 2005, all required markings on the tank car are visually inspected to ensure they are present and legible. When the car successfully passes the requalification process of the present invention in accord with subsequent steps detailed herein, the exterior of the tank car is to be stenciled with, at a minimum, all marking requirements in the AAR Manual of Standards and Recommended Practices, Section C—Part III, Appendix C Markings of Tank Cars. Non-limiting examples of locations and types of marking are shown in FIG. 4F, as represented by reference numerals 490, 491, and 492. The marking indicated by reference numeral 490 is depicted in greater detail in FIG. 4G.

In step 2006, it is determined whether the tank car has excess flow valves. A conventional excess flow/check valve is depicted in FIG. 4E. For pressure tank cars in chlorine service, the excess flow/check valve is visually inspected in step 2007 in accord with the Chlorine Institute's Pamphlet 42. For other pressure tank cars, the excess flow/check valve is visually inspected in step 2007 by removing the threaded seat 480 and inspecting the threads 478 for burrs, broken, rough or flat threads and the seat surface (not shown) for smoothness, excessive corrosion and conformance to the latest issue of the manufacture's drawing. If the seat 480 or plug 474 is damaged or out of round, it should be repaired or replaced. The ball 472 should then be removed from the body 470 and inspected for roundness, nicks, scratches, smoothness, corrosion, and magnetic qualities. If the ball 472 is damaged it should be replaced. If the ball 472 is magnetic, it should be discarded and replaced according to the manufacturer's specification. The body 470 is to be checked to ensure that the pins 468 are in the correct position according to the manufacturer's drawing and are welded into place with no grinding or wrench teeth marks on the welds. If the pins 468 are bent, battered, or broken, or show signs of cracking they should be repaired or replaced. Then, the ball 472 is replaced in the body 470 and the seat 480 is screwed, hand-tight, into the body using a light application of a non-reactive lubricant on the threads 478 to minimize thread galling.

Following inspection of the excess flow valve or determination that such a valve is not present on the tank car is steps 2006 or 2007, an enhanced visual inspection of all fillet welds greater than ¼" connecting at least two components (i.e., attachment welds) which are within 4 feet of the bottom longitudinal center line of the tank is carried out in step 2008, as described below in greater detail in preferred embodiments of this step.

Figure 5A:
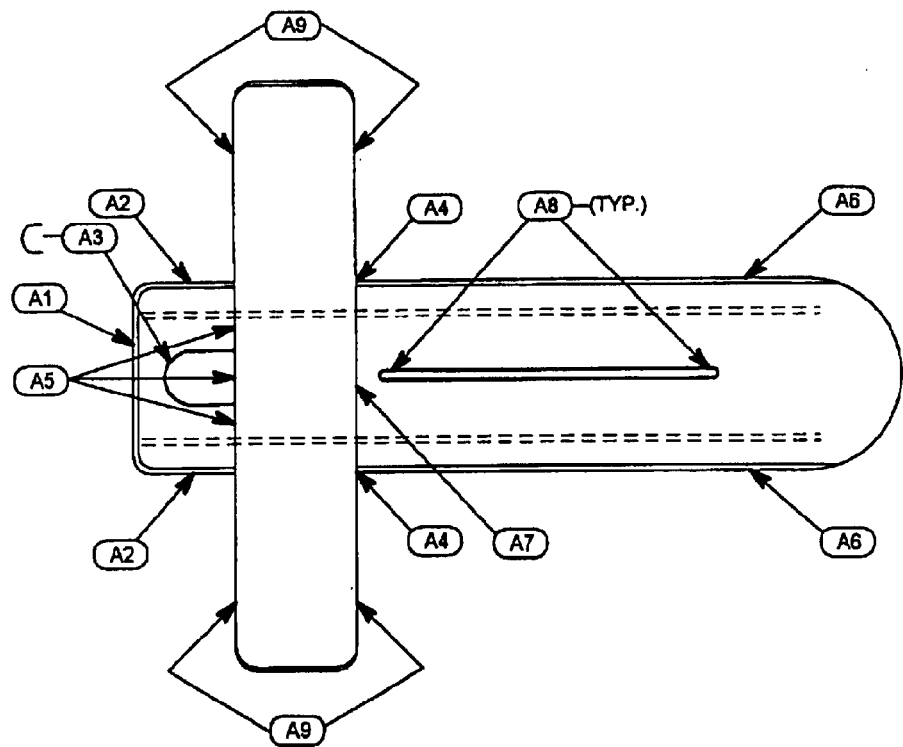

In accord with the enhanced visual inspection of weld in step 2008, weld visual inspections are depicted in FIGS. 5A–5H for attachment welds on all tank cars built using the Richmond Tank Car Company (RIC) and WBR (original RIC design modified to include head brace) stub sill configurations to ensure the inspections conform the specifications of the FRA and AAR. The weld inspections listed above and depicted in FIG. 5A are visual inspections and may be performed using any visual aid, such as but not limited to flashlights, 10×-magnifiers, straight edge rulers, step gauges, or tape measures. It is also desired that the weld surface condition be conducive to visual inspection. Namely, welds should not exhibit excessive oil, grease, dirt, lint, or any other contaminant that may prevent the detection of a weld defect and must be cleaned, as necessary, to permit inspection and it is to be understood that cleaning of weld surfaces should not be performed with solvents or materials that would interfere with the serviceability of the component or weldment under inspection. Welds are also to be visually inspected prior to applying any type of paint, lining, or any other coating that may prevent the detection of a defect.

It is preferred that the following data be recorded. First, the location on the car where the weld crack was located is specified in a manner specific to the weld code that is being inspected (e.g., A-End). Second, the weld code that represents which weld had a weld crack (e.g., A1). Third, the length of the weld crack in inches (e.g., 3.3 inches). Fourth, the defect location code where on the weld the crack was located (e.g., PPM or pad parent metal). Typical defect location codes include, for example, BBPM (Bolster Bottom Cover Parent Metal); BCPM (Bolster Top Cover Plate Parent Metal); BPPM (Bolster Pad Parent Metal); BWPM (Bolster Web Parent Metal); PPM (Pad Parent Metal); SCPM (Side Cover Plate Parent Metal); SDPM (Saddle Parent Metal); SKPM (Skid Parent Metal); SPM (Sill Parent Metal); SUPM (Sump Parent Metal); TMP (Tank Parent Metal); TPM (Tank Parent Metal); WBBC (Weld Bolster Bottom Cover); WBSC (Weld Bolster Web-to-Side Cover); WBSW (Weld Bolster Stiffener-to-Web); WBTP (Weld Bolster Web-to-Pad); WBTS (Weld Bolster Web-to-Sill); WTK (Weld Toe-to-Skid); WTP (Weld Toe-to-Pad); WTS (Weld Toe-to-Sill); WTSD (Weld Toe-to-Saddle); WTT (Weld Toe-to-Tank); WTU (Weld Toe-to-Sump), and OTH (other). Fifth, the repair procedure corresponding to the detected defect is recorded. Although the above example relates to a weld crack, the data recorded above is similarly applicable to other types of defects, such as weld undercut, weld porosity, and rounded indications. Inspected welds are considered a defect and must be repaired if they meet or exceed the following limits. Weld cracks should not exceed 1/16" in width and: ½" in length. However, any crack indications below these limits are considered relevant indications and must be repaired. Weld undercuts should not be in excess of 0.010" and shall not reduce the thickness below the minimum tank side of fillet welds. Regarding weld porosity, no more than one pore in each 4" of weld is permitted and no pore exceeding 3/32" diameter is allowable. Circular or elliptical indications with a width of 1/16" and length equal to or less then 3/16" should also be considered a defect.

FIG. 5A depicts preferred pad-to-tank welds inspected in accord with the invention shown in step 2008. Weld locations are shown as reference numerals A1 through A9. Weld A1 inspection satisfies HM-201, SSIP, and 88.B.2 requirements and is a front sill pad-to-tank transverse weld located at the A and B ends of the tank car. The full length of the weld is inspected, including a portion located around a corner of the pad. Weld A2 inspection satisfies HM-201, SSIP/3, and 88.B.2 requirements and depicts front sill pad longitudinal welds at the A-end right and left and B-end right and left locations. The full length of the weld is inspected to its termination at the bolster pad. Weld A3 inspection satisfies HM-201 and depicts a fillet weld in the front sill pad-to-tank cutout at the A and B ends. The full length of the weld is inspected. Weld A4 inspection satisfies HM-201 requirements and depicts cradle pad longitudinal welds having outboard termination at the A-end right and left and B-end right and left locations. The six inches of the weld from its termination point are inspected. Weld A5 inspection satisfies HM-201 requirements and is a front sill pad-to-bolster pad transverse weld located at the A and B ends. The full length of the weld is inspected. Weld A6 inspection satisfies HM-201 requirements as well as Rule 88.B.2 requirements and depicts inboard termination of cradle pad longitudinal welds at the A-end right and left and B-end right and left locations. The last six inches of the weld to termination are inspected. Weld A7 inspection satisfies HM-201 requirements and depicts a cradle pad-to-bolster pad transverse weld located at the A and B ends. A full length of the weld is inspected. Weld A8 inspection satisfies HM-201 and depicts cradle pad-to-tank slot welds located at the A and B ends and are further disposed at between about 2 to 16 places per tank car. The last 6" of the weld at each end of the slot are inspected. Finally, weld A9 inspection satisfies HM-201 and depicts a bolster pad-to-tank transverse weld located at the A end outboard and inboard sides on the right and left of the tank car and also located at the B end outboard and inboard sides on the right and left of the tank car. The 36" span from the junction with the cradle pad is inspected.

Figure 5B:
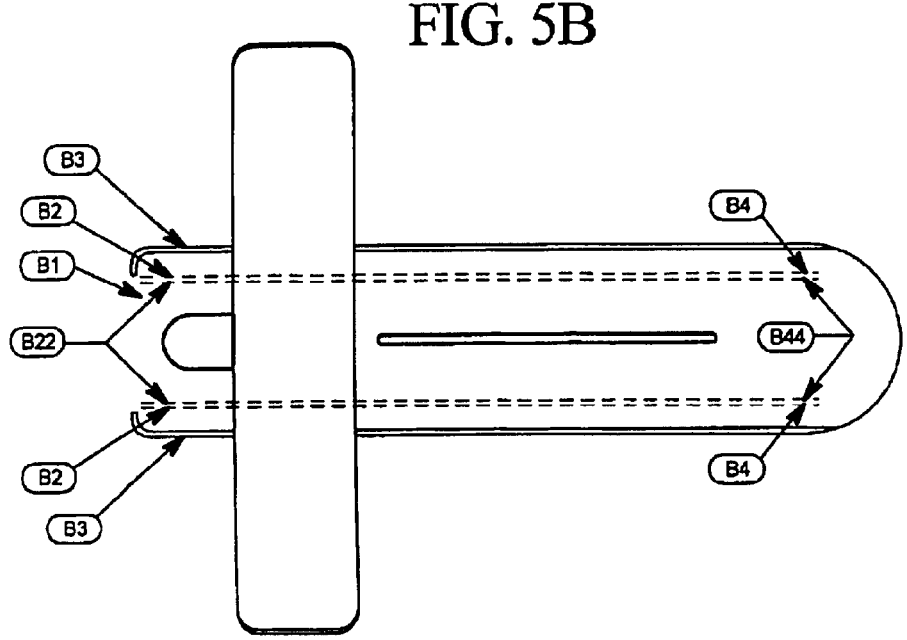

FIG. 5B represents sill-to-pad welds inspected in accord with the invention. The weld locations are shown as reference numerals B1 through B44. Weld B1 satisfies SSIP and 88.B.2 requirements and depicts transverse welds at the top of the sill flange at the A and B ends. A full length of the weld is inspected from the top of the sill. Weld B2 satisfies 88.B.2 requirements and depicts outboard termination of a longitudinal weld outside of the sill at the A and B end right and left positions. The last 6" of the weld to termination is inspected. Weld B3 satisfies SSIP and 88.B.2 requirements and depicts transverse welds at a bottom of the top sill flange at the A and B ends. A full length of the weld from the inside of the sill is inspected. Weld B4 satisfies 88.B.2 and depicts inboard termination of a longitudinal weld outside the sill at the A and B end left and right positions. The last 6" of the weld, including any portion of weld that wraps around sill and connects with B44, is inspected. Weld B22 satisfies rule 88.B.2 and depicts outboard termination of a longitudinal weld inside the sill at the A and B end left and right positions. The last 6" of the weld is inspected. Weld B44 satisfies rule 88.B.2 and depicts inboard termination of a longitudinal weld at an inside of the sill at the A and B end left and right positions. The last 6" of the weld is inspected.

FIG. 5C represents bolster-to-bolster pad welds inspected in accord with the invention. The weld locations are shown as reference numerals SB1 and E2. Weld SB1 satisfies rule 88.B.2 requirements and includes bolster web, bolster pad, and stiffener welds inboard of bolster from the outside edge of side bearing pad to draft sill and SBI along the A and B end left and right sides. A full length of the weld is inspected. Weld E2 also satisfies rule 88.B.2 requirements and depicts a bolster bottom cover plate to sill flange longitudinal weld located at the A and B end left and right sides. A full length of the weld is inspected.

Figure 5D:
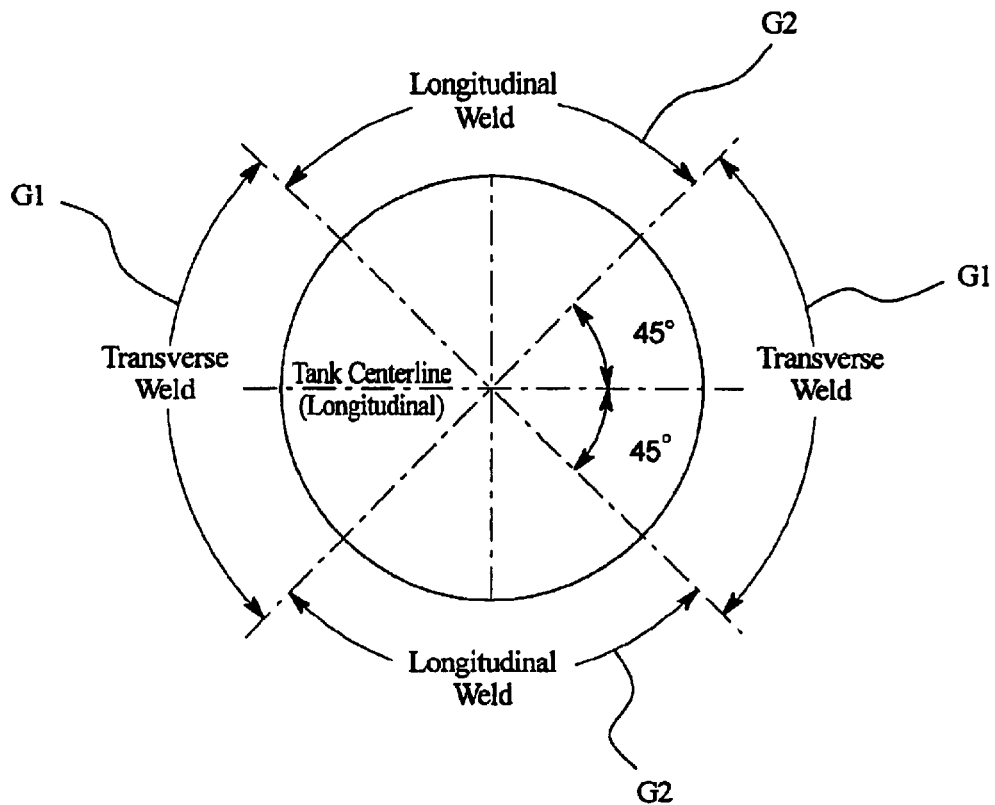

FIG. 5D represents BOV saddle welds inspected in accord with the invention. The weld locations are shown as reference numerals G1, G2, and G1*a–c* to G2*a–c,* with groupings (e.g., G1*a* and G2*a*) representing different compartments. A single tank car may have multiple compartments or cells, each with its own loading and unloading devices, which would include a separate sumps and bottom outlet valve (BOV) from which the commodity would be loaded and unloaded. Each of the welds depicted satisfies rule HM-201 requirements. For simplicity, only BOV saddle welds G1 and G2 in Compartment #1 are shown, in cross section, wherein G1 includes transverse portions of BOV saddle weld and G2 includes longitudinal portions of the BOV saddle weld, each located in two places per car. A full length of transverse and longitudinal portions of the weldsare inspected. Similarly, weld locations G1*a*/G2*a* in compartment #2, weld locations G1*b*/G2*b* in compartment #3, and weld locations G1*c*/G2*c* in compartment #4 respectively represent transverse and longitudinal portions of BOV saddle welds in two places per car. A full length of transverse and longitudinal portions of the welds are inspected.

Figure 5E:
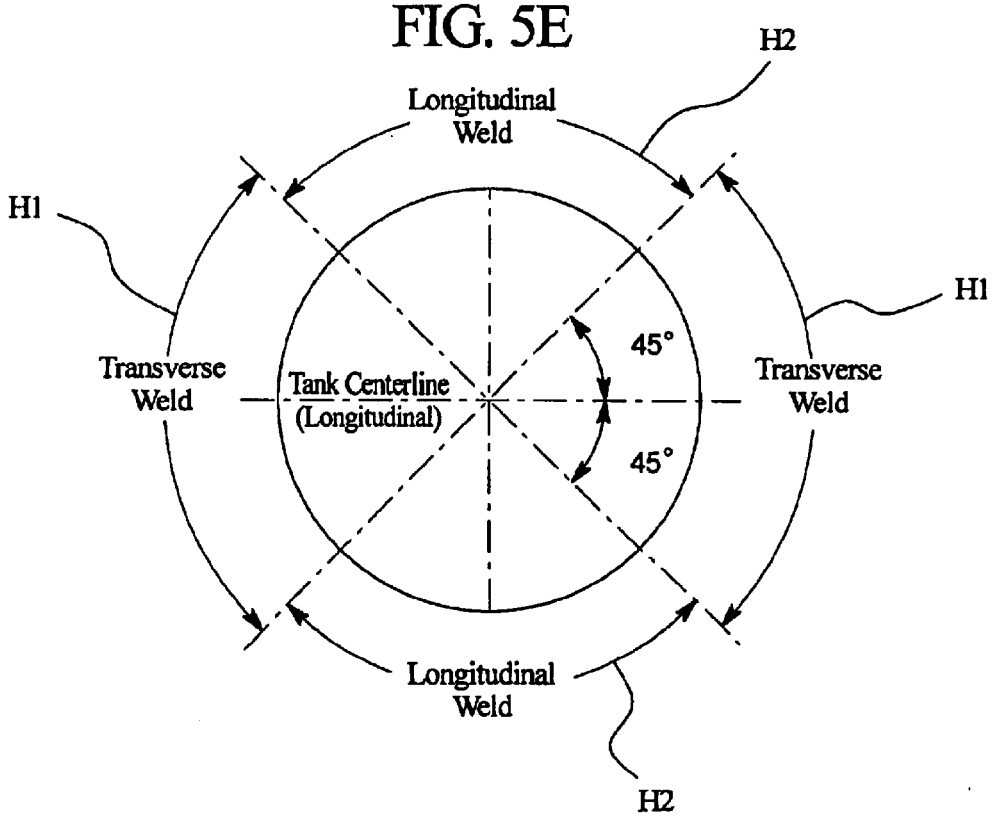

Similarly, FIG. 5E represents sump welds inspected in accord with the invention. The weld locations are shown as reference numerals H1, H2, and H1*a–c* to H2*a–c,* with groupings (e.g., H1*a* and H2*a*) representing different compartments. Each of the welds depicted satisfies rule HM-201 requirements. For simplicity, only welds H1 and H2 in Compartment #1 are shown, in cross section, wherein H1 includes transverse portions of BOV sump welds and G2 includes longitudinal portions of the BOV sump welds, each located in two places in the tank car, as shown in FIG. 5E. A full length of transverse and longitudinal portions of the welds are inspected. Similarly, weld locations H1*a*/H2*a* in compartment #2, weld locations H1*b*/H2*b* in compartment #3, and weld locations H1*c*/H2*c* in compartment #4 respectively represent transverse and longitudinal portions of BOV sump welds in two places per car. A full length of transverse and longitudinal portions of the welds are inspected.

Figure 5F:
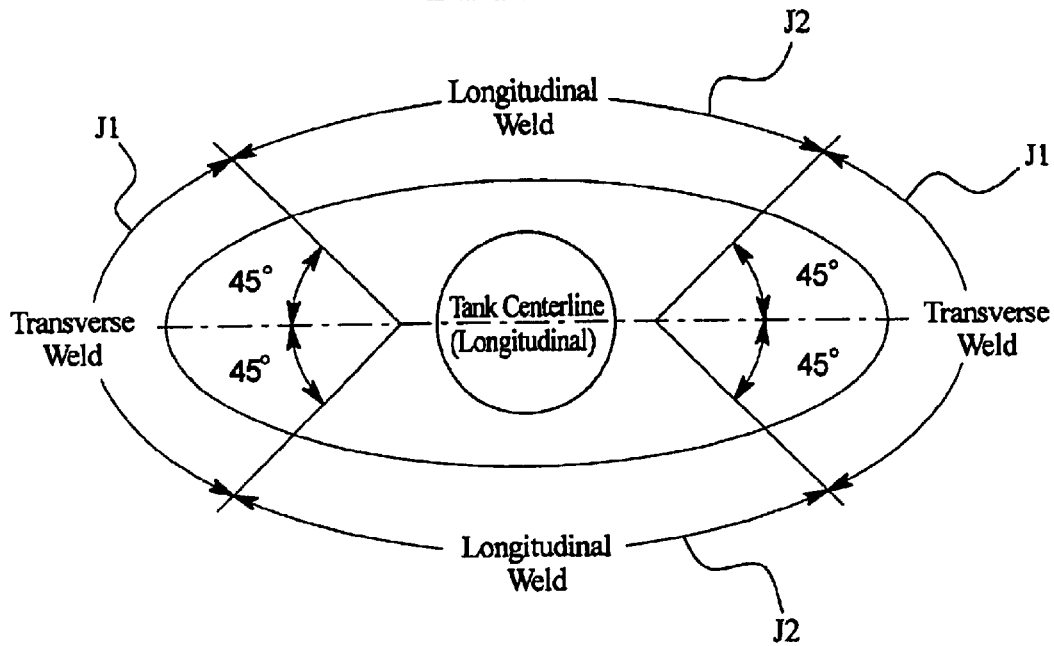

FIG. 5F depicts BOV skid welds inspected in accord with the invention. The weld locations are shown as reference numerals J1, J2, and J1*a–c* to J2*a–c,* with groupings (e.g., J1*a* and J2*a*) representing different compartments. Each of the welds depicted satisfies rule HM-201 requirements. For simplicity, only welds J1 and J2 in Compartment #1 are shown, in cross section, wherein J1 includes transverse portions of BOV skid welds and J2 includes termination of BOV skid longitudinal welds, each located in two places in the tank car, as shown in FIG. 5F. A full length of the transverse welds are inspected and a termination of the longitudinal welds are inspected. Similarly, weld locations J1*a*/J2*a* in compartment #2, weld locations J1*b*/J2*b* in compartment #3, and weld locations J1*c*/J2*c* in compartment #4 respectively represent transverse portions of BOV skid welds and terminations of BOV skid longitudinal welds in two places per car. A full length of the transverse welds are inspected and a termination of the longitudinal welds are inspected.

Figure 5G:
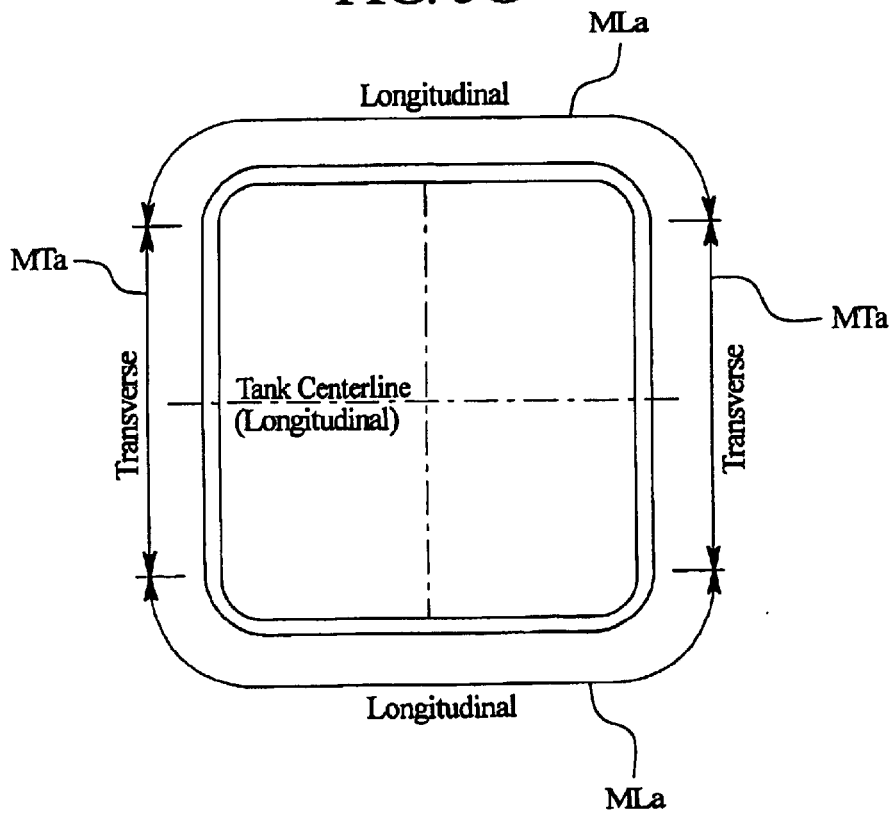

FIG. 5G shows miscellaneous transverse and longitudinal welds inspected in accord with the invention and in accord with HM-201. The transverse welds are designated MTa, MTb, MTc, and MTd, of which only MTa is shown. Likewise, MLa, MLb, MLc, and MLd are the longitudinal welds, of which only MLa is shown. These welds are located at the A end right and left side and at the B end right and left side. A full transverse and longitudinal length of the welds are inspected accordingly.

In addition, the following draft sill welds are inspected in accord with the invention and in accord with Rule 88.B.2. Splice plates welds (MSa) at the A and B ends are inspected along a full length of the welds. Wing bar welds (MSb) are inspected at the A end, left and right portions, and at the B end, left and right portions. These are inspected along a full length of the weld. Vertical Stiffeners (MSc) located at the A and B ends are inspected along a full length of the weld. Further, slot welds (MSd) are inspected at the termination of the welds.

Further, there are some welds which must be inspected inside the draft sill pocket. It is preferred that a flexible boroscope be used to inspect in remote areas. For non-jacketed cars with sill reinforcement pads (knuckle pads), these additional welds include longitudinal sill to reinforcement pad welds between draft lugs; transverse sill to reinforcement pad weld; longitudinal sill to reinforcement pad slot welds (cars with slotted reinforcement pad/sill connections); and longitudinal sill to reinforcement pad welds above rear draft lug assemblies. For jacketed cars with sill reinforcement pads (knuckle pads), these additional welds include longitudinal to draft sill/reinforcement pad welds outside of the sill; transverse draft sill/reinforcement pad, outboard; longitudinal reinforcement pad to tank sill welds; and transverse reinforcement pad to tank shell head. A full length of the body bolster attachment welds are inspected, as applicable. For non-jacketed cars without sill reinforcement pads, such as the NAC/Beaird Design, the welds to be inspected include the top center 'CZ' angle butt weld; longitudinal draft sill to tank shell welds (between draft lugs; inside transverse draft sill to tank shell welds (outboard & inboard); longitudinal draft sill to tank shell slot welds; transverse draft sill to tank shell slot welds; and longitudinal draft sill to tank shell welds (from rear lugs inboard toward center fillers). For jacketed cars without sill reinforcement pads of a similar design, the welds to be inspected include the longitudinal draft sill to tank shell welds, to be inspected along a full length back to body bolster attachments; and transverse draft sill to tank shell (seal) welds. Further, for both jacketed and non-jacketed tank cars with or without sill reinforcement pads, the front and rear draft stops and gusset welds are to be inspected.

Figure 5H:
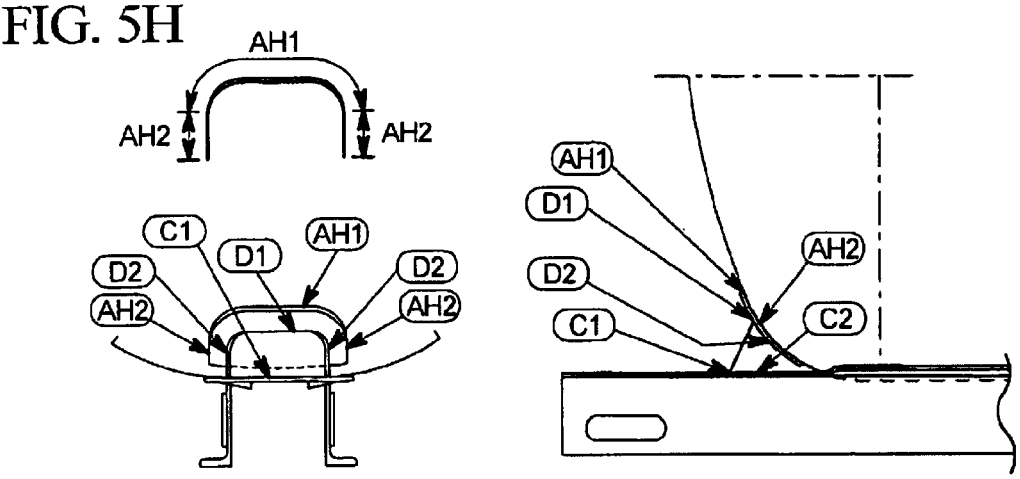

FIG. 5H shows headbrace welds for headbrace cars inspected in accord with the invention. The AH1 weld location is inspected to satisfy both HM-201 and SSIP requirements and depicts the headpad extension transverse weld located at the A and B ends. A full length of the weld is inspected, including weld around corner of pad. Weld AH2 inspection meets HM-201 and SSIP requirements and depicts the headpad extension longitudinal welds located at the A and B ends at the left and right sides. A full length of these welds is inspected, but does not include weld on the corner of the pad. Weld C1, on the other hand, meets SSIP and rule 88.B.2 requirements and shows a headbrace-to-sill transverse weld located at the A and B ends. A full length of the weld including a portion which curves around the corner of the headbrace is inspected. Weld C2, also meets SSIP and rule 88.B.2 requirements and shows a headbrace-to-sill longitudinal weld located at the left and right sides of the A and B ends. A full length of the weld is inspected.

Welds D1 and D2 satisfy SSIP and rule 88.B.2 requirements and show, respectively, a headbrace-to-pad transverse weld located at the A and B ends and a headbrace-to-pad longitudinal weld located at the left and right sides of the A and B ends. A full length of these welds is inspected and the inspection of the D1 weld includes corners. In accord with the enhanced visual inspection of weld in step 2008, weld visual inspections are depicted in FIGS. 6A–6H for attachment welds on NAC/DEF-GHI built tank cars to ensure the inspections conform the specifications of the FRA and AAR. The weld inspections listed above and depicted in FIGS. 6A–6H should conform to the general requirements, equipment, and acceptance criteria specified above. Similarly, it is preferred that data be recorded as noted above. To reiterate, first, the location on the car where the weld crack was located is specified in a manner specific to the weld code that is being inspected(e.g., A-End). Second, the weld code that represents which weld had a weld crack (e.g., A1). Third, the length of the weld crack in inches (e.g., 3.3 inches). Fourth, the defect location code where on the weld the crack was located (e.g., PPM or pad parent metal). Fifth, the repair procedure corresponding to the detected defect is recorded.

FIG. 6A depicts preferred pad-to-tank welds inspected in accord with this aspect of step 2008. The weld locations are shown as reference numerals A1 through A9. Weld A1 inspection satisfies HM-201, SSIP/3, and 88.B.2 requirements and is a front sill pad-to-tank transverse weld located at the A and B ends of the tank car. The full length of the weld is inspected, including a portion located around a corner of the pad. Weld A2 inspection satisfies HM-201, SSIP/3, and 88.B.2 requirements and depicts front sill pad longitudinal welds at the A-end right and left and B-end right and left locations. The full length of the weld is inspected to its termination at the bolster. Weld A3 inspection satisfies HM-201 and depicts a fillet weld in the front sill pad-to-tank cutout at the A and B ends. The complete weld is inspected. Weld A4 inspection satisfies HM-201 requirements and depicts cradle pad longitudinal welds having outboard termination at the A-end right and left and B-end right and left locations. The six inches of the weld from its termination point are inspected. Weld A5 inspection satisfies HM-201 requirements and is a front sill pad-to-bolsterpad transverse weld located at the A and B ends. The complete weld is inspected. Weld A6 inspection satisfies HM-201 requirements and depicts inboard termination of cradle pad longitudinal welds at the A-end right and left and B-end right and left locations. The last 24" of the weld, including wrap around to weld termination at 24" NWZ. Further,on UTC-built tanks cars, the last 6" of weld termination must be inspected. Weld A7 inspection satisfies HM-201 requirements and depicts a cradle pad-to-bolsterpad transverse weld located at the A and B ends. The complete weld is inspected. Weld A8 inspection satisfies HM-201 and depicts cradle pad-to-tank slot welds located at the A and B ends and arc further disposed at between about 2 to 16 places per tank car. The last 6" of the welds at each end of the slot are inspected. Finally, weld A9 inspection satisfies HM-201 and depicts a bolster pad-to-tank transverse weld located at the A end outboard and inboard sides on the right and left of the tank car and also located at the B end outboard and inboard sides on the right and left of the tank car. The 36" span from the junction with the cradle pad is inspected.

Figure 6B:
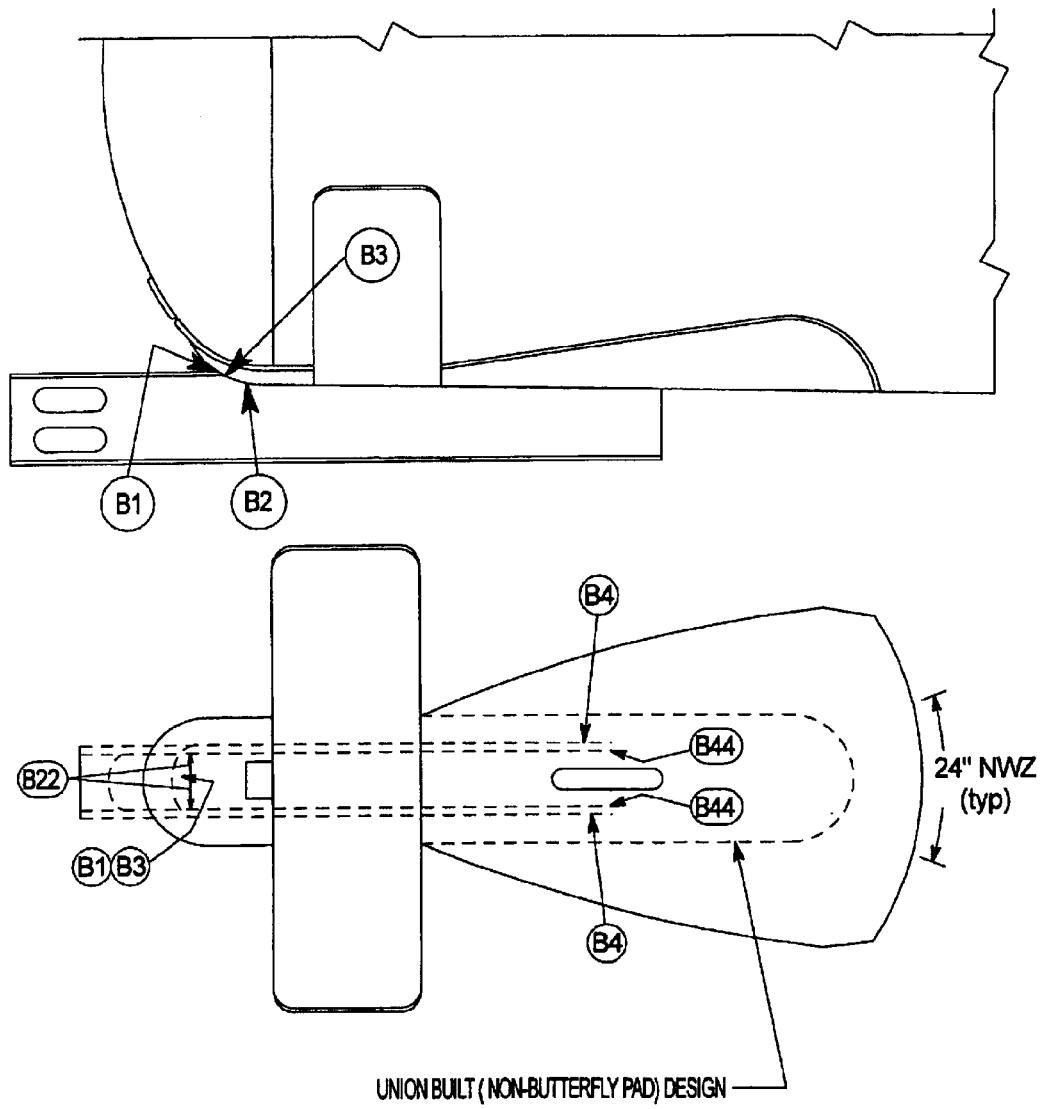
Figure 6D:
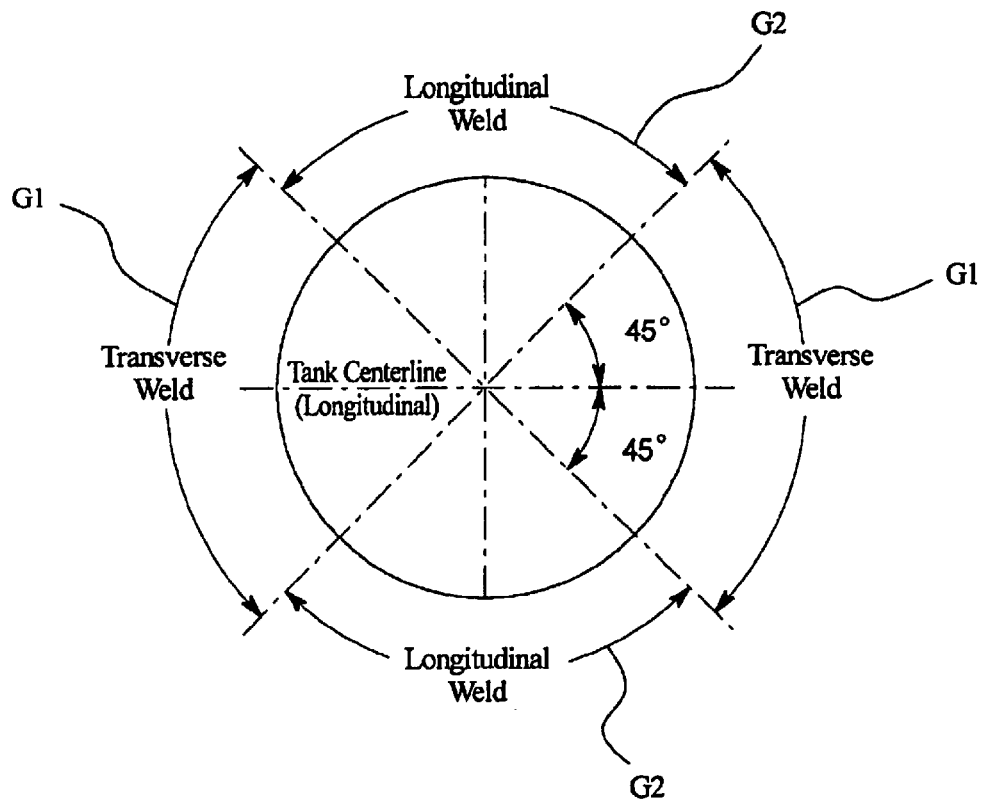
Figure 6E:
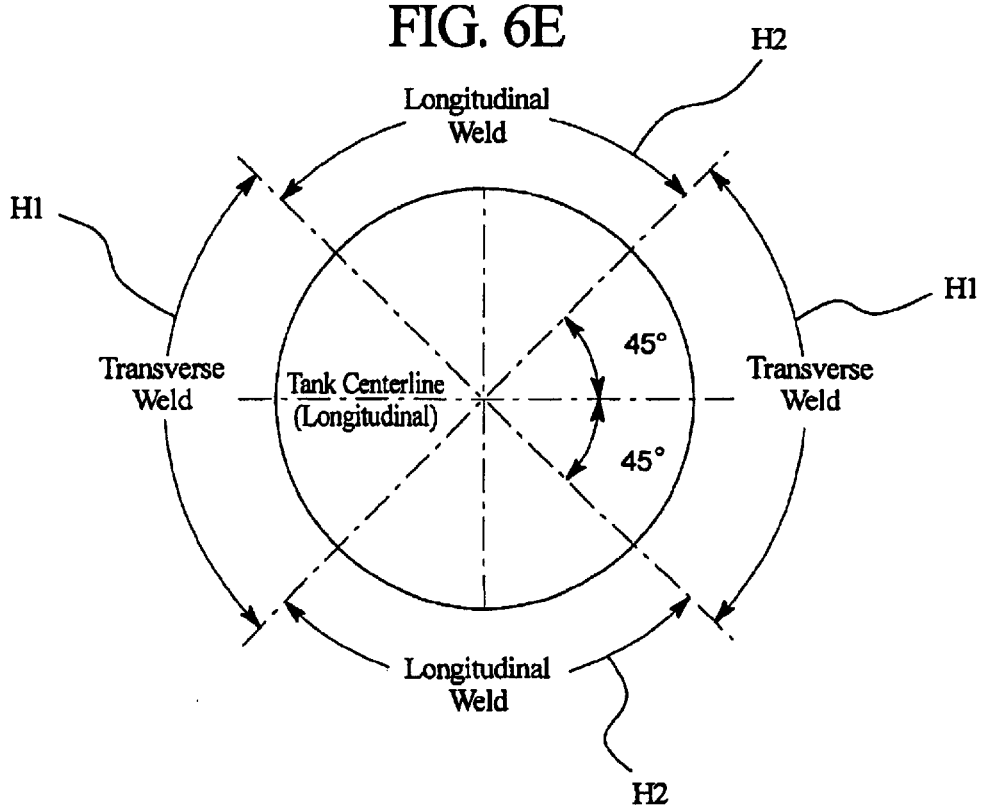
Figure 6F:
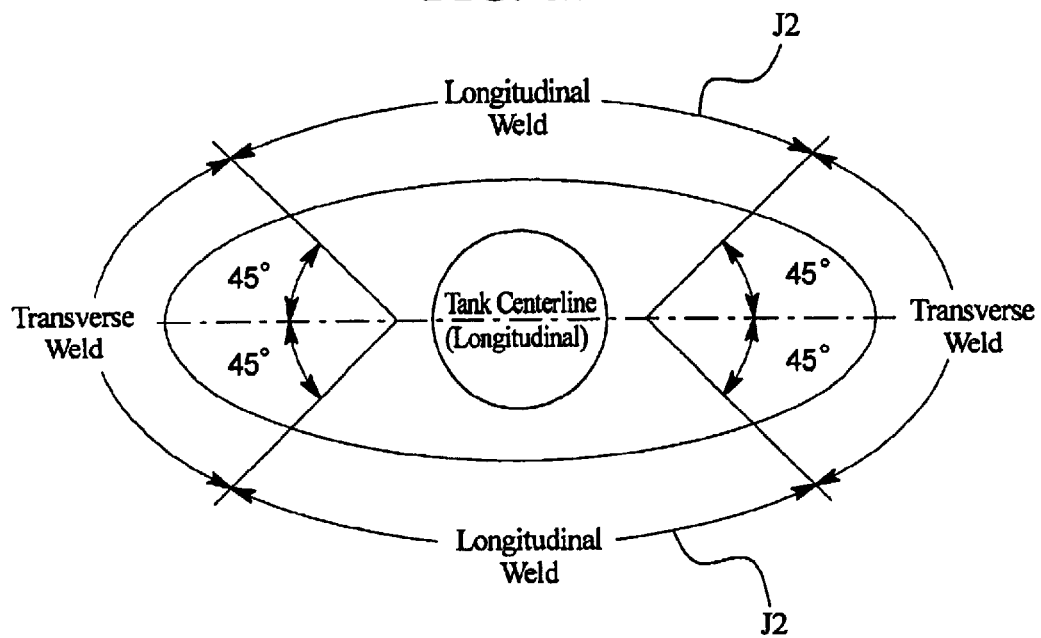
Figure 6G:
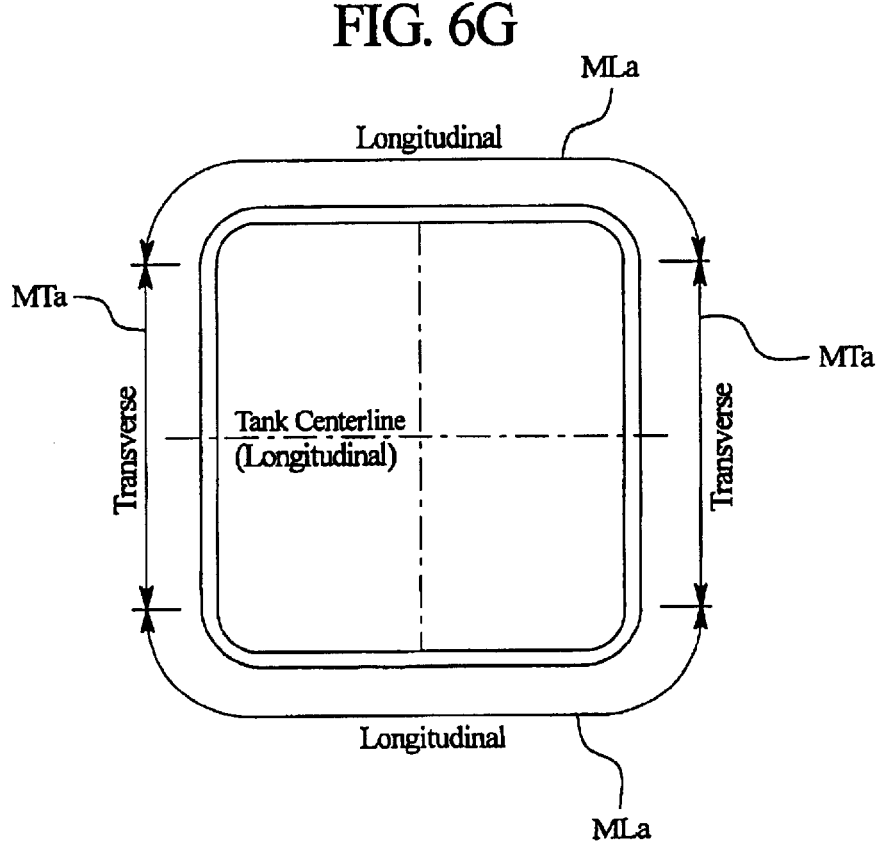

FIG. 6B represents sill-to-pad welds inspected in accord with the invention. The weld locations are shown as reference numerals B1 through B44. Weld B1 satisfies SSIP and 88.B.2 requirements and depicts transverse welds at the top of the sill flange at the A and B ends. A full length of the weld is inspected from the top of the sill. Weld B2 satisfies 88.B.2 requirements and depicts outboard termination of a longitudinal weld outside of the sill at the A and B end right and left positions. The last 6" of the weld to termination is inspected. Weld B3 satisfies SSIP and 88.B.2 requirements and depicts transverse welds at a bottom of the top sill flange at the A and B ends. A full length of the weld from the inside of the sill is inspected. Weld B4 satisfies 88.B.2 and depicts inboard termination of a longitudinal weld outside the sill at the A and B end left and right positions. The last 6" of the weld, including any portion of weld that wraps around sill and connects with B44, is inspected. Weld B22 satisfies rule 88.B.2 and depicts outboard termination of a longitudinal weld inside the sill at the A and B end left and right positions. The last 6" of the weld is inspected. Weld B44 satisfies rule 88.B.2 and depicts inboard termination of a longitudinal weld at an inside of the sill at the A and B end left and right positions. The last 6" of the weld is inspected.

FIG. 6C represents bolster-to-bolsterpad welds inspected in accord with the invention. The weld locations are shown as reference numerals SB1, OSB, and E2. Weld SB1 satisfies rule 88.B.2 requirements and includes bolster web, bolster pad, and stiffener welds inboard of bolster from the outside edge of side bearing pad to draft sill and SB1 along the A and B end left and right sides. A full length of the weld is inspected. Weld OSB meets Rule 88.B.2 requirements and includes bolster web, bolster pad, and stiffener welds outboard of bolster from the outside edge of side bearing pad to side cover plate (OSB) along the A and B end left and right sides. A full length of the weld is inspected. Weld E2 also satisfies rule 88.B.2 requirements and depicts a bolster bottom cover plate to sill flange longitudinal weld located at the A and B end left and right sides. A full length of the weld is inspected.

FIGS. 6D, 6E, 6F, and 6G respectively show saddle welds, sump welds, skid welds, and miscellaneous transverse and longitudinal welds inspected in accord with this aspect of the invention. A detailed description of the general weld locations, relation to regulatory requirements, and inspection requirements are as set forth with respect to FIGS. 5D, 5E, 5F, and 5G respectively, and will not be repeated herein. In addition, the following draft sill welds are inspected in accord with the invention and in accord with Rule 88.B.2. Splice plates welds (MSa) and Wing bar welds (MSb) are each inspected in four places per car and are inspected along a full length of the welds. Vertical stiffeners are inspected at (MSc) along a full length of the weld in two places per car and slot welds (MSd) are inspected in two places per car at the termination of the welds. Similar to the description above with respect to FIGS. 5A–5H, there are additional welds which must be inspected inside the draft sill pocket. These welds are inspected as described above, and are not repeated.

Figure 6H:
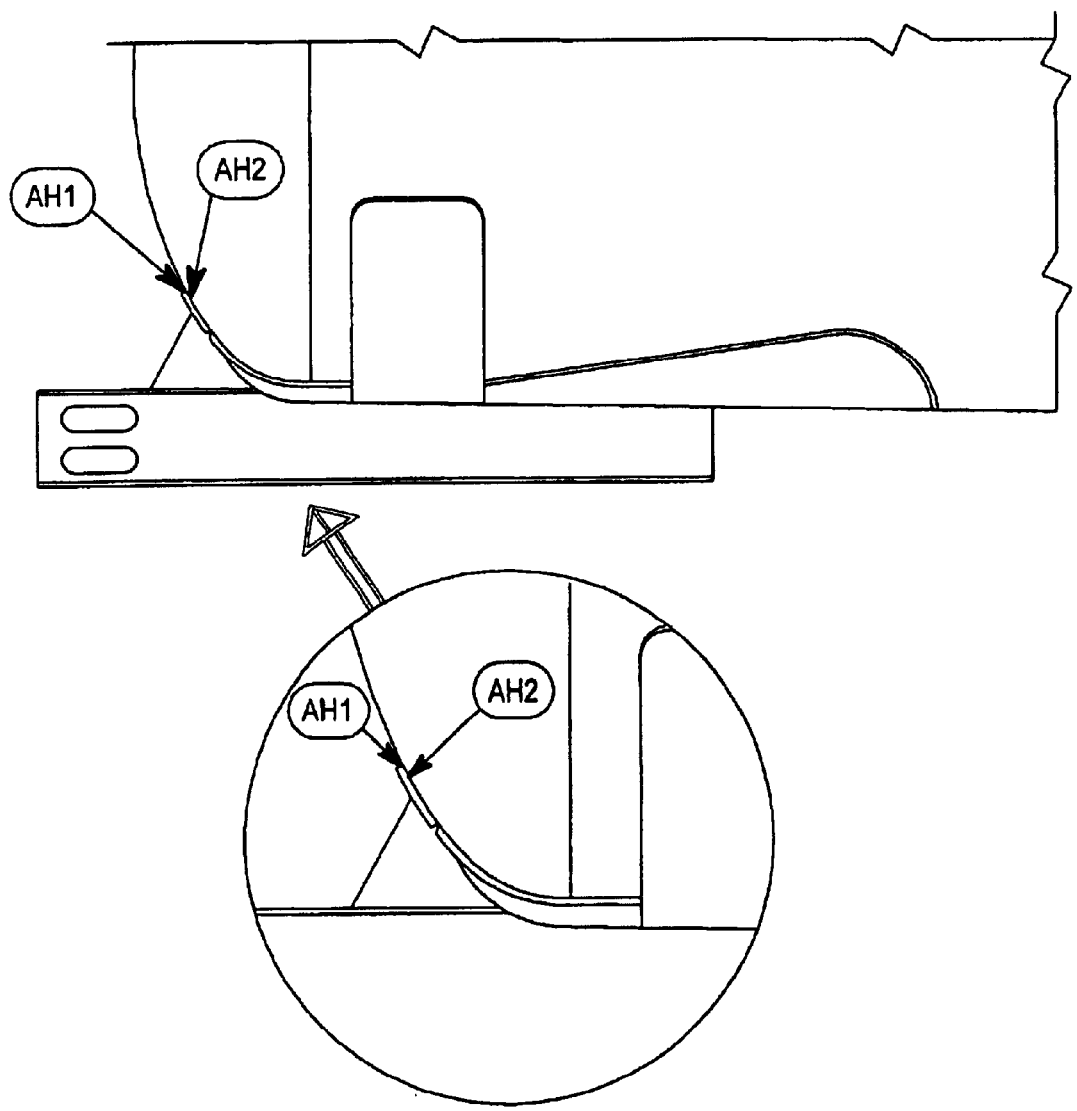
Figure 6I:
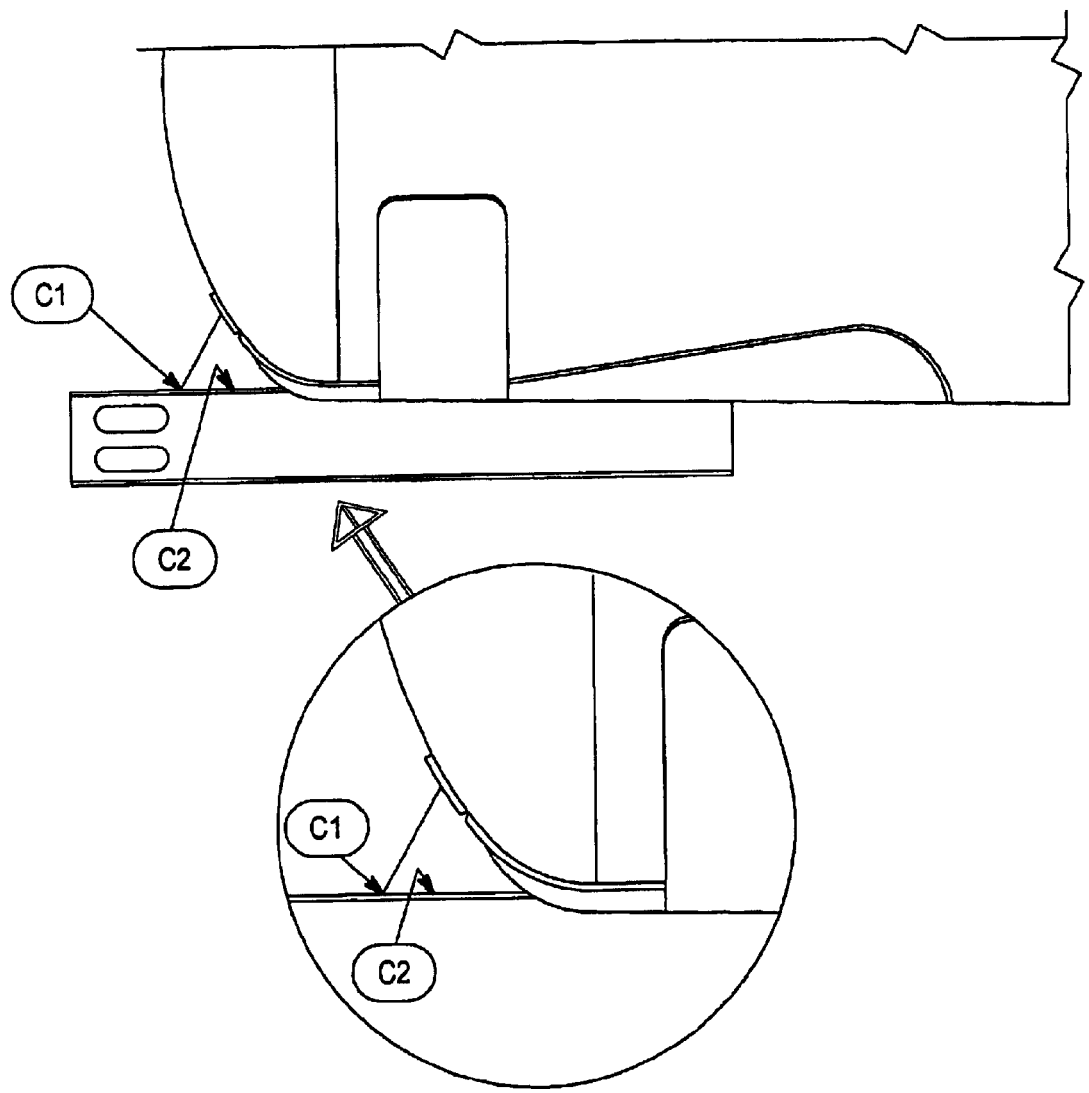
Figure 6J:
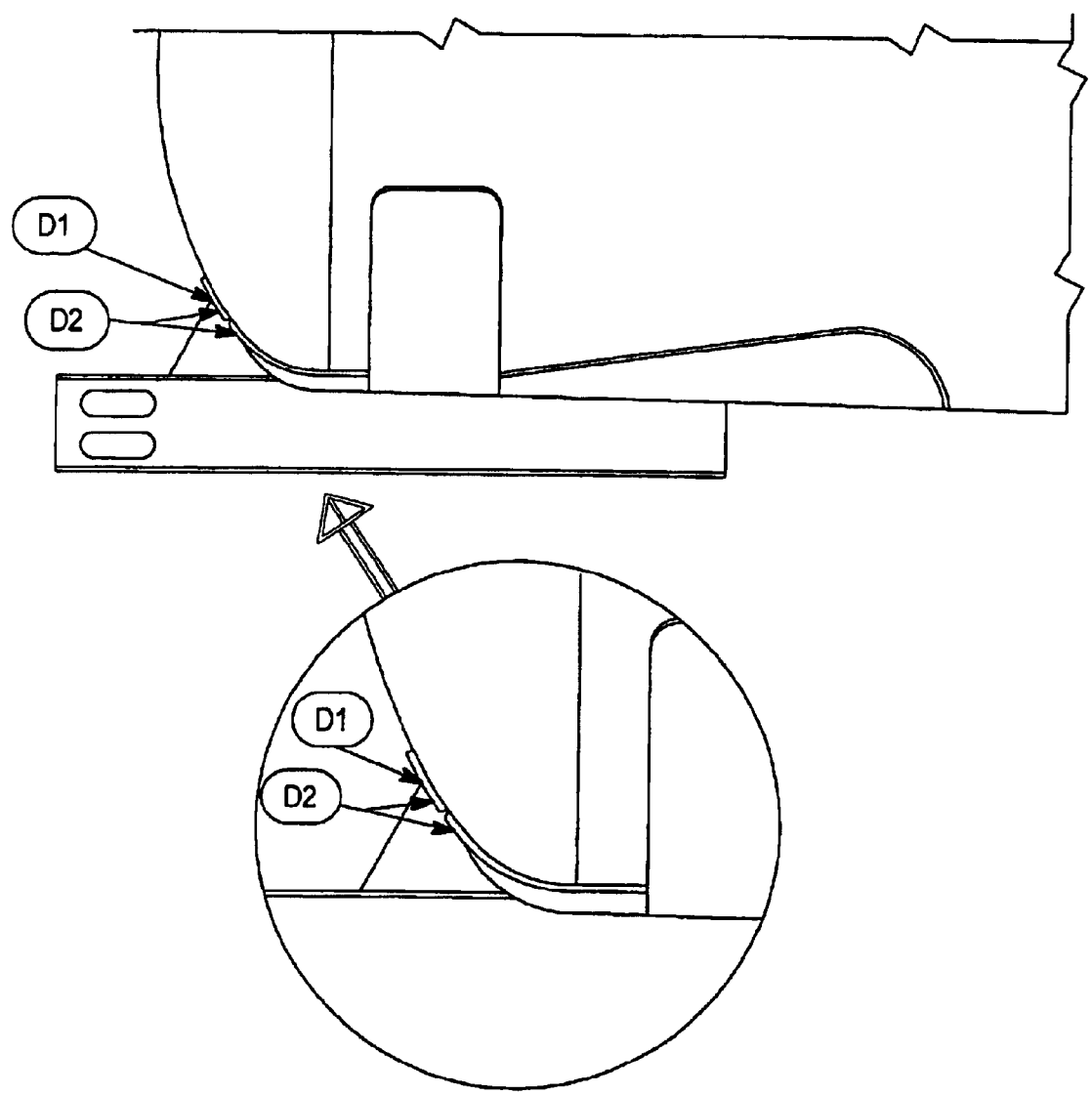
Figure 7A:
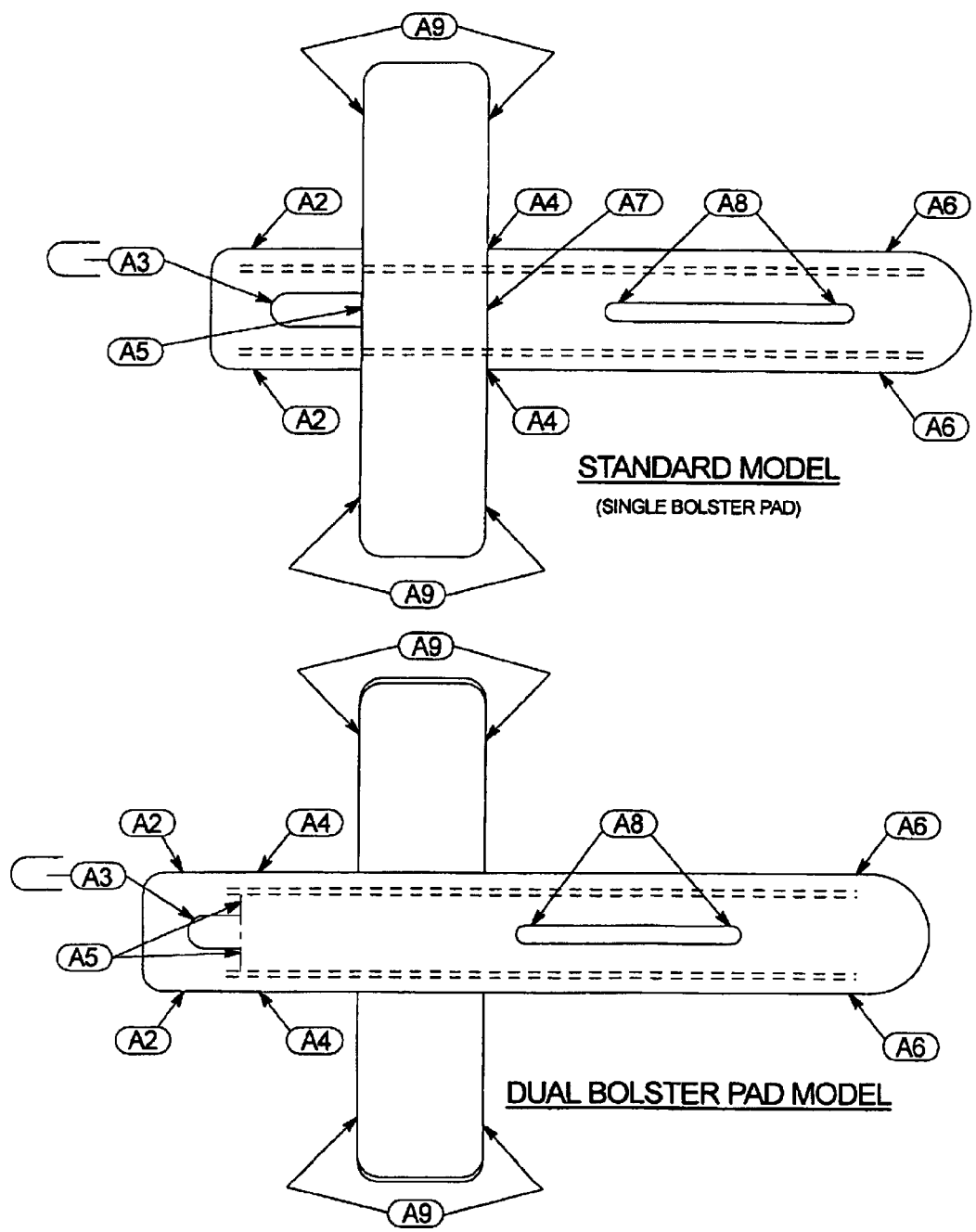
Figure 7D:
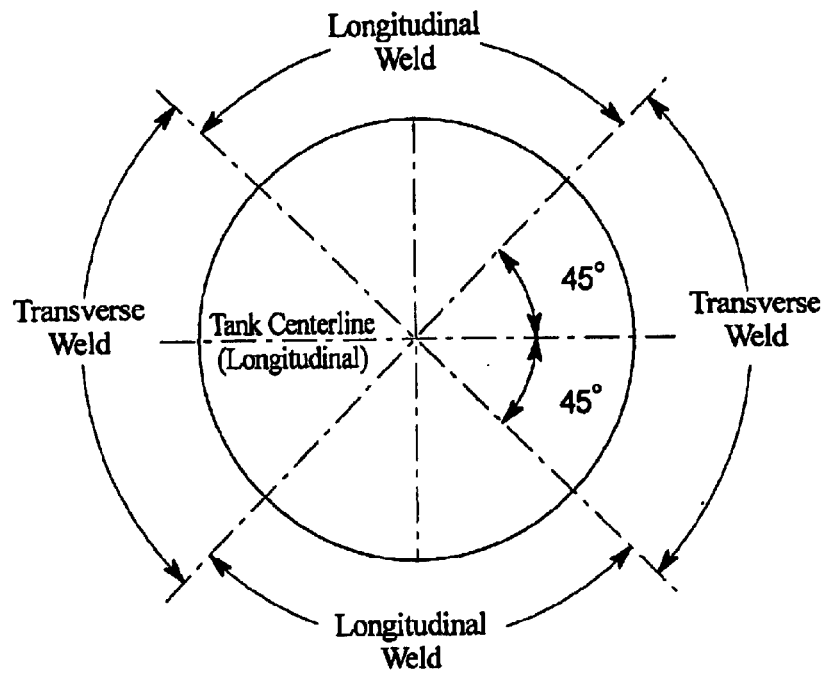
Figure 7E:
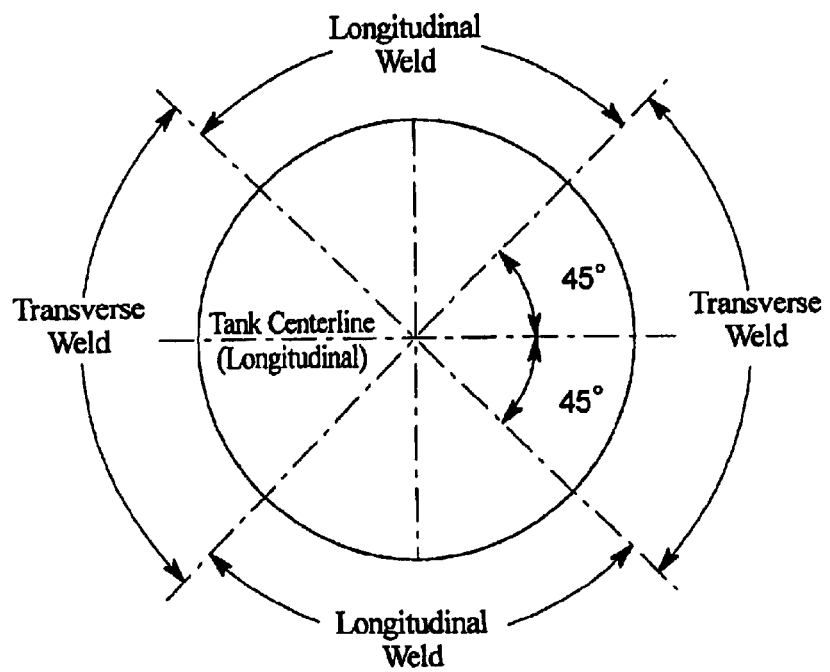
Figure 7F:
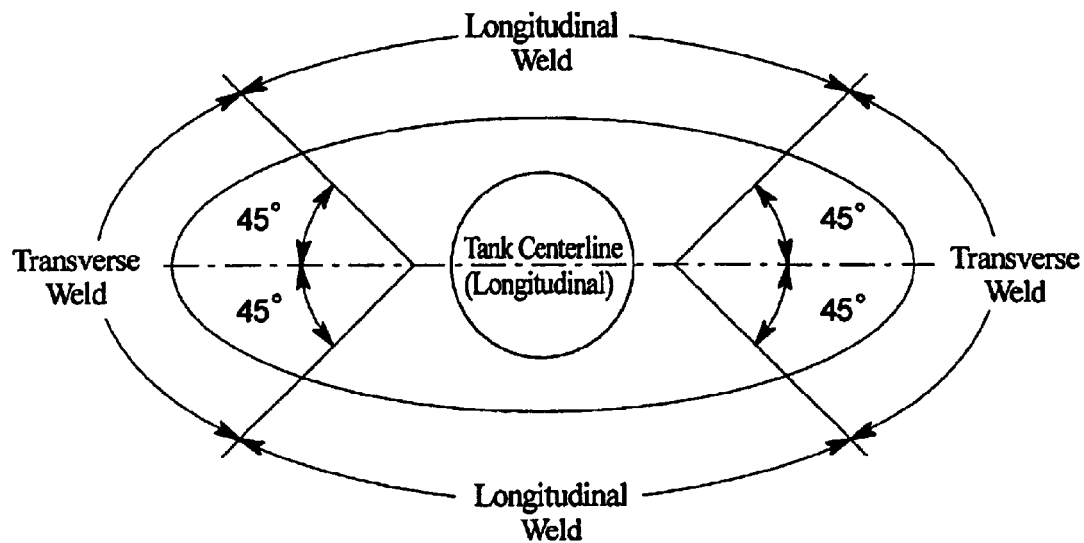
Figure 7G:
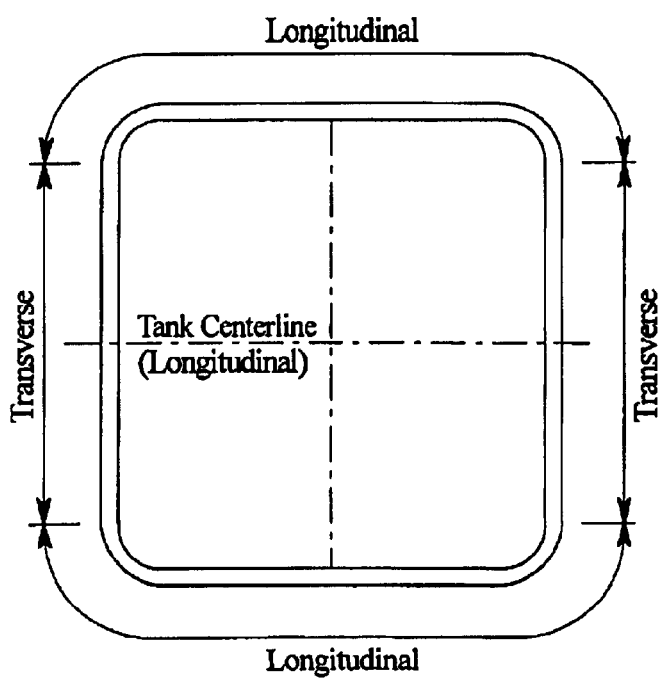
Figure 7H:
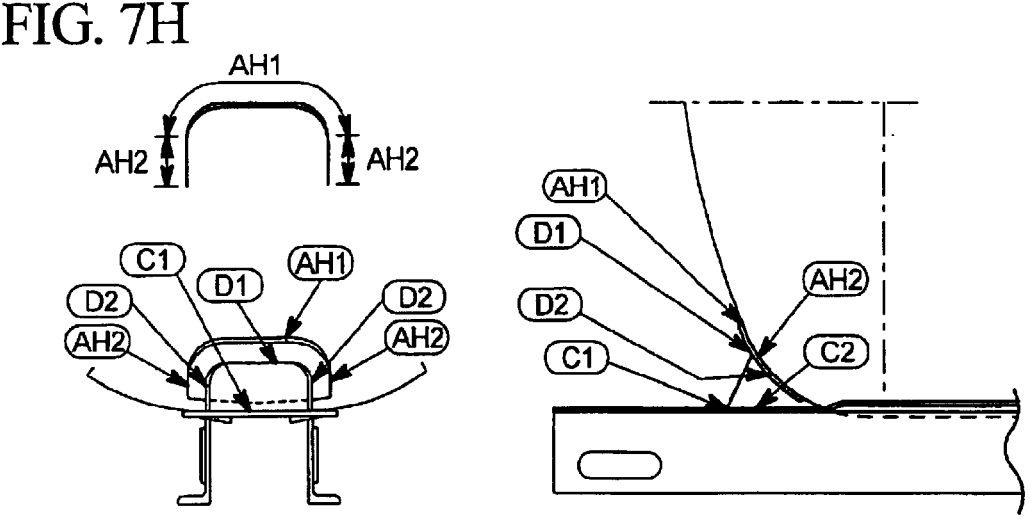

FIGS. 6H, 6I, and 6J show headbrace welds for headbrace cars inspected in accord with the invention. The AH1 weld location is inspected to satisfy both HM-201 and SSIP requirements and depicts the headpad extension transverse weld located at the A and B ends. A full length of the weld is inspected, including weld around corner of pad. Weld AH2 inspection also meets HM-201 and SSIP requirements and depicts the headpad extension longitudinal welds located at the A and B ends. A full length of these welds is inspected, but does not include weld on the corner of the pad. As shown in FIG. 6I, weld C1 meets SSIP and rule 88.B.2 requirements and shows a headbrace-to-sill transverse weld located at the A and B ends. A full length of the weld including a portion which curves around the corner of the headbrace is inspected. Weld C2, also meets SSIP and rule 88.B.2 requirements and shows a headbrace-to-sill longitudinal weld located at the left and right sides of the A and B ends. A full length of the weld is inspected. Welds D1 and D2, shown in FIG. 6J, satisfy SSIP and rule 88.B.2 requirements and show, respectively, a headbrace-to-pad transverse weld located at the A and B ends and a headbrace-to-pad longitudinal weld located at the left and right sides of the A and B ends. A full length of these welds is inspected and the inspection of the D1 weld includes corners.

FIGS. 7A–7H depict another preferred aspect of the invention wherein the detailed weld inspection in accord with step 2008 particularly relates to welds on tank cars built using the Evans Railcar (EVA) and WBR (original EVA design modified to include head brace) stub sill configurations. In most respects, the weld locations, relation to regulatory requirements, and inspection requirements are as set forth with respect to FIGS. 5A–5H, above, and the related discussion. Reference to FIGS. 7A–7H, which use the same reference numerals as FIGS. 5A–5H are illustrative of the differences between the tank car designs.

FIGS. 8A–8H depict yet another preferred aspect of the invention wherein the detailed weld inspection in accord with step 2008 particularly relates to welds on tank cars built using ABC and JKL stub sill designs, such as those built by North American Car (NAC), AMF Beaird (AMF), Davie Shipbuilding Ltd. (DSL), and Hawker Siddeley Ltd. (HST). In some respects, the weld locations, relation to regulatory requirements, and inspection requirements are as set forth with respect to FIGS. 5A–5H, above, and the related discussion with exception of notable differences provided below with reference to FIGS. 8A–8H.

Inspection of weld location A1 satisfies HM-201, SSIP, and Rule 88.B.2 requirements. This weld is a sill top cover-to-tank transverse weld located at the A and B ends of the tank car. The entire weld is inspected, including longitudinal portions terminating at sill top flange-to-cradle pad transition. Weld location A2 inspection satisfies HM-201, SSIP, and 88.B.2 requirements as well. Weld A2 is a termination of cradle pad longitudinal weld (outside of sill web) located at the A and B end left and right sides. The last 6" of the weld to termination is inspected. Weld A4 meets HM-201 requirements and depicts a cradle pad longitudinal weld (outboard termination). This weld is located at the A and B ends and 6" of the weld from termination is inspected. Weld location A6 meets HM-201 and shows an inboard termination of cradle pad longitudinal welds located at the A and B end. left and right sides. A 24" portion of the A6 weld, including wrap around to weld termination at 24" NWZ, is inspected. Weld location A7 meets HM-201 requirements and shows a cradle pad-to-bolsterpad transverse weld located at the A and B ends. The complete weld is inspected. Weld location A9 meets HM-201 and depicts a bolster pad-to-tank transverse weld located at the A and B end right and left outboard and inboard positions, which are inspected 36" from the junction with the cradle pad. Weld A13 satisfied HM-201 requirements and shows the sill top cover to cradle pad transverse welds at the A and B end right and left positions. These welds are inspected along the entire 8" length to include just inboard of rear draft lugs to portion of weld between sill webs. Weld location A15 inspection satisfies HM-201 and Rule 88.B.2 requirements. A15 shows cradle pad-to-tank inboard transverse welds located at A and B ends at the left and right positions. A full length of these welds, including 6" of portions that wrap around longitudinally, are inspected. There should be no weld termination at this location. Finally, weld location A24 is inspected to satisfy HM-201 and SSIP requirements. A24 represents the termination of cradle pad longitudinal weld (inside of sill web) located at the A and B end left and right positions. The last 6" of weld to termination at start of A1 weld is inspected. If a weld defect is found in A24 which is larger than a defect found in A2, the value of the A24 defect is used for SSIP reporting.

Figure 8A:
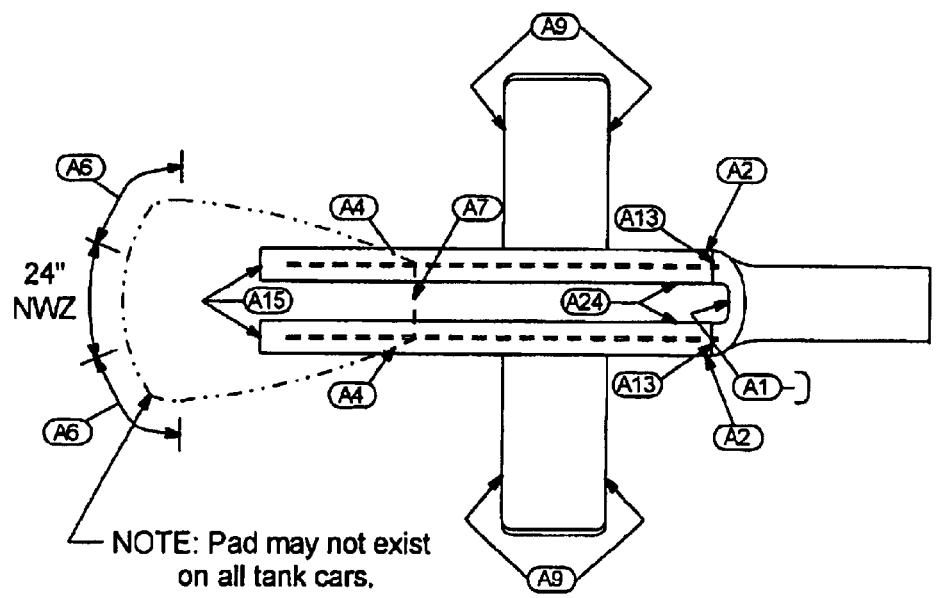
Figure 8B:
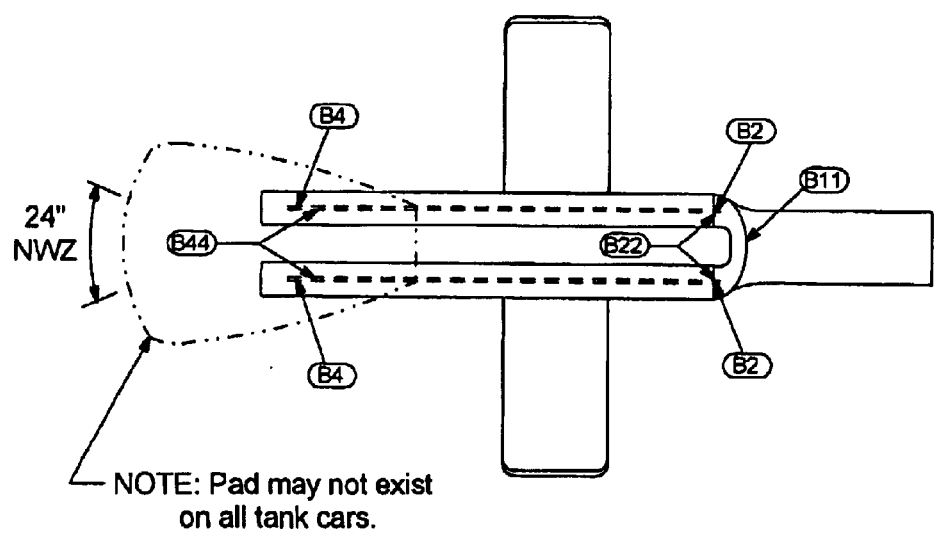
Figure 8D:
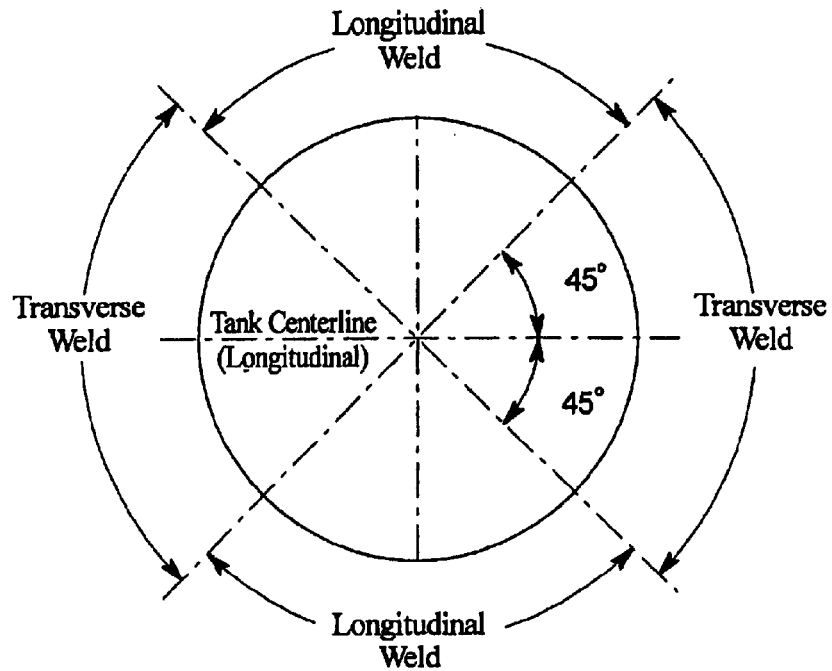
Figure 8E:
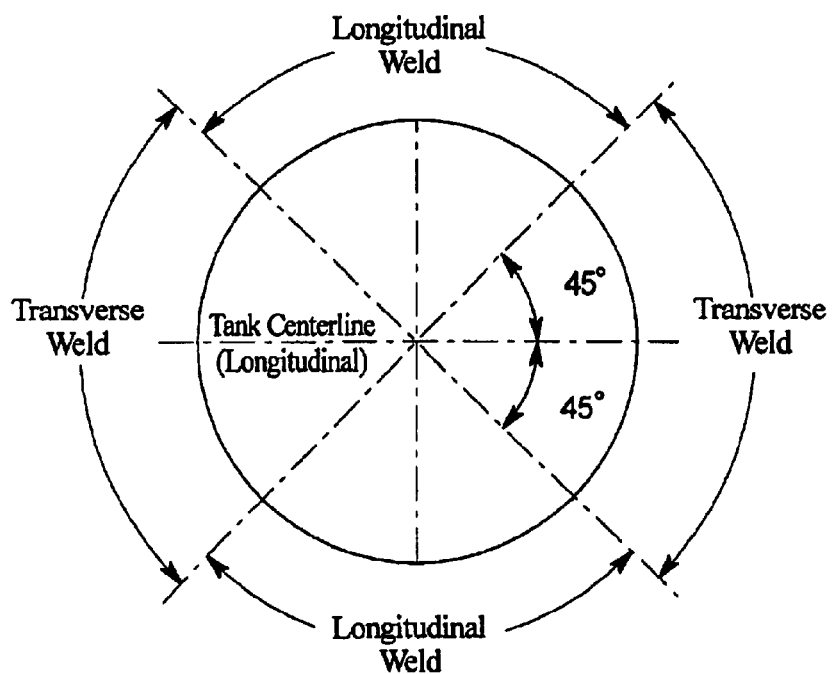
Figure 8F:
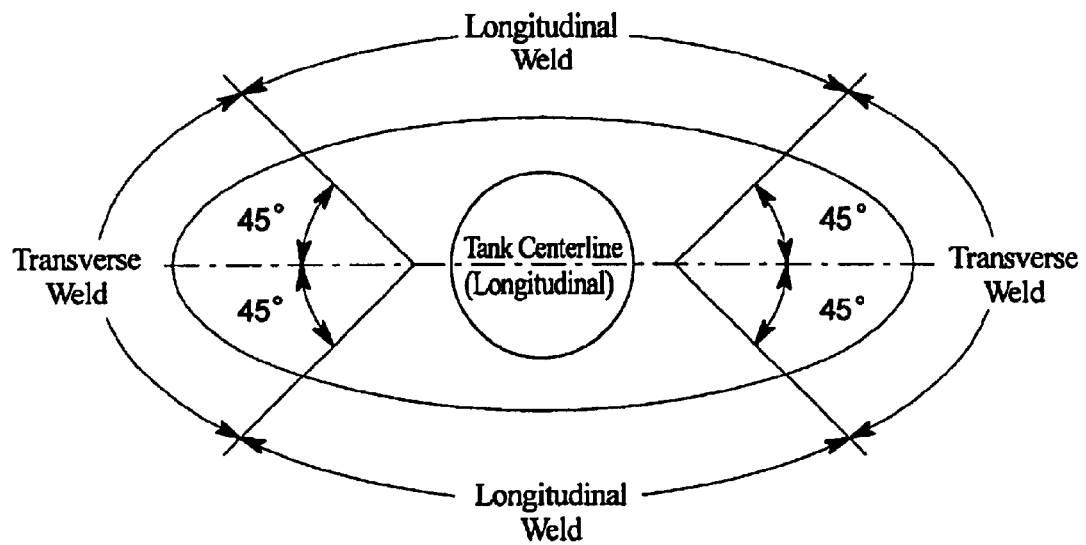
Figure 8G:
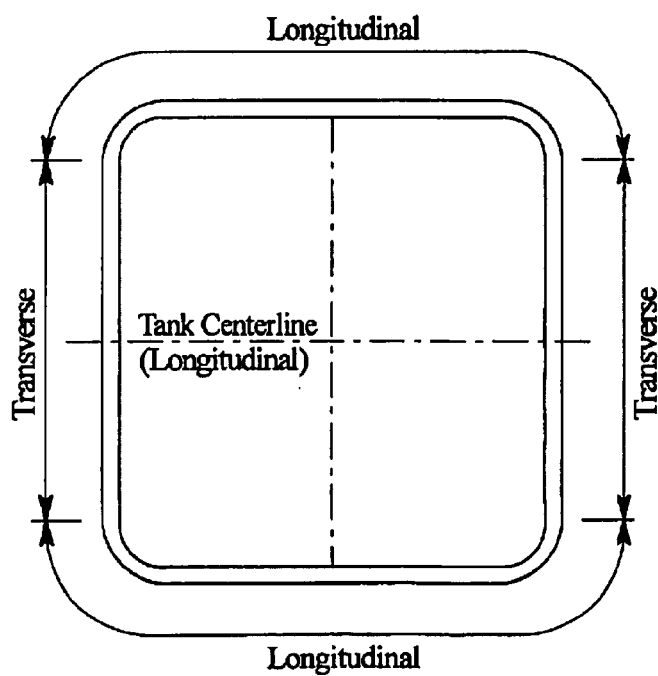
Figure 8H:
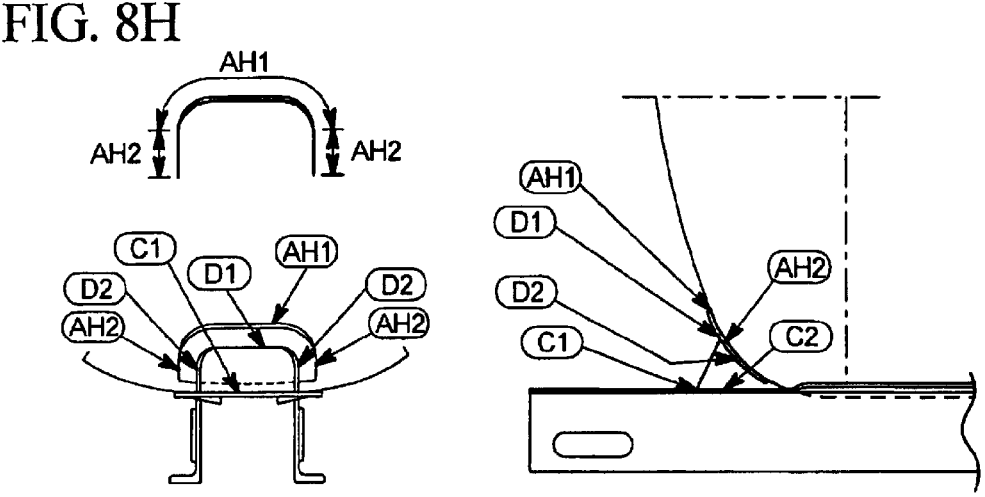

As shown in FIG. 8B, weld location B2 meets 88.B.2 requirements and shows outboard termination of longitudinal weld (outside of sill) at the A and B end left and right positions. The last 6" of the weld to termination is inspected. Weld location B4 meets 88.B.2 requirements and shows inboard termination of longitudinal weld (outside of sill) at the A and B end left and right positions. The last 6" of the weld, including any portion of weld that wraps around sill and connects with B44, is inspected. Inspection of weld location B11 satisfies HM-201 and 88.B.2 requirements and represents sill top cover-to-tank transverse welds (seal weld) at the A and B ends. A full length of the welds are inspected including wrap around to termination at point where sill top cover meets cradle pad. Weld locations B22 and B44 satisfy 88.B.2 and represent outboard and inboard termination of longitudinal weld (inside of sill) at the A and B end right and left positions. The last 6" of these welds are inspected.

FIGS. 8C–8H are substantially as described in FIGS. 5C–5H with respect to the general descriptions of the weld locations, relation to relevant regulatory requirements, and inspection requirements and the discussion therein is not repeated herein for brevity. Further to the above, the following draft sill welds are inspected in accord with the invention and in accord with Rule 88.B.2. Splice plates welds (MSa) and Wing bar welds (MSb) are each inspected in four places per car and are inspected along a full length of the welds. Vertical stiffeners are inspected at (MSc) along a full length of the weld in two places per car and slot welds (MSd) are inspected in two places per car at the termination of the welds. Similar to the description above with respect to FIGS. 5A–5H, there are additional welds which must be inspected inside the draft sill pocket. These welds are inspected as described above, and will not be repeated.

FIGS. 9A–9G depict yet another preferred aspect of the invention wherein the detailed weld inspection in accord with step 2008 particularly relates to welds on tank cars built using ACF-100 stub sill designs. In many respects, the weld locations, relation to regulatory requirements, and inspection requirements are as set forth with respect to FIGS. 5A–5H, above, and the related discussion. However, there are also notable differences, which are discussed below with reference to FIGS. 9A–9H.

Figure 9A:
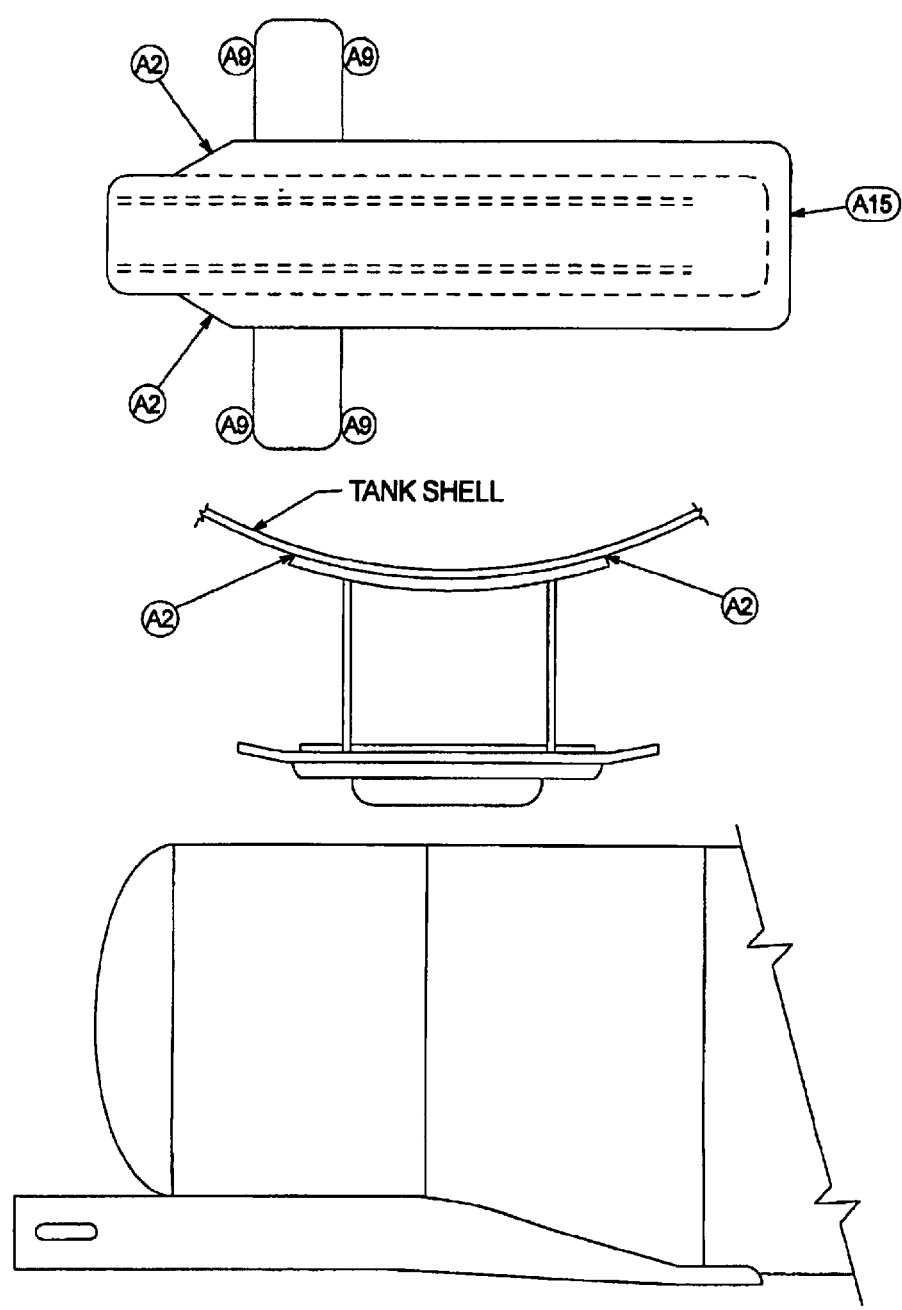

As shown in FIG. 9A, this aspect of the invention only requires three pad-to-tank weld inspection locations. The first weld location, A2, satisfies inspection requirements under HM-201, SSIP, and Rule 88.B.2. Specifically, it depicts the front sill pad longitudinal welds located at the A and B end left and right portions and is inspected along a full length of the weld to the termination at the bolster. The second weld location, A9, satisfies inspection requirements under HM-201 and shows bolster pad-to-tank transverse welds, which are located at the A end and B end right and left outboard and inboard positions. 36" from the junction with the cradle pad is inspected. The third weld location, A15, meets HM-201 requirements and are cradle pad-to-tank inboard transverse welds located at the A and B end left and right positions.

Figure 9B:
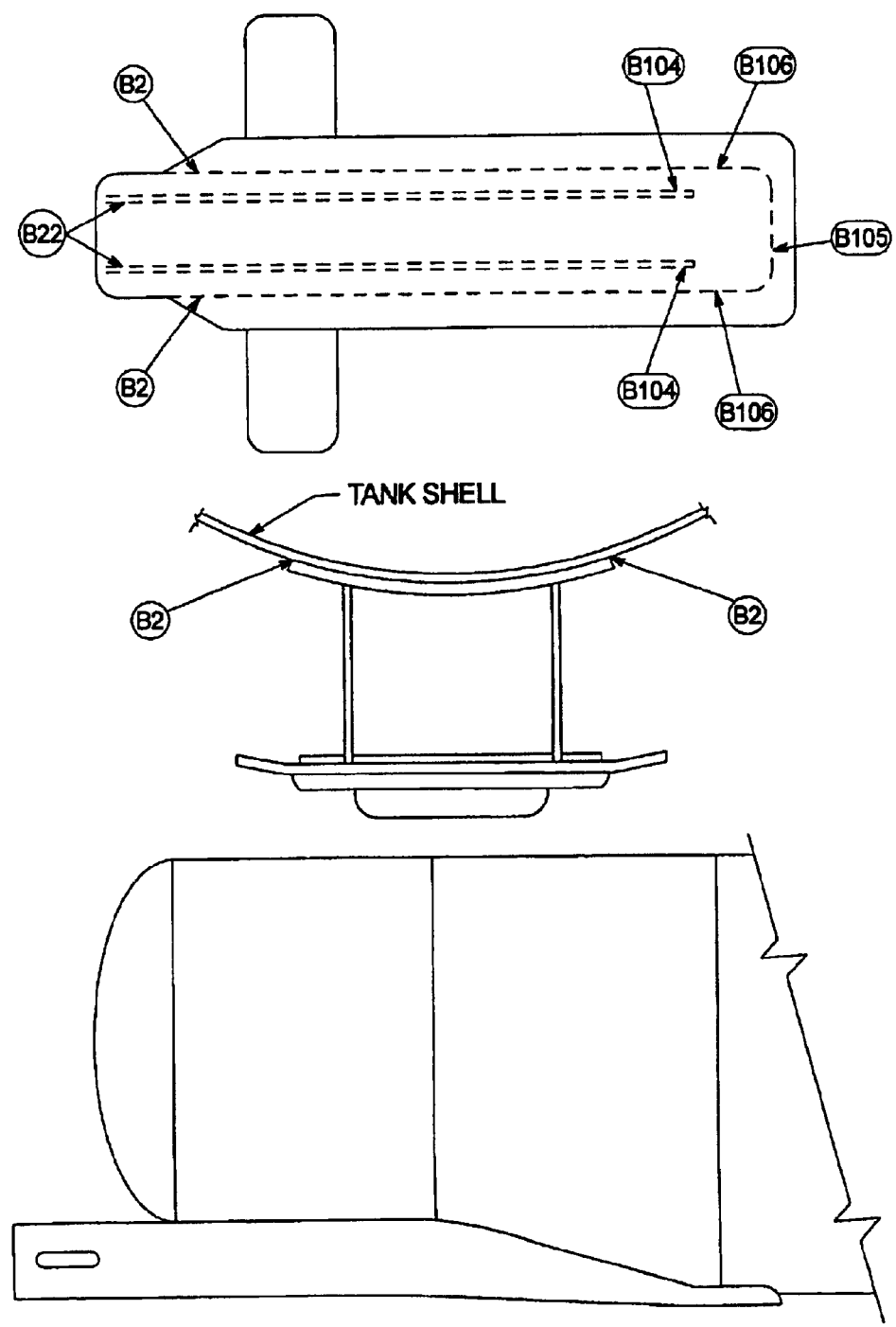
Figure 9D:
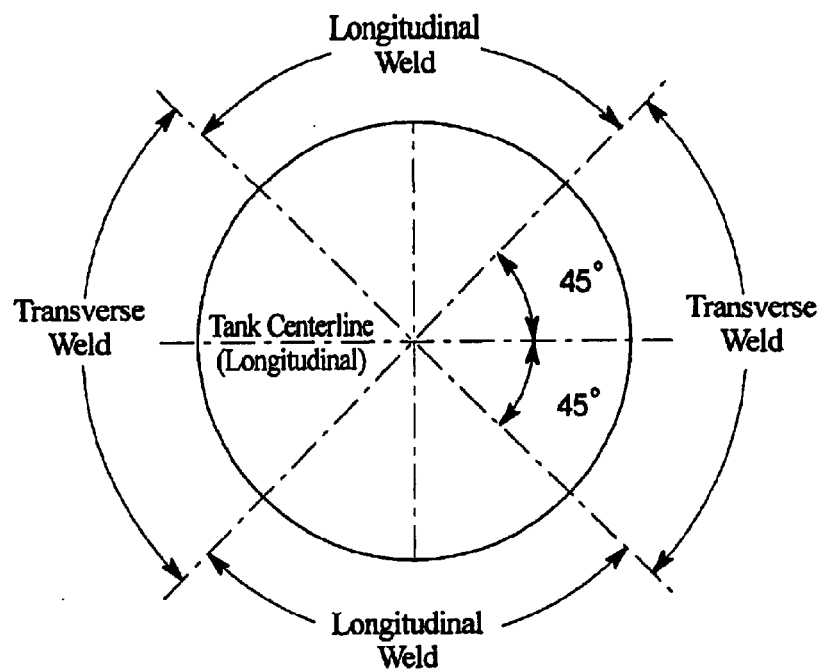
Figure 9E:
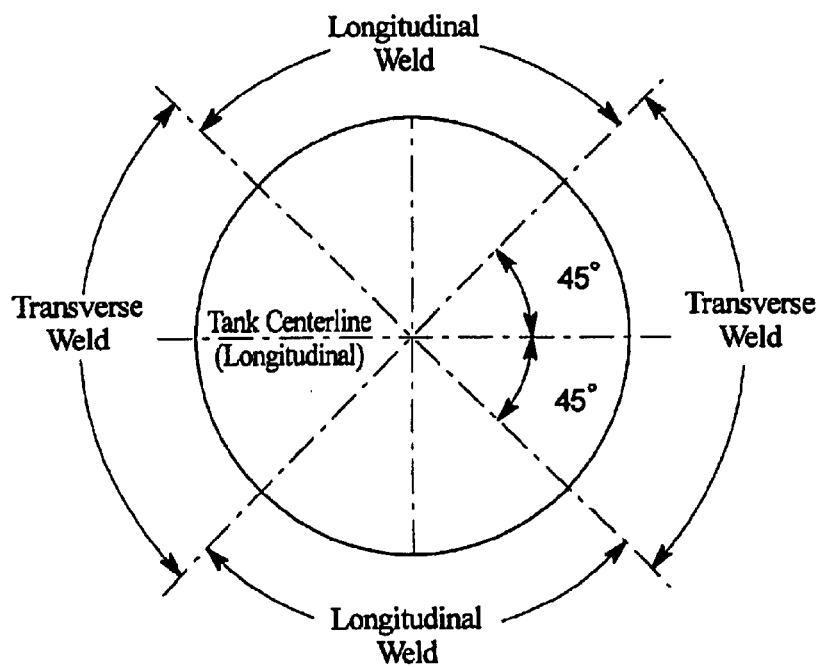
Figure 9F:
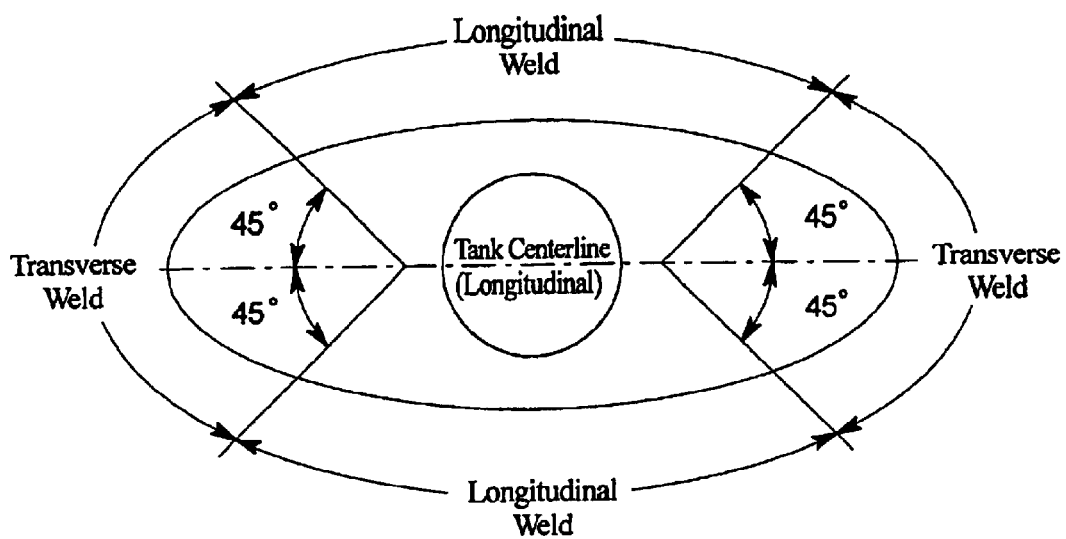
Figure 9G:
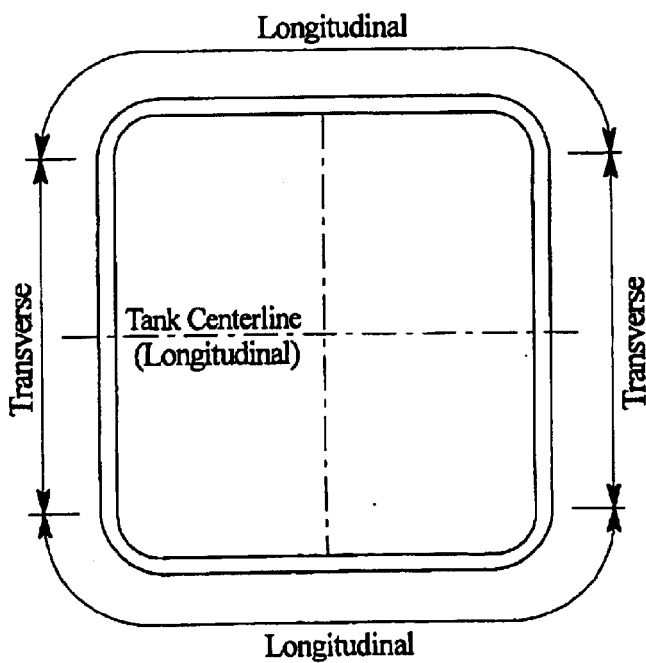

FIG. 9B shows sill-to-pad weld locations. Each of these weld locations satisfies Rule 88.B.2 requirements. Weld location B2 is the outboard termination of the longitudinal weld (outside of sill) located at the A and B ends at the left and right sides. The last 6" of the weld to termination is inspected. Weld location B4 is the inboard termination of the longitudinal weld (outside of sill) located at the A and B ends at the left and right sides. The last 6" of the weld, including any portion of the weld that wraps around the sill and connects with B44, is inspected. Weld location B22 is the real lug reinforcement to the cradle pad weld. Generally, this weld extends from the rear lug reinforcement to the sill top flange and is located at the A and B ends at the left and right sides. The outboard termination plus 6" is inspected. Weld location B104 is the inboard termination of the sill web-to-sill bottom cover located at the A and B ends at the left and right sides. The last 6" of the weld is inspected. Weld location B105 is the sill bottom flange to cradle pad transverse weld located at the A and B ends. The full length of the weld is inspected. Weld location B106 is the inboard termination of the sill bottom cover-top-cradlepad longitudinal weld located at the A and B ends at the left and right sides. The last 6" of the weld is inspected.

FIG. 9C represents bolster-to-bolsterpad welds inspected in accord with the invention. The weld locations are shown as reference numerals SB1, OSB, and E2. Each of these welds satisfies Rule 88.B.2 requirements. Weld SB1 includes bolster web, bolster pad, and stiffener welds inboard of bolster from the outside edge of side bearing pad to draft sill and SB1 along the A and B end left and right sides. A full length of the weld is inspected. Weld OSB includes bolster web, bolster pad, and stiffener welds outboard of bolster from the outside edge of side bearing pad to side cover plate (OSB) along the A and B end left and right sides. A full length of the weld is inspected. Weld E2 depicts a bolster bottom cover plate to sill flange longitudinal weld located at the A and B end left and right sides. A full length of the weld is inspected.

FIGS. 9D–9G are substantially as described in FIGS. 6D–6G with respect to the general descriptions of the weld locations, relation to relevant regulatory requirements, and inspection requirements and the discussion therein is not repeated herein for brevity. Additionally, the following draft sill welds are inspected in accord with the invention and in accord with Rule 88.B.2. Splice plates welds (MSa) and Wing bar welds (MSb) are each inspected in four places per car and are inspected along a full length of the welds. Vertical stiffeners are inspected at (MSc) along a full length of the weld in two places per car and slot welds (MSd) are inspected in two places per car at the termination of the welds. Similar to the description above with respect to FIGS. 5A–5H, there are additional welds which must be inspected inside the draft sill pocket. These welds are inspected as described above, and will not be repeated.

FIGS. 10A–10J depict yet another preferred aspect of the invention wherein the detailed weld inspection in accord with step 2008 particularly relates to welds on tank cars built using the 200, 230, & 270 stub sill configurations. ACF Industries, Inc. (ACF) was the primary builder for these stub sill configurations.

Figure 10A:
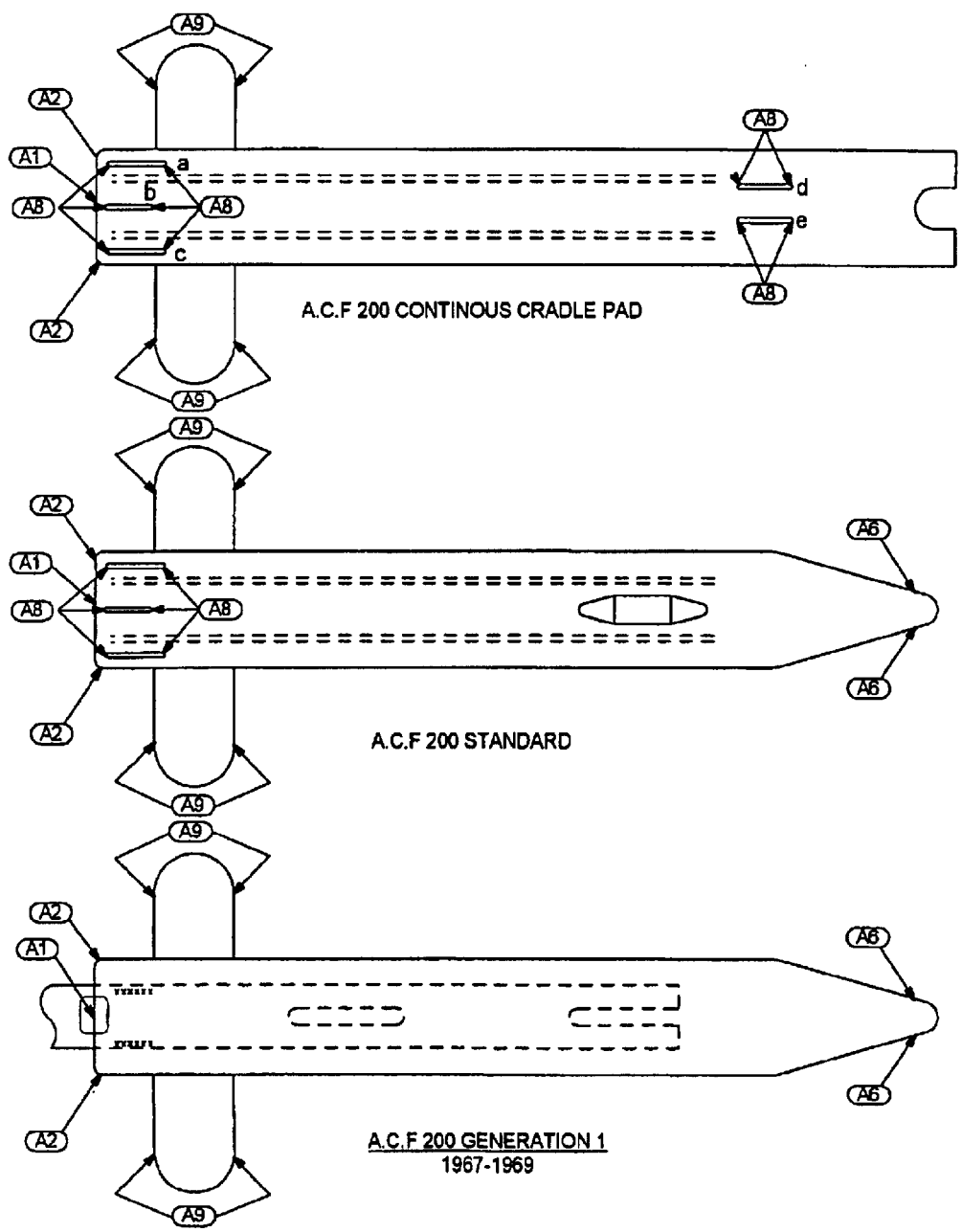
Figure 10D:
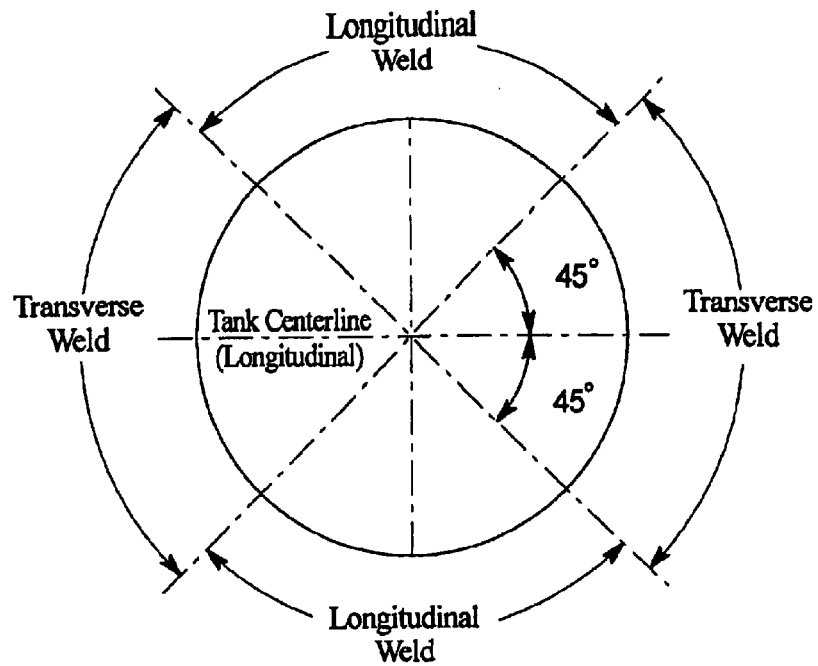
Figure 10E:
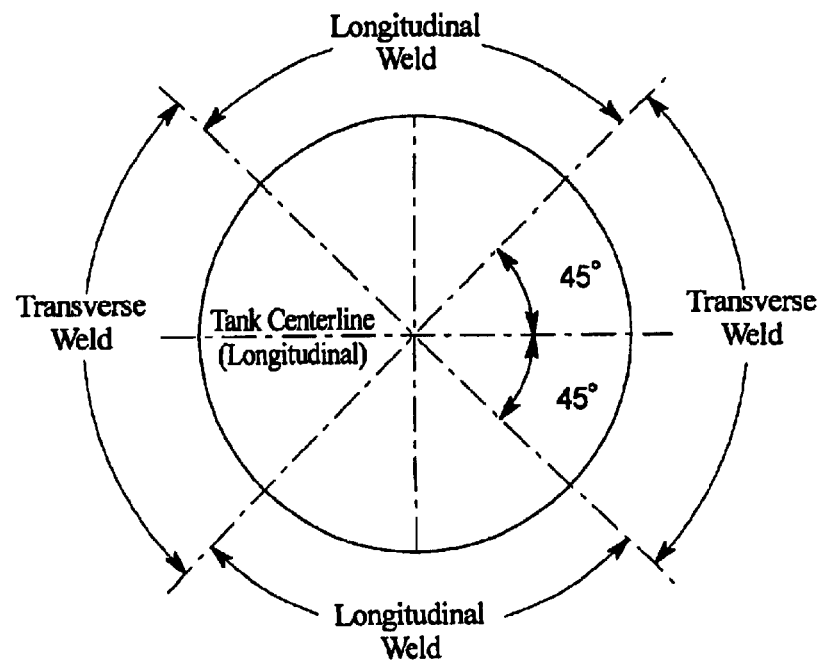
Figure 10F:
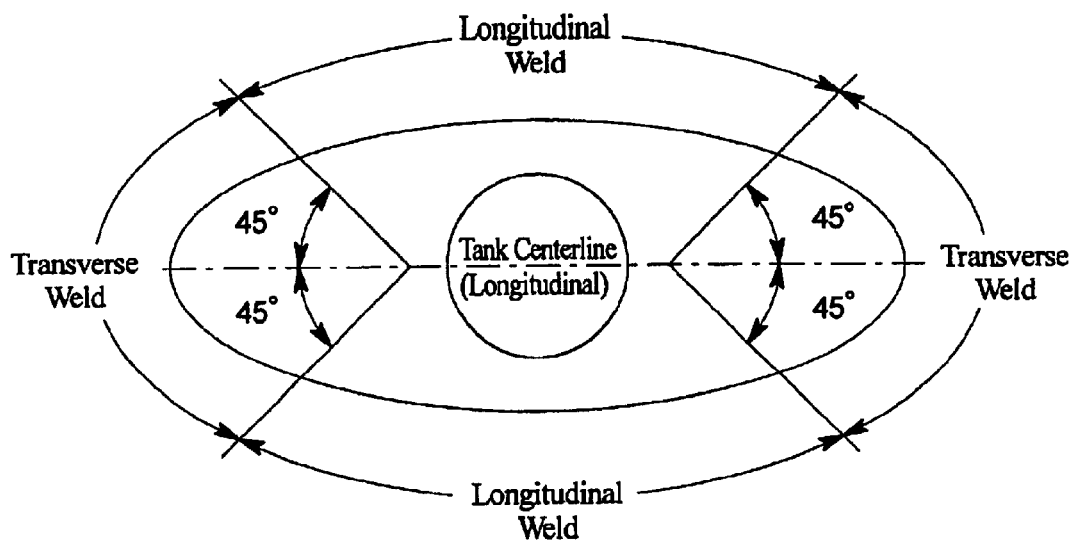
Figure 10G:
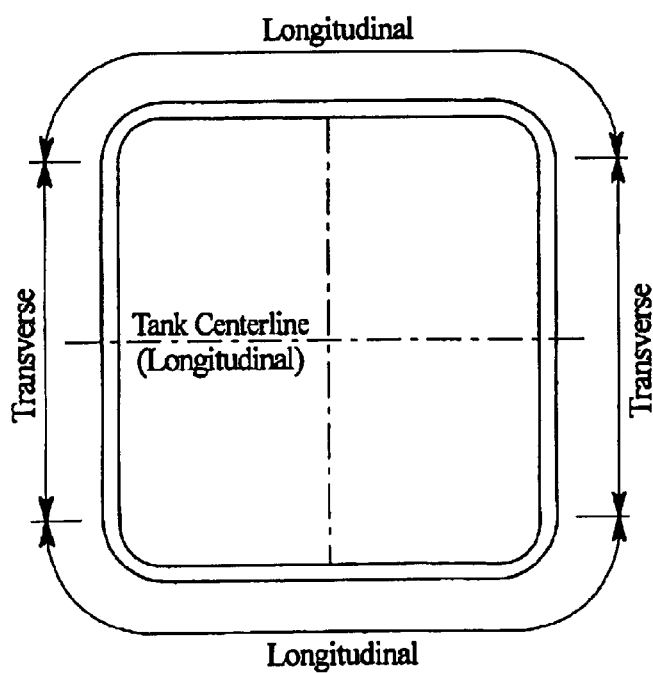

As shown in FIG. 10A, this aspect of the invention requires five pad-to-tank weld inspection locations. The first weld location, A1, satisfies inspection requirements under HM-201, SSIP, and Rule 88.B.2. Specifically, it depicts a 7" transverse weld located at the A and B ends and is inspected along a full length of the weld. On some cars, this weld will be continuous around an outboard end of the pad. On most cars, however, this weld will be 5" to 8½ in length, terminating at backstop reinforcements. The second weld location, A2, satisfies inspection requirements under HM-201, SSIP, and Rule 88.B.2 and shows outboard termination of longitudinal pad-to-tank welds located at the A end and B end right and left positions. A full length of the weld to termination at the bolster pad is inspected. This weld wraps around the pad, terminating in a transverse portion just outside of the sill web. On some cars built between 1969 and 1986, there may be a seal weld connection between transverse and longitudinal welds. A crack in the seal weld for cars of this vintage is not considered a reportable or repairable defect. The third weld location, A6, meets HM-201 and Rule 88.B.2 requirements and depicts inboard termination of cradle pad longitudinal welds at the A and B end left and right positions. The last 6" of the weld to termination is inspected. This particular weld inspection does not apply to cars with a continuous cradle pad. The next weld, weld location A8, satisfies inspection requirements under HM-201 and shows cradle pad-to-tank slot welds located at the A and B ends in between 2 to 16 places per car. There may be two or three slots labeled "a" through "c", as shown in FIG. 10A. On cars with continuous cradle pads, additional slots inboard of the bolster labeled "d" and "e", as shown in FIG. 10A, must also be inspected. The inboard and outboard terminations of slot welds are inspected. Lastly, weld location A9 satisfies inspection requirements under HM-201 and shows bolster pad-to-tank transverse welds located at the A and B ends at both the outboard and inboard right and left positions. A 36" portion from the junction with the cradle pad is inspected.

FIG. 10B shows sill-to-pad weld locations. Each of these weld locations satisfies Rule 88.B.2 requirements. Weld location B3, discussed below, additionally satisfies SSIP requirements but itself is not a reportable SSIP value. Weld location B2 shows outboard termination of longitudinal weld (outside of sill) located at the A and B ends at the left and right sides. The last 6" of the weld to termination is inspected. Weld location B3 is the sill top flange to cradle pad outboard transverse weld located at the A and B ends. A full length of the weld is inspected. Weld location B4 is the inboard termination of the longitudinal weld (outside of sill) located at the A and B ends at the left and right sides. The last 6" of the weld is inspected, including any portion of the weld that wraps around the sill and connects with B44. Weld location B5 is the sill top flange to cradle pad inboard transverse weld located at the A and B ends at the left and right sides. A full length of the weld is inspected including any portion of the weld that wraps around the corner of the sill top flange running into the B4 and B8 welds. The B8 weld is the sill top flange to cradle pad inboard slot weld located at the A and B ends. The full length of the slot is inspected. This particular weld only exists on Gen. 1 cars built between about 1967–1969 with a continuous sill top flange and is also not a reportable SSIP value. Weld location B22 shows rear lug reinforcement to cradle pad welds located at the A and B end right and left sides. The outboard termination plus 6" is inspected. Lastly, weld location B44 shows inboard termination of longitudinal weld (inside of sill) located at the A and B end right and left sides. This weld may be wrapped around the inboard end of the sill and does not exist for Gen. 1 cars. The last 6" of the weld is inspected.

FIGS. 10C–10G depict, in many respects, the general weld locations, relation to regulatory requirements, and inspection requirements set forth with respect to FIGS. 5C–5G, above, and the related discussion. The discussion of the related material is not repeated herein and the differences therebetween, particularly with respect to FIG. 10C, may be gleaned from review of the appended figures. In addition, the following draft sill welds are inspected in accord with the invention and in accord with Rule 88.B.2. Splice plates welds (MSa) and Wing bar welds (MSb) are each inspected in four places per car and are inspected along a full length of the welds. Vertical stiffeners are inspected at (MSc) along a full length of the weld in two places per car and slot welds (MSd) are inspected in two places per car at the termination of the welds. Similar to the description above with respect to FIGS. 5A–5H, there are additional welds which must be inspected inside the draft sill pocket. These welds are inspected as described above, and will not be repeated.

FIG. 10H depicts ACF Engineering Project P389R, Z-Section stub sill modification. Each of the depicted weld inspection locations therein relate to and satisfy Rule 88.B.2 inspection requirements. Weld location B231 shows a U-brace-to-cradlepad U-shaped weld (top and bottom) located at the A and B ends at the right and left sides. Weld B233 shows a U-brace-to-sill vertical weld located at the A and B ends at the inboard and outboard left and right positions. Weld location B237 is a transverse backstop plate-to-sill and cradle pad weld located at the A and B ends. Weld B239 is a transverse backstop plate-to-longitudinal backstop weld located at the A and B ends at the left and right sides. Weld B242 is a mini-bolster-to-pad transverse weld and weld B245 is a mini-bolster-to-sill vertical weld, each of these welds being located at the A and B ends. Each of welds B231 to B245 are inspected along a full length of the weld.

Figure 10I:
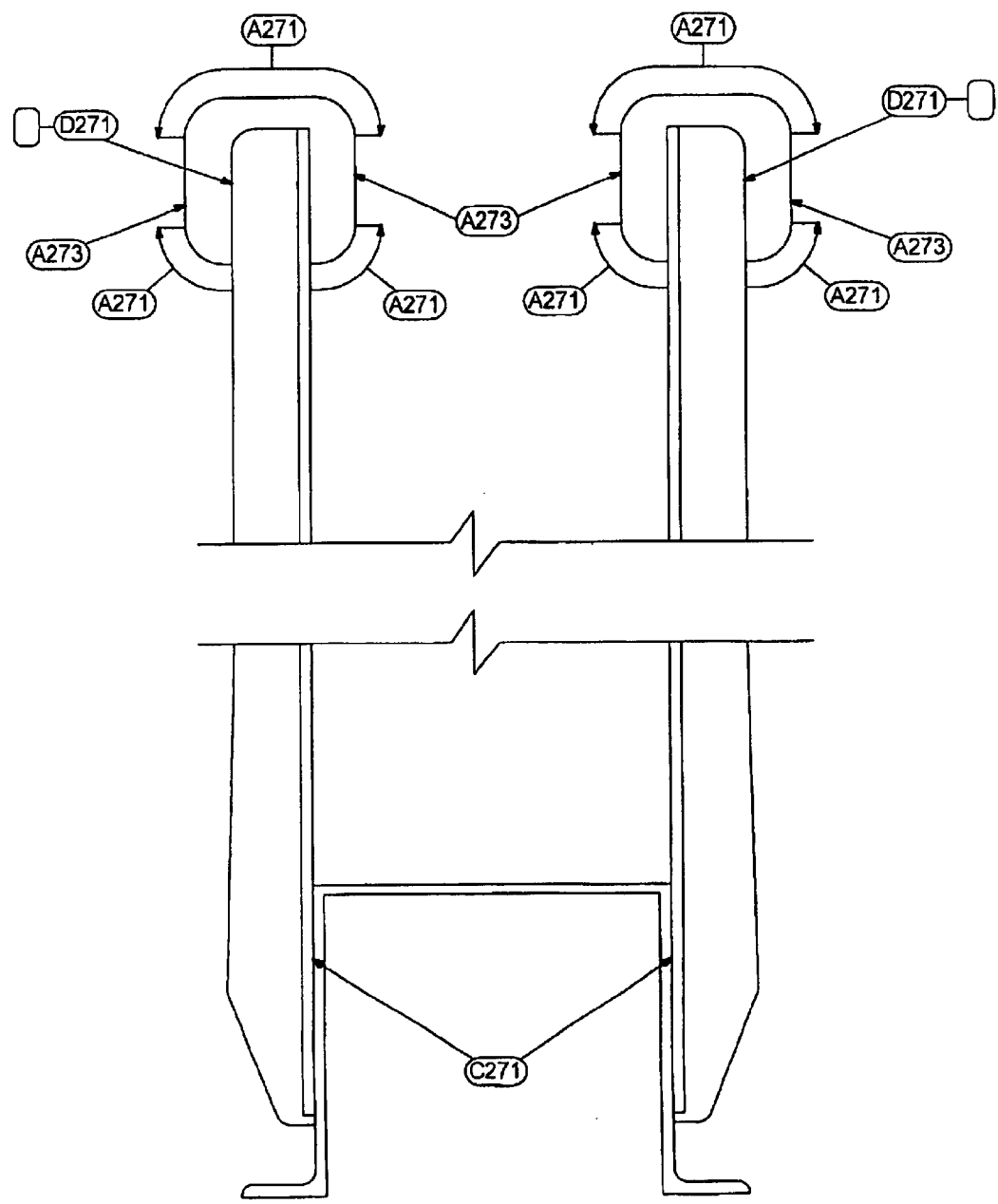

FIG. 10I depicts ACF Engineering Project P470, Load Divider Fix. Weld location A27 meets HM-201 and SSIP requirements and shows a headpad-to-tank horizontal weld located at the A and B ends at the left and right sides. A full length of the weld is inspected. Weld location A273 also meets HM-201 and SSIP requirements and shows a headpad-to-tank vertical weld located at the A and B ends at the left and right sides. A full length of the weld is inspected. Weld location C271, on the other hand, meets Rule 88.B.2 and SSIP requirements and shows an angle-to-sill vertical weld located at the A and B ends at the left and right sides. A full length of the weld is inspected, two welds per location. Finally, weld location D271 shows an angle-to-pad entire weld located at the A and B ends at the left and right sides. A full length of this weld is inspected to satisfy HM-201 and SSIP requirements.

FIG. 10J shows a typical ACF 200 jacketed tank car with the jacket removed for clarity. In accord with the detailed inspection conducted under step 2008, areas under the jacket must be inspected. In tank cars having a fiberglass and fiber frax insulation system, it is preferred to cut 10 holes approximately 4"×4" in the tank car jacket using the dimensions and locations for cutouts #1–#3 shown in FIG. 10J. The cutouts are to be symmetrical on both sides of the tank and the A and B ends. It may be necessary to make two additional cutouts at each end of the tank jacket noted as cutout #4, depending on the jacket configuration, at the inboard termination point of the stub sill. In tank cars using foam insulation systems, using the dimensions provided in FIG. 10J, the respective cutouts are to have the following dimensions: cutout #1 18"×12", cutout #2 16"×18", cutout #3 8"×12", and cutout #4 10"×20". Then, all insulation material is to bee removed from the cutout area, including any insulation damaged during the cutting process. For foam insulation, it may be necessary to remove the insulation by blasting the exposed area in a manner known to those skilled in the art. A rigid rod or other implement is used to push the insulation material away from the entire area of the weld to be inspected to permit inspection thereof. It is preferred to use a flexible boroscope to inspect the welds. Cutout #1 is used to inspect the A9 welds shown in FIG. 10A. Cutout #2 is used to inspect the A1, A2, A8, B2, B3, and B22 welds shown in FIGS. 10A and 10B. Cutout #3 is used to inspect the A6 and A8 welds, shown in FIG. 10A. Cutout #4 is used to inspect B4, B5, B44, B4, and B8 welds. It may be possible to eliminate cutout #4 entirely while still accomplishing the inspection objective for that area by inserting the boroscope through the tank jacket flashing material. Following inspection of these welds, the inspection results are recorded in a suitable form and any defects are repaired in accord with accepted criteria. Following repair, the insulation is replaced. It is preferred to replace all insulation with 2" fiber frax (4.5 lbs/cf)applied against the tank and an additional 2" of fiberglass (1 lb/cm) over the fiber frax. Then, areas of the jacket removed to form the cutout sections must be repaired by welding an oversized patch over the cutouts. This patch should overlap the cutouts by at least ½" on a side beyond the jacket cutout. It is desired that the patch be painted using a similar paint type and color to the background so as to conform and blend into the original construction of the tank car. This patch must have rust proofing,preferably a 2 mil coating, applied to the tank shell side. It is noted that the dimensions provide in FIG. 10J are approximate and may vary based upon the lot number, customer, year built, etc. It is acceptable to alter any dimension in order to achieve a proper inspection of the welds.

FIGS. 11A–11H depict yet another preferred aspect of the invention wherein the detailed weld inspection in accord with step 2008 particularly relates to welds on tank cars built using the TY3, 021, 022, and 023 stub sill designs. Trinity Industries, Inc (TRN) was the primary builder for these stub sill configurations.

Figure 11A:
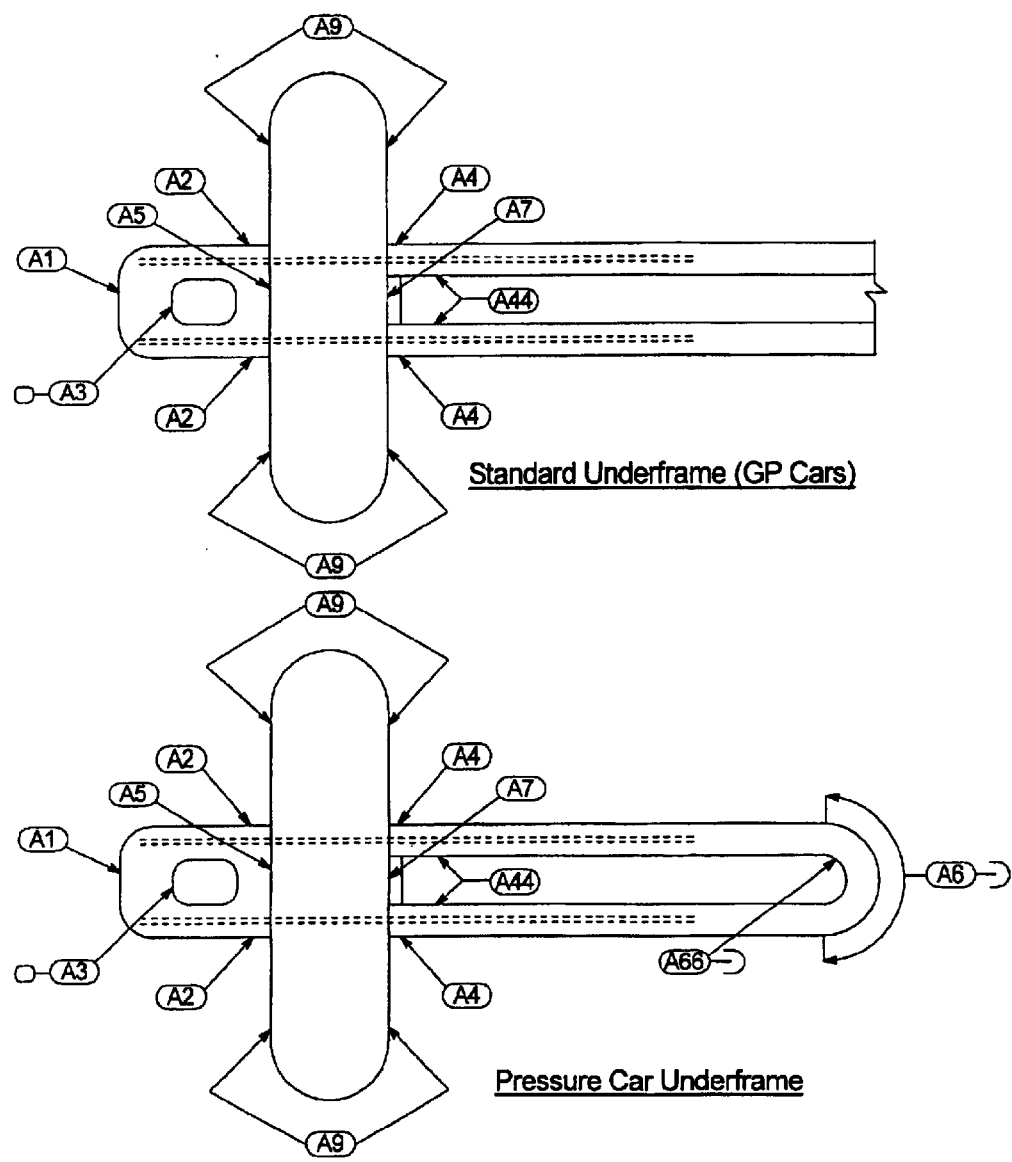
Figure 11D:
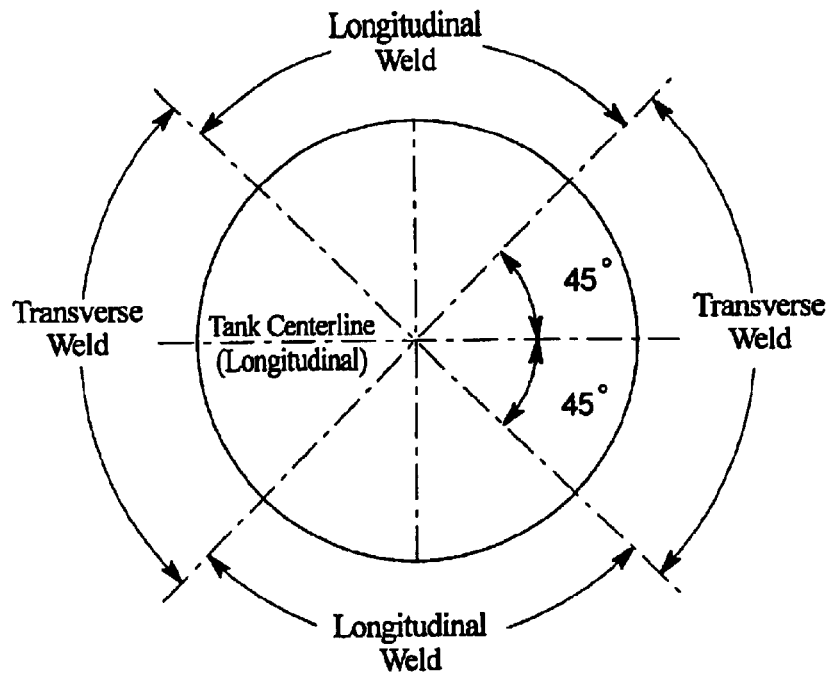
Figure 11E:
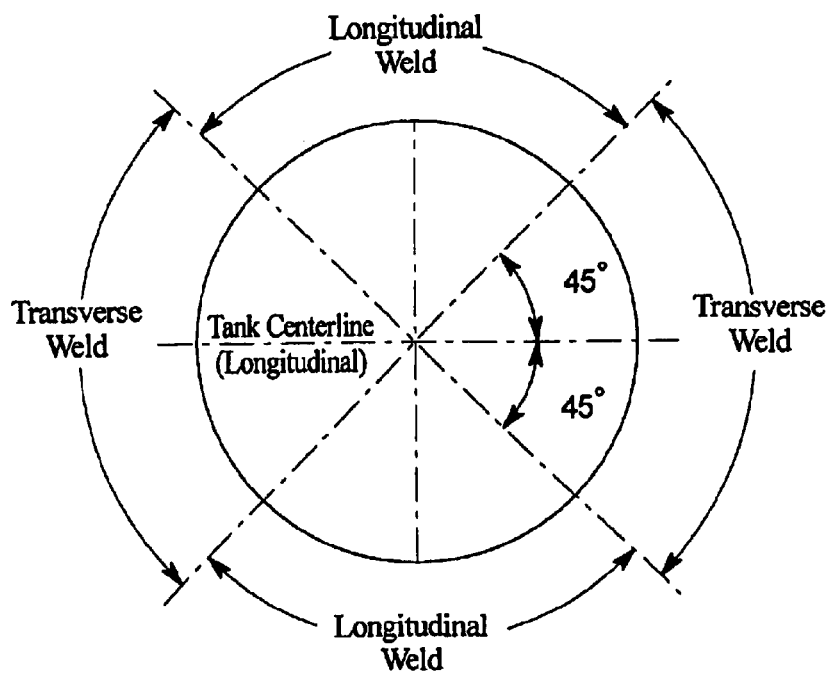
Figure 11F:
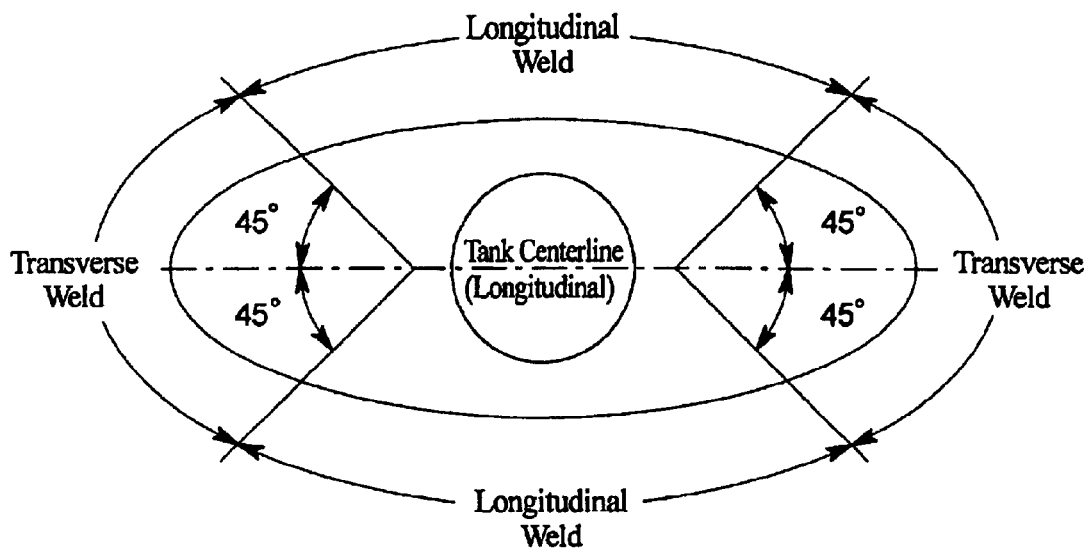
Figure 11G:
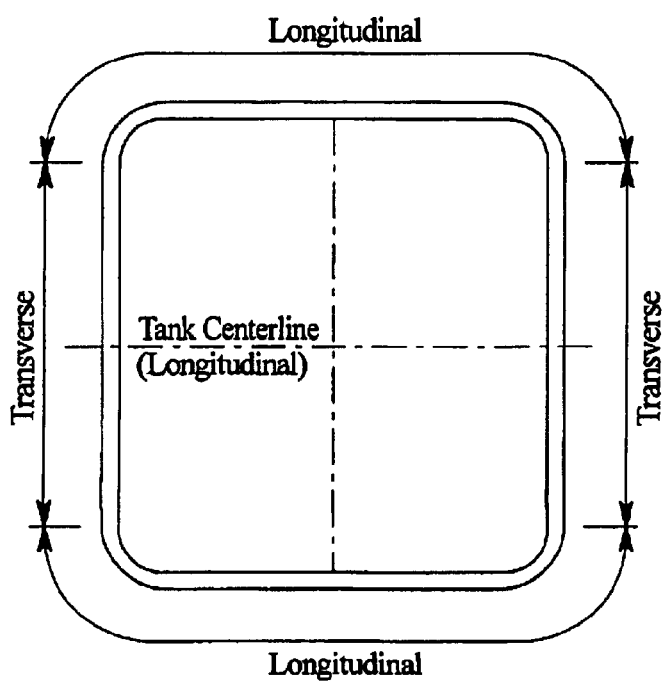

FIG. 11A shows various pad-to-tank weld locations. Weld location A1 satisfies inspection requirements under HM-201, SSIP, and Rule 88.B.2. It depicts a front sill pad-to-tank transverse weld located at the A and B ends and is inspected along a full length of the weld, including a portion around the corner of the pad. Weld location A2 meets HM-201, SSIP, and 88.B.2 requirements and depicts front sill pad longitudinal welds located at the A and B end right and left portions. A full length of the weld to termination at the bolsterpad is inspected. Weld A3 meets HM-201 requirements and shows fillet welds in the front sill pad-to-tank cutout located at the A and B ends. A full length of the weld is inspected. Weld locations A4 meet HM-201 requirements and show cradle pad longitudinal welds having outboard termination located at the A and B end left and right sides. A 6" portion of the weld from termination is inspected. Weld locations A5 meet HM-201 and show a front sill pad-to-bolsterpad transverse weld located at the A and B ends. A full length of these welds is inspected. Weld A6, which does not apply to general purpose tank cars, meets HM-201 and 88.B.2 requirements. A6 shows inboard termination of cradle pad longitudinal welds at the A and B ends. A last 6" of the longitudinal portion of the weld and a full length of a transverse (radial) portion are inspected. Weld location A7 inspection meets HM-201 requirements and depict a reinforcing bar to bolster pad transverse weld at the A and B ends. A full length of the weld is inspected. Weld A9 meets HM-201 and shows a bolster pad-to-tank transverse weld. The A9 welds are found at the A and B ends at the right and left inboard and outboard positions. A 36" portion of the weld from the junction with the cradle pad is inspected. Weld location A44 inspection meets HM-201 and 88.B.2 requirements and shows termination of re-bar to tank longitudinal weld (inside of re-bar). These welds are located at the A and B end left and right sides. The last 6" of the weld is inspected, including a portion of spacer bar to re-bar longitudinal butt weld. Lastly, weld A66, which does not apply to general purpose tank cars, meets HM-201 and 88.B.2 requirements. A66 shows termination of re-bar to tank longitudinal welds (inside of re-bar & inboard of bolster) located at the A and B end left and right sides. A last 6" of the weld, including a transverse portion of the weld in re-bar pad is inspected.

FIG. 11B shows sill-to-pad weld locations. Each of these weld locations satisfies Rule 88.B.2 requirements. Weld location B2 shows outboard termination of longitudinal weld (outside of sill) located at the A and B ends at the left and right sides. The last 6" of the weld to termination is inspected. Weld location B4 is the inboard termination of the longitudinal weld (outside of sill) located at the A and B ends at the left and right sides. A last 6" of the weld including any portion of the weld that wraps around the sill and connects with B44 is inspected. Weld location B22 is the outboard termination of the longitudinal weld (inside of sill) located at the A and B ends at the left and right sides. The last 6" of the weld is inspected. Weld location B44 shows inboard termination of longitudinal weld (inside of sill) located at the A and B end right and left sides. The last 6" of the weld is inspected.

FIGS. 11C–11G depict, in many respects, the general weld locations, relation to regulatory requirements, and inspection requirements set forth with respect to FIGS. 5C–5G, above, and the related discussion. The discussion of the related material is not repeated herein and the differences therebetween, particularly with respect to FIG. 10C, may be gleaned from review of the appended figures. Further, the draft sill and draft sill pocket inspection in accord with the invention and in accord with Rule 88.B.2, including inspection of the splice plates welds (MSa), Wing bar welds (MSb), Vertical stiffeners (MSc), and slot welds (MSd) are inspected as described with respect to FIGS. 5A–5H and will not be repeated.

Figure 11H:
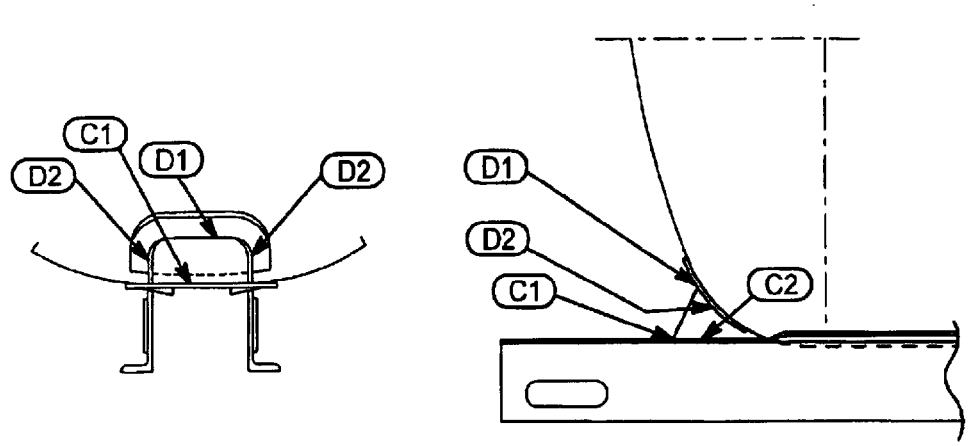

FIG. 11H depicts headbrace welds for headbrace cars inspected in accord with the invention. Each of the weld inspection locations satisfies both SSIP and Rule 88.B.2 requirements. Weld C1 shows a headbrace-to-sill transverse weld located at the A and B ends. A full length of the weld including a portion which curves around the corner of the headbrace is inspected. Weld location C2 inspection shows a headbrace-to-sill longitudinal weld located at the left and right sides of the A and B ends. A full length of the weld is inspected. Welds D1 and D2 show, respectively, a headbrace-to-pad transverse weld located at the A and B ends and a headbrace-to-pad longitudinal weld located at the left and right sides of the A and B ends. A full length of these welds is inspected and the inspection of the D1 weld additionally includes corners.

FIGS. 12A–12H depict yet another preferred aspect of the invention wherein the detailed weld inspection in accord with step 2008 particularly relates to welds on ZBN stub sill designed tank cars, primarily manufactured by Union Tank Car Company (UTC).

FIG. 12A shows various pad-to-tank weld locations. Weld location A1 satisfies inspection requirements under HM-201, SSIP, and Rule 88.B.2. It depicts a front sill pad-to-tank transverse weld located at the A and B ends and is inspected along a full length of the weld, including a portion around the corner of the pad. Weld location A2 meets HM-201, SSIP, and 88.B.2 requirements and depicts front sill pad longitudinal welds located at the A and B end right and left portions. A full length of the weld to termination at the bolster pad is inspected. Weld A3 meets HM-201 requirements and shows fillet welds in the front sill pad-to-tank cutout located at the A and B ends. A full length of the weld is inspected. Weld locations A4 meet HM-201 requirements and show cradle pad longitudinal welds having outboard termination located at the A and B end left and right sides. A 6" portion of the weld from termination is inspected. Weld locations A5 meet HM-201 and show a front sill pad-to-bolsterpad transverse weld located at the A and B ends. A full length of these welds is inspected. Weld location A6 meets HM-201 and 88.B.2 requirements. A6 shows inboard termination of cradle pad longitudinal welds at the A and B ends left and right sides. A last 6" of the longitudinal portion of the weld and a full length of a transverse portion are inspected. Weld location AS inspection meets HM-201 requirements and depict cradle pad-to-tank slot welds at the A and B ends (between 2 and 16 places per tank car). The last 6" of the weld at each end of the slot is inspected. Weld A9 meets HM-201 and shows a bolster pad-to-tank transverse weld. The A9 welds are found at the A and B ends at the right and left inboard and outboard positions. A 36" portion of the weld from the junction with the cradle pad is inspected.

Figure 12D:
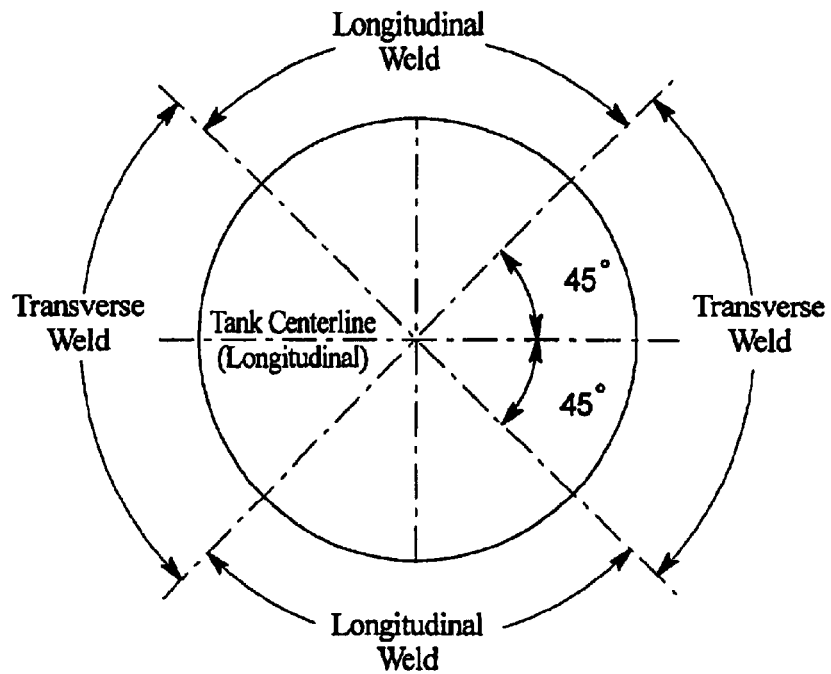
Figure 12E:
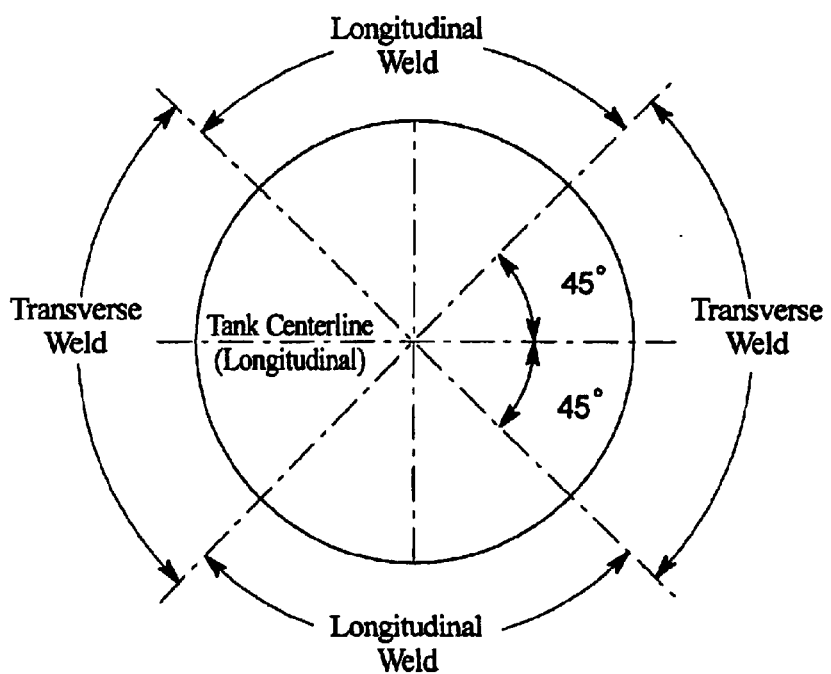
Figure 12F:
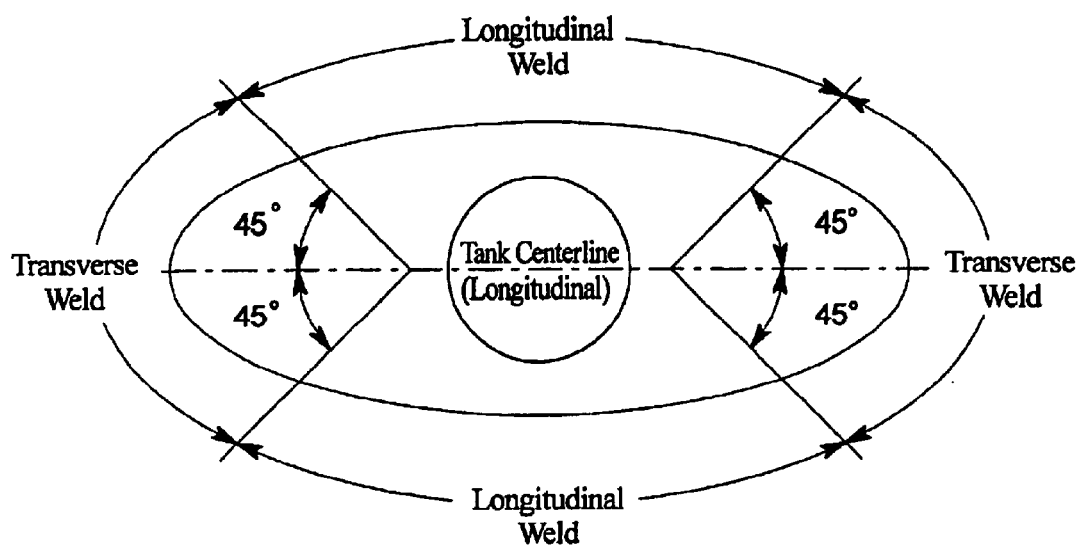
Figure 12G:
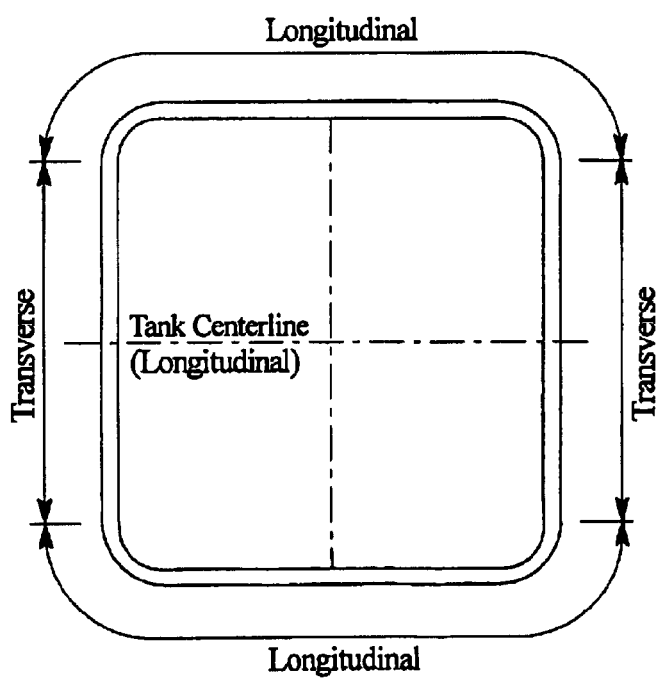
Figure 12H:
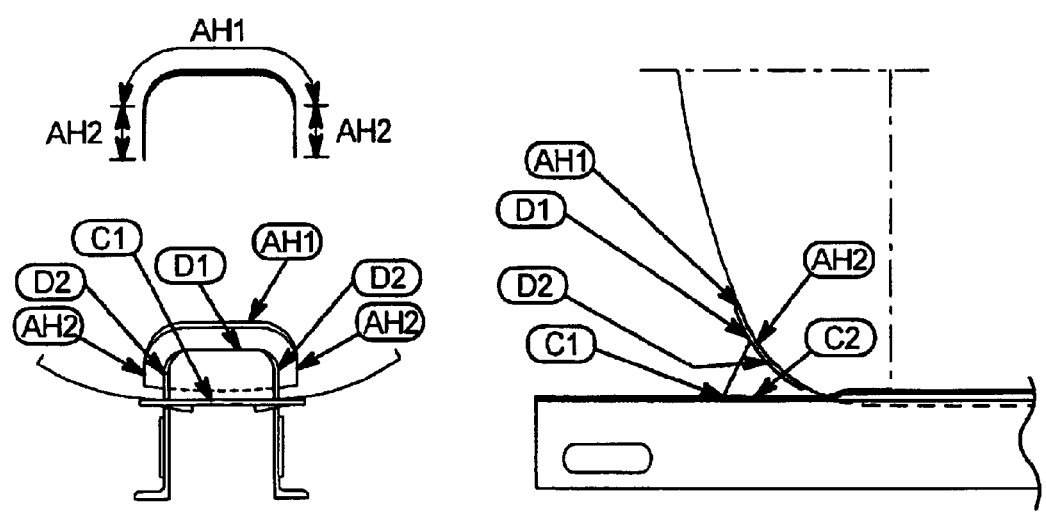

FIGS. 12B–12G depict, in many respects, the general weld locations, relation to regulatory requirements, and inspection requirements set forth with respect to FIGS. 11C–11G, above, and the related discussion. FIGS. 12H similarly depicts the general weld locations, relation to regulatory requirements, and inspection requirements set forth with respect to FIG. 5H, above, and the related discussion.

Although several preferred embodiments of step 2008 have been discussed above, these examples are non-limiting and merely serve as examples of the different types of weld inspections required in the present invention. In other words, there are other tank car designs not included herein which would also require development of inspection procedures and methods in accord with the invention Following the above visual inspection, step 2009 is performed. In this step, it is determined if the car has an interior heater coil or coils. A tank car possessing interior heater coils is depicted in FIG. 4B.

Subsequent to this determination, ultrasonic flaw detection on all circumferential butt-welds of the tank shell which are two feet from the bottom of the longitudinal center line of the car, is carried out in steps 2010 or 2012. As depicted in the flowchart of FIG. 3, manual ultrasonic welding is performed in the event the car has interior heating coils and automatic ultrasonic welding is performed in the event the car does not have interior heating coils. Although not indicated, manual ultrasonic welding may also be performed when the tank car does not have interior heating coils. After ensuring of the ultrasonic tester in a manner known to those skilled in the art, the weld and surrounding areas are cleaned if necessary to remove, for example, residual commodity, weld splatter, rust scale, rust bloom, and surface pitting in excess of about 0.030", to permit accurate inspection of the circumferential butt-welds, shown in FIG. 13A. It is preferred that, at a minimum, the circumferential butt-welds within approximately two feet of each side of the bottom longitudinal centerline are inspected using an ultrasonic flaw detecting device.

Defects, such as but not limited to indications of a weld crack, a weld lack of fusion, or a lack of weld penetration, are considered rejectable when the indication is at or near the far surface of the weld (e.g., at an end of a weld leg) and the amplitude of the indication exceeds approximately 10% of the distance attenuation curve (DAC), as understood by those skilled in the art. Such defects occurring in other positions along the sound beam are preferably considered unacceptable if the amplitude of the indication exceeds approximately 20% of the DAC. An indication producing an amplitude exceeding 100% of the DAC and a length of the indication is greater than about 0.25 inches, even if it is not found to be a weld crack, lack of fusion, and a lack of penetration. It is preferred that the location of the indication within the tank car is documented, as well as the defect type, weld code, defect length, and repair procedure. A detailed description of manual and automatic ultrasonic welding is omitted, as such knowledge is considered to be within the skill of the art and is not itself, central to the inventive concepts expressed herein.

Figure 13B:
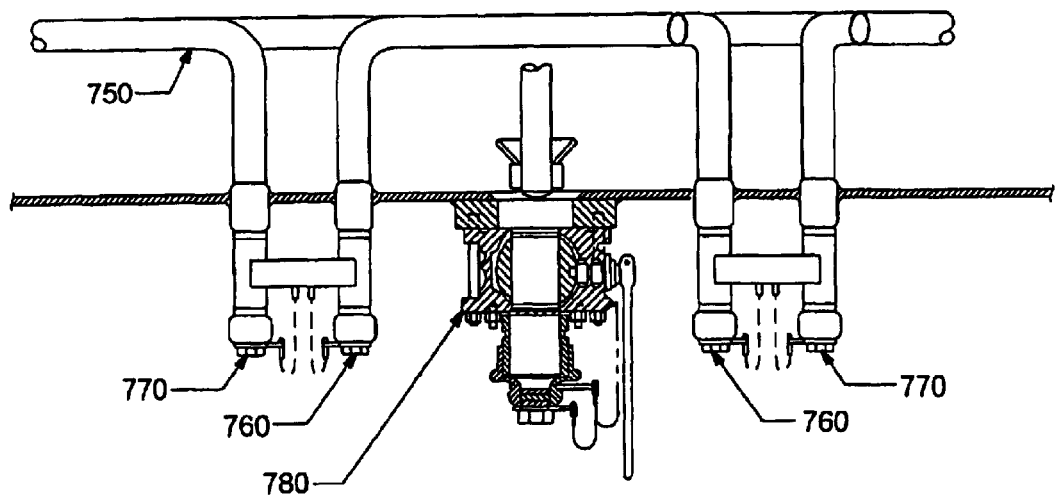
FIG. 13B illustrates a typical coil leg arrangement.

In step 2011, a hydrostatic coil test is performed if the tank car is found to possess interior heating coils. First, an in-process air test is performed by applying threaded reducers with hose connections and shut valves to the bottom of each coil leg 750, connecting the air hose to each set of coils to identify each coil leg as the inlet 760 or outlet 770, as shown in FIG. 13B, and using shop air (e.g., about 90 psi) to pressurize the coils. Following pressurization, the shut valve 780 is closed and a bubble test may be performed or a technician may listen for air leaks in the coils to determine if there are any leaks. No leakage is acceptable and any defective coil must be repaired prior to performing the hydrostatic test. This test is repeated for each coil leg. Following the air test, a hydrostatic test is performed. A hydrostatic test pump with a calibrated pressure gage is installed and used to fill the coils with water and facilitate bleeding the air from the coil system through an open outlet valve until only water is expelled. After all of the air has been removed from the system, the outlet valve is closed and the coils are pressurized to 200 psi. After the pressure has stabilized at a pressure of about 200 psi, the shut valve is closed and the pump disconnected. The coils are then visually inspected for any evidence of leakage, particularly in the areas of the pipe clamps 437, coil return bends 432 and anti-shift brackets, if present (not shown), as shown in FIG. 4B. Additionally, the pressure should be maintainable for a minimum of 10 minutes with no drop in pressure over that time period. This test should be repeated for each set of coils. Upon completion of the test, all water is removed from the coils.

At the completion of either of steps 2011 or 2012, an ultrasonic examination of the tank shell, heads sumps, manways and nozzles of each compartment is carried out in step 2013. Ultrasonic examination of these elements applies to all tank cars requiring tank requalification in accord with the invention and it is additionally recommended for any tank cars going on assignment order and/or any tank cars that visually indicate mechanical or corrosion damaged. Any ultrasonic testing device may be used so long as it is capable of accurately measuring shell thickness to within +/−0.002 inches (+/−0.05 mm). As known to those skilled in the art, transducers having a piezoelectric crystal are used to generate/receive sound waves to/from the test material via a couplant. It is also desired to calibrate the ultrasonic testing device using a calibration block made of a material acoustically similar to the tested material.

This inspection typically begins with a visual inspection for evidence of damage and the inspection is performed after it is confirmed that there is no evidence of corrosion damage or mechanical damage. A first type of corrosion damage is general corrosion which occurs over a broad area and may include random pits or groups of pits and varies extensively in nature. The corrosion is considered to be local corrosion if the damage is contained to an area of about 2 square feet or less, wherein the local corrosion is typically grouped pitting wherein adjacent pits are separated by a distance of less than two times their average diameter, random pitting wherein adjacent pits are separated by more than two times their average diameter and do not exceed two pits in any 6-inch by 6-inch (152 mm×152 mm) area, and grooved corrosion longitudinal to the tank much like a ring around a bathtub. If the damage is in scattered areas, it is preferred that the measurements are taken in a number of areas which appear to be the deepest.

Figure 14B:
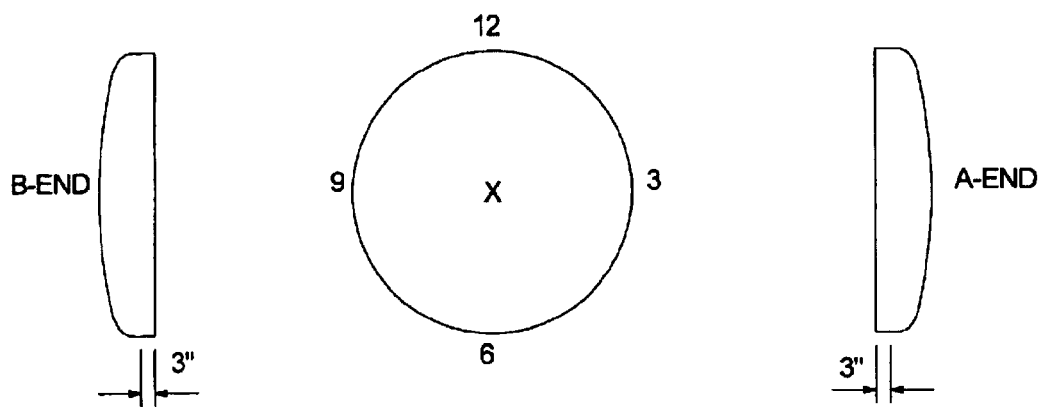
Figure 14C:
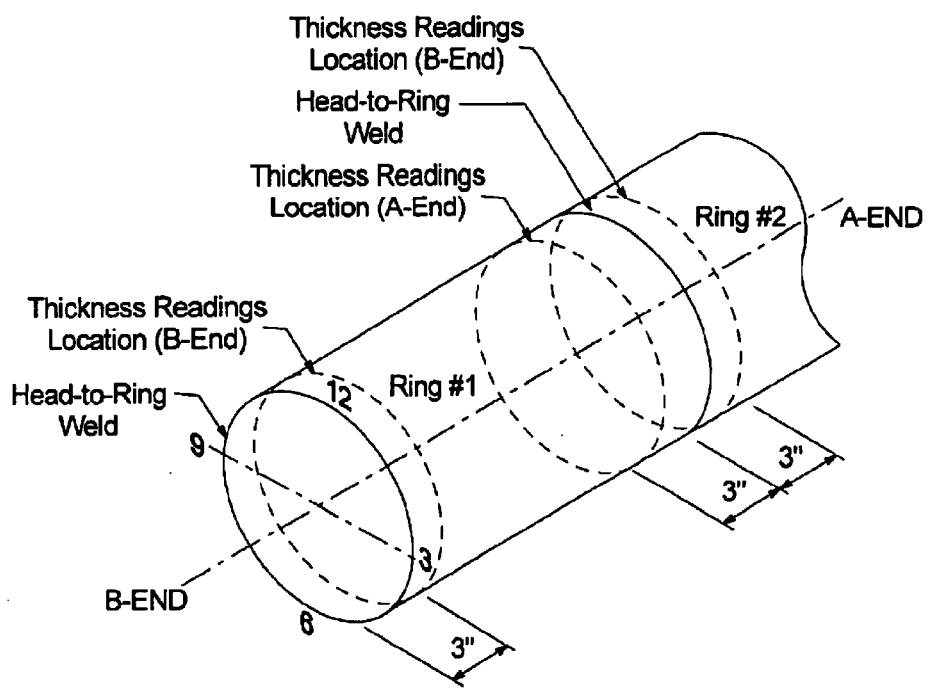

It is preferred that the damage type and location be specifically identified prior to repair and measurement. If the damage is in the head or shell, the location should be documented(i.e., A-end or B-end). First, the location of the damage relative to the inside or outside of the tank should be recorded. The type of damage, namely general, local, or mechanical should then be indicated as well as the cause of the damage if determinable, such as gouges or tool marks for mechanical damage. The clock position of the damage should be recorded, wherein the clock position is shown in FIG. 14A. Generally,the bottom of the tank is considered to include the 5 and 7 o'clock positions and other clock positions are considered to be in the top of the tank. If the damage is in the shell, it is preferred to record the ring in which the damage is located, wherein the rings are numbered sequentially starting with the number one ring at the B-end as shown in FIG. 14A. To provide an indication of the damage location along an axis of the tank car, an appropriate reference point, such as the B-end circumferential butt weld, for example, may be selected to provide a measure of a linear distance from that reference point. To properly characterize the damage, it is also desired to measure and record the longest cross sectional distance across the damaged area. For pitting, an approximate concentration of pits in a predetermined area such as a 6"×6" area, and a depth of the pits may also be used Further, it is desired to measure and enter the smallest reading in the damaged area prior to any repair and again after repair. Damage to service openings, such as the sump(s), manway(s), pressure plate nozzles, safety valve nozzles, or unloading nozzles, should also be defined. For example, if there are multiple openings, the one closest to the Bend will conventionally be identified as opening #1, with other openings receiving correspondingly higher numbers as designators, such as opening #2, as shown in FIG. 14A. All openings are divided into 2 hemispheres transverse to the horizontal centerline of the tank; the half circle closest to the A-end and the half circle closest to the B-end as shown in FIG. 14A, sectional view A—A. The damage can then be characterized relative to the axial distance from the center of the damaged area to the inside of the shell The service life shell thickness test, itself, should start at the B-end head. Four readings should be taken approximately 3 inches from the circumferential weld. The readings should be taken at 12 o'clock, 3 o'clock, 6 o'clock and 9 o'clock as shown in FIG. 14B, and one measurement should be taken in the center of the head. The same pattern should be used for the A-end head. For each of the rings, as shown in FIG. 14A, it is preferred to obtain 4 readings approximately 3 inches from each of the circumferential welds bounding the ring at the 12 o'clock, 3 o'clock, 6 o'clock and 9 o'clock positions. Thus, each ring will have 8 readings. Stated another way, circumferential welds disposed between adjacent rings have 4 readings taken on one side of the weld (i.e., displaced 3" toward the B-end) and 4 readings taken on another side (i.e., displaced 3" toward the A-end), as shown in FIG. 14C. Shell thickness readings of local openings should be taken at two readings on the horizontal centerline of each service equipment opening. The first reading should be on the B-end within 3" of the inside shell diameter wherein, as noted previously, openings are divided into 2 hemispheres perpendicular to the horizontal centerline of the tank; the half circle closest to the A-end and the half circle closest to the B-end. The second reading should be on the A-end within 3" of the inside shell diameter. The appropriate opening number and clock positions should be indicated. If there is damage in the area where a Service Life Shell thickness measurement is to be taken, it is preferred to take the measurement in an undamaged area as close to the designated clock positions as possible.

Following recording of the desired information specifically identifying the damage location, the damaged areas should be ground flush prior to taking the thickness readings, removing as little of the parent metal as necessary to obtain accurate readings. Larger areas of damage preferably have measurements that cover the entire length and width of the damaged area. A minimum of 6 readings is desired for a narrow band with a proportionately increasing number of readings as the area of the damage increases. Further, the thinnest measurement in each area should be documented.

Next, in step 2014, a visual inspection of the thermal protection system, tank head puncture resistance systems, coupler vertical restraint systems and system s use to protect discontinuities(e.g. skid protection and protective housings) is carried out to ensure their respective integrity. With respect to the thermal protection system, the Federal Regulations mandate such an inspection, but fail to provide a method for carrying out the inspection. In accord with the present invention, however, the thermal protection system is inspected as follows. To inspect the thermal protection system of tank cars equipped with spray on thermal protection and no exterior jacket (i.e. DOT 112T340), the underside, sides, ends and top of the tank are to be visually inspected for missing, loose, blistered, gouged, split, thinned, or through-thickness cracks in thermal coating. Evidence of any or all of these conditions is cause for repair or replacement. Particular attention should be paid to the tank shell-to-tank head transition, manway, multi-housing, bottom outlet fittings (if equipped), and draft sill areas. Cracking or imperfections in the coating that do not extend to the exterior of the tank shell are acceptable. Jacketed tank cars equipped with foam or cork insulation are not required to be inspected to this section, as shifting of these types of thermal protection is uncommon. For jacketed tank cars equipped with other types of insulation,a small diameter drill bit, preferably less than ¼" diameter, with a length not to exceed the thickness of the thermal protection, preferably 3" long or less, is used to drill a single hole in each section of the tank car jacket and on both sides of the manway (in the direction of the A- and B-ends) at the 12 o'clock position. This position is selected since voids in the thermal protection would most likely be evident at the top of the tank, the insulation possibly having settled or shifted toward a bottom of the tank over time. At each drilled hole location, the drill bit is inspected for signs of fiberglass insulation. If insulation is present, it will be pulled through the drilled hole or attached to the drill bit. If no insulation is present on the drill bit or in the area of the drilled hole, it is preferred to remove a 6" by 6" portion of the tank jacket in the area of the drilled hole after which the area is inspected for signs of slipped, missing, or wet insulation. All areas of the jacket that have been inspected using the drilling operation must be repaired. An oversized patch with a rust proof coating applied to the tank shell side may be used for this purpose. Following welding of the patch, the patch is preferably painted to blend in with the original construction.

Other systems inspected in accord with step 2014 include a visual inspection of the tank head puncture resistance system, if the tank car is so equipped. Head protection is generally shaped to the contour of the tank head and the thickness is measured to ensure that the material thickness is at least 0.5". Tank cars equipped with full head protection should have ultrasonic thickness readings taken at the center position and at the 3, 6, 9, and 12 o'clock positions. Tank cars equipped with half shield protection should have UT thickness readings taken at the center position and at the 3, 6, and 9 o'clock positions. Holes or physical damage able to compromise the integrity of the head protection is not acceptable. Coupler vertical restraint systems are to be visually inspected to verify that the coupler is an E or F Type with a double shelf design in accord with Rules 16, 17, and 18 of the Field Manual of the AAR Interchange Rules. Protection for bottom discontinuities (e.g., skid protection) is provided first, by determining the commodity being carried in the tank car. If 49 C.F.R. §§172.101 and 173.31 (list of hazardous substances) list the commodity being carried, Level A protection is required. Visual verification of this level of skid protection is required. Finally, a visual inspection of protective housings around the valves mounted to the pressure plate and the accessory plates is required to ensure the housings are not missing or damaged.

In step 2015 the safety relief device is removed from the tank car and visually inspected for damage in accord with the details provided below. In step 2016, the device is tested with air to ensure that it conforms to the hazardous material specification for start-to-discharge pressure characteristics.

In general, step 2015 is performed on all cars requiring requalification in accord with the invention and with the requirements of 49 C.F.R. §180.509 and Alternative Tank Car Qualification Program TCQ-1 Appendix B to DOT-E 12095. Further, it is preferred to perform step 2015 on all tank cars that are bad ordered for leaking or through visual inspection indicate evidence of leaking on any safety relief device. However, step 2015, as described below, shall not be performed on tank cars in chlorine service. Instead, inspection and testing of all chlorine service safety relief devices under steps 2015 and 2016 should be performed in accord with the Chlorine Institute, Inc. Pamphlet 39.

Step 2015 requires inspection of the safety valves, the top guide, valve stem, o-ring groove, valve body, valve spring, spring follower, and o-rings. For internal style valves the top guide is principally a structural part and there should be no paint on the guiding surfaces of this part. In other words, there should be no paint where the valve stem enters the guiding part or between the adjacent surfaces of the top guide and valve body. The area of discharge through the top guide should be unobstructed by foreign matter that would hinder free flow of discharging fluid. The valve stem's threads should be clean and lightly lubricated. If the threads are slightly galled, a thread die should be run over the affected area. The entire length of the valve stem should be wire brushed to remove scale, solidified product, and other foreign material and inspected for cracks. The stem is also to be visually inspected to ensure that it is not bowed and rotated on a flat surface to inspect for bowing or out-of-round conditions. If the stem is bowed or out-of-round, it must be replaced. The O-ring retainer's groove for the O-ring must be free of pits, vertical chatter marks, corrosion, rust, etc.

Since the O-ring must seal against this surface, any discontinuities in the o-ring can cause the valve to leak. If a light sanding with fine emery paper does not effectively clean the groove, this part should be discarded, and a new one obtained.

The condition of the valve body is very important to the inspection of the safety valves in accord with step 2015, since a good seating surface is necessary to prevent leakage. The sealing surface is located at the topside of the valve seat and must be free from imperfections. The surface should be cleaned with fine emery paper and inspected for flaws, which may be detected tactilely. No machining of this surface is permitted. However, the underside surface of the valve body that seals the valve to the mounting on the car may be machined, as necessary. Also consult AAR Manual of Standards and Recommended Practices, Section C, Part III, Appendix E for the dimensions and applicable tolerances. Further, the valve spring is a highly stressed part and, correspondingly, the exterior surface must be free of pitting, cracks, and corrosion. The hardness of the coils should be verified by a conventional hardness tested,the measured hardness not exceeding Rockwell C 44. The spacing between coils when the valve spring is in the set position is also inspected and there must be sufficient deflection left to permit the valve stem to fully lift. Between 30% to 40% of the deflection (total spacing between coils in the free position) should remain after the valve is at the set or start-to-discharge(STD) position. The spring should not be bowed when in the set position. As little as ¼" of bowing can cause the spring to bear on the inner diameter of the spring guide tube. If any of the above defects exist, the spring must be replaced. The spring follower is a structural part that has guides on its outer edges. To inspect the spring follower, it should be moved up and down the length of the spring guide, to check for binding. If it binds in an area, look for dents or bent surfaces in the tube. These must be removed, or the valve may be stuck in the open position,or be stopped from opening. Finally, the o-rings are "perishable" parts and should be replaced with a like o-ring when the valve is retested.

Safety valve bench testing in accord with step 2016 is generally performed in accord with and in reference to Appendix A of the AAR Tank Car Specification manual for the Start to Discharge Pressure (STD), the Vapor Tight Pressure (VTP), and the tolerances that apply to these pressures for the valve being tested. The correct dimensions for the mountings of all valves are shown in Appendix E of the AAR Manual, noted above. To bench test the valve, the safety relief valve must be removed from the tank car with care being taken to cover the nozzle opening to avoid introducing contaminants to the car. The valve is installed on the test fixture and the drain holes closed with putty, or similar material. The valve body is then filled with water and the tester positioned to observe the pressure gage and also the bubbling of air in the bowl of the valve body. Air is introduced into the test chamber and test chamber air pressure is slowly increased until the valve's STD is reached. Drop the pressure until the leakage stops and go down several additional psi. Then slowly increase the pressure. Observe the STD pressure, then bleed off the pressure slowly to ascertain the VTP. It is preferred that these steps are repeated several more time to ensure that the STD and VTP are consistent on all three occasions following initial discharge and fall within the prescribed pressure ranges, as defined in FIG. 15A.

If the STD and VTP do not fall within the prescribed pressure ranges shown in the table of FIG. 15A, the spring

Figure 15B:
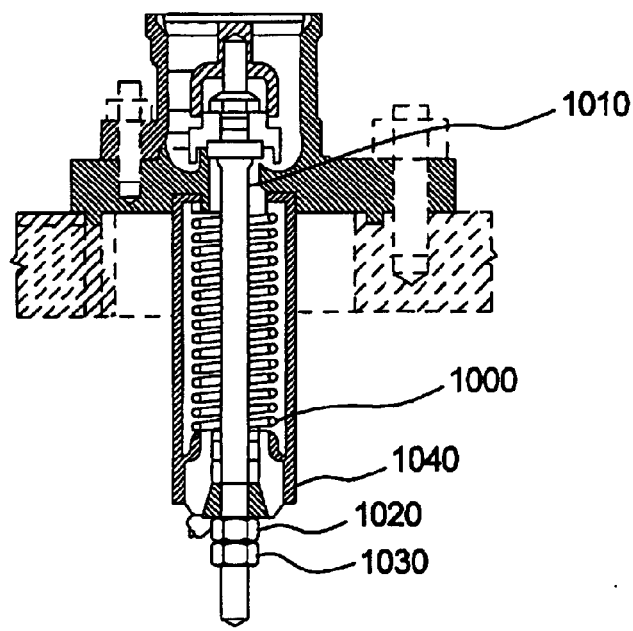
FIGS. 15B–15E show a variety of valves tested in accord with the invention.
Figure 15C:
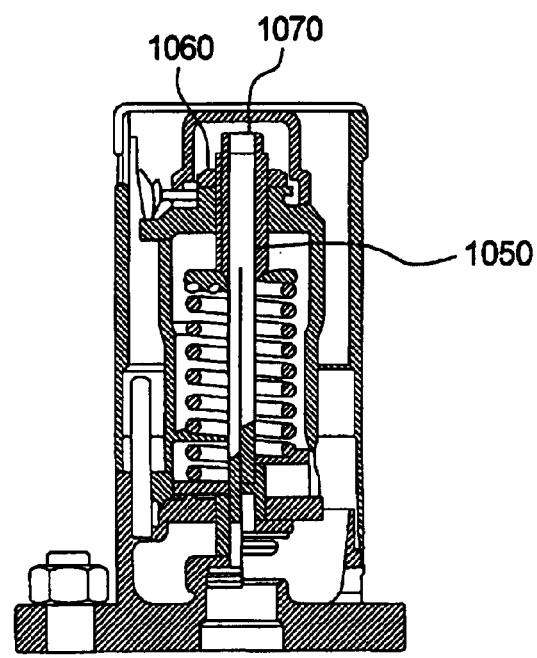

1000 of an internal style valve, shown in FIG. 15B, may be adjusted. Following lubrication of the threads of the valve stem 1010, the upper 1020 and lower 1030 adjusting nuts are separated. With the valve upside down, the spring is compressed to take pressure off the upper adjusting nut 1020, using a manual or air operated press. It is preferred to use a tubular fixture that is partially cut away to press down on the spring follower, further compressing the spring, since all nickel bearing stainless steels have a likelihood of galling and wrenching the adjusting nut without relieving the spring's load will frequently result in galled stem threads. The bottom adjusting nut 1030 and the spring follower 1040 should be marked and the nut should be turned down two turns if the STD value was too high and up two turns if the STD value was to low. Then, release the press, tighten down on the bottom lock nut 1030 to lock the setting and retest the valve for STD and VTP as indicated above to determine how much pressure change occurred when the adjusting nut was moved two turns. If the test results then fall within the prescribed pressure ranges in FIG. 15A, tighten the upper and lower adjusting nuts together with 45±15 ft-lbs torque to prevent them from loosening in service. If the test results are not within the prescribed pressure ranges, the above steps are repeated, altering the amount of turns the adjusting screw is turned, as necessary.

If the STD and VTP do not fall within the prescribed pressure ranges shown in the table of FIG. 15A, the valve spring of a top mounted valve may, illustrated in FIG. 15B, can also be adjusted. Following lubrication of the threads 1050 of the valve stem, the locking nut 1060 and the lower adjusting screw 1070 are separated. The adjusting screw 1070 is then turned two turns down if the STD valve was too high and up two turns if the STD valve was to low during the tests. Then the locking nut 1060 is tightened down onto the adjusting screw 1070 to lock the setting and the above STD and VTP tests are performed to determine how much pressure change occurred when the adjusting nut was moved two turns. If the test results are within the prescribed pressure ranges in FIG. 15A, the locking nut and adjusting screw are tightened with 45±15 ft-lbs torque to prevent them from loosening in service. If the test results are not within the prescribed pressure ranges, the above steps are repeated, altering the amount of turns the adjusting screw 1070 is turned, as necessary.

Following bench testing of a combination device, such as a top mounted valve with rupture disc, as outlined above, without the rupture disc in place, the combination device must also be tested with the disc and disc flange in place. The under side of the valve body that is pressed down on the disc must be completely free of imperfections and if such imperfections are present, it must be replaced since no re-machining is permissible to try to salvage this part. After the disc flange has been thoroughly cleaned, the disc is inserted into the cavity of the flange and the valve is slowly lowered into place, ensuring that the part of the valve body that fits against the disc is perfectly centered. Care should be taken to avoid fracture or damage to the fragile rupture disc. After tightening the flanges in place and determining that a gap size between flanges is consistent all around the flange, the assembled combination valve is affixed to the test stand. If there is a needle valve, pipe plug, or other type of indicator on the side of the valve closing off a bleed hole into the chamber between the disc below and the valve body above, open it to relieve pressure in this area. As with the other valves, the pressure is slowly increased in the test chamber, however, it is important not to allow the pressure to exceed 60% of the disc's rating or the disc may sustain damage by exceeding the yield strength of the material. It is preferred to place an approved leak solution over the bleed hole opening or needle valve outlet and around the circumference of the flange joint to permit visual indication of leakage. A bubble may form initially due to initial upward deformation of the disc and corresponding compressing the air in intermediate chamber. There is no leakage if; after a minute or so, the bubble size remains constant and no leak at the flange joint is evident. Air pressure may then be slowly vented from the test stand and the valve removed.

If, however, the bubble grows in size, a pressure leak into the intermediate valve chamber is indicated. The pressure from the test stand must be vented, the valve removed, and the bolts holding the valve to the rupture disc unscrewed. The disc should be inspected for a little pin hole sized leak in the crown of the disc or where the crown meets the flat part of the disc. If the disc does not have a vacuum support and teflon liner, holding the disc up to a light may show the presence of a pin hole size leak. The radiused-seating surface of the disc should also be inspected for creases or small bumps that could be leak paths. Further, the disc flange and mating surface on the underside of the valve boy should be inspected for any imperfection. If there is any imperfection in the disc, it cannot be salvaged and must be replaced.

After testing, the test stand's pressure inlet valve into the test chamber is closed, the pressure in the test chamber is relieved, and the valve is removed from the test fixture. The valve is then drained, if necessary, cleaned, and tagged to indicate internal seal material to ensure compatibility with assigned car and commodity. The test date information should be indicated on the tag.

Figure 15D:
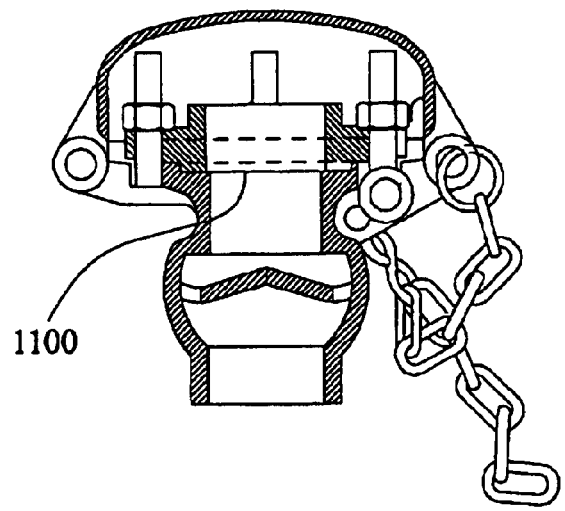

Regarding safety vents, as shown in FIG. 15D, all safety vent components are inspected for proper working conditions and damaged parts. Any excess commodity, rust, or paint that would prevent the proper functioning of the safety vent should be removed and the rupture disc 1100 should be visually inspected to determine the manufacturer's name or identifying mark and burst pressure in psi. If the rupture disc 1100 is unmarked, ruptured, contains an improper disc, or possesses a burst pressure is below tank test pressure, it should be replaced.

Figure 15E:
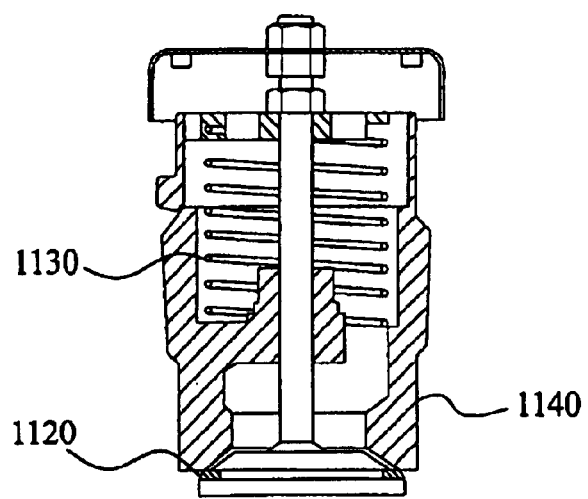

Regarding the vacuum relief valve inspection, all vacuum relief valve, such as that illustrated in FIG. 15E, components should be inspected for proper working conditions and damaged parts and any excess commodity, rust, or paint that would prevent the proper functioning of the vacuum relief valve should be removed. All replacement pressure seals 1120 shall be from the original equipment manufacturer and must be compatible with the commodity in the tank car. The metal to metal seats between the stem 1130 and valve body 1140 must not be machined or lapped.

Next, in step 2017 it is determined if the car has a lining for the protection of the tank shell. In the event that it does, then in step 2018 the ownership of the liner is determined. In the event that it is owned by an entity which is different from the owner of the car, then at step 2019 the appropriate inspection procedure is obtained from the customer who owns the liner and in step 2020 the testing of the liner is carried out according to the owner's requirements. On the other hand, if the liner is not owned by a separate entity, then at step 2021 the liner is inspected in accord with the methods provided below.

Figure 22:
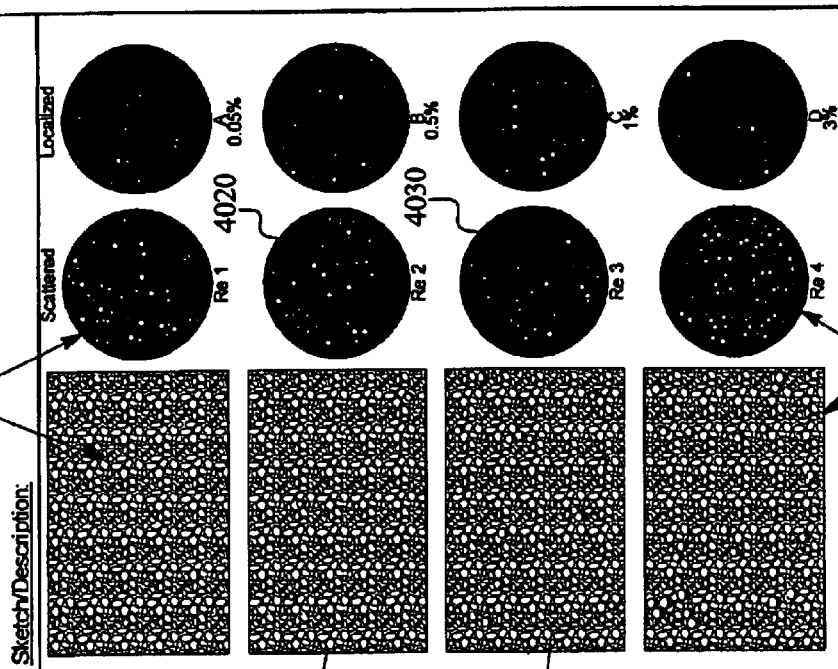
FIG. 22 shows models generated in accord with the invention for a corrosion defect condition.

In accord with the lining inspection method herein, there is laid out a systematic process to gather and record information suitable for short-term operability determinations, such as a pass/fail test, as well as long-term trending and analysis. This is accomplished, generally, by correlating observed defects to predetermined models, which are in turn correlated to other parameters of interest to determine a lining condition and to set an appropriate inspection period for a subsequent lining inspection. Such correlation is advantageously effected by means of an indices or matrices setting forth the relations between, for example, observed defect conditions on one axis, a parameter of interest on another axis, and the condition to be determined within the data field (e.g., lining acceptance/rejection disposition). This data format provides rapid identification of the appropriate inspection period or repair indication, but is not limited in structure or concept thereto. Examples of preferred matrices are shown in FIGS. 18*a* and 19. Prior to execution of the lining inspection in accord with the invention, a plurality of defect inspection categories must be determined and defined. Thus, by way of background and clarity, a variety of defect conditions to be inspected will first be discussed. These defect conditions include, for example, cracks, blisters, and corrosion. Cracking, as shown for example in FIG. 21, is a condition that occurs when there is a break in the lining or coating surface that extends to the substrate along at least a portion thereof when view under a magnification of less than about 10×. Blistering is illustrated in FIG. 20 and is a defect peculiar to painted or coated surfaces and is manifested as groupings of blisters or bubbles under the surface of the outer layer of paint or coating. Corrosion, shown in FIG. 22, is generally a result of chemical interaction between the lining material, coating material, and/or substrate with other chemicals or elements present in the environment, such as the interaction of carbon steel, oxygen, and water to generate rust.

The inspection may also include inspection for dry film thickness (DFT). For a given application, it is conservatively desired to maintain a minimum dry film thickness. The dry film thickness may be inaccurately applied, resulting in thickness variations, or the film thickness may be chemically or mechanically abraded over time by various means.

With such defect conditions in mind, a method of standardizing a test procedure for inspecting a vessel adapted to contain commodities can be developed as depicted in FIG. 16. This method of standardizing a test procedure includes, in step 3000, defining at least one defect type to be inspected, such as a crack inspection. Generally, it is preferred to select for inspection more than one defect type including, for example, cracks, blisters, and corrosion. Subsequently, in step 3100 a plurality of defect severities within this defect type, or plurality of defect types, are defined, establishing a scale by which an observed defect severity may be measured and, in step 3200, this plurality of defined defect severities are generated into a model of each of the defect severities within each defect type. FIGS. 19–22 illustrate models of blistering, cracking, and corrosion, respectively. These models may be, for example, physical 3-D models, 2-D graphical models, or even electronic models compatible for use, for example with image recognition systems or electronic displays. In a preferred form, these models are graphical models or 2-D pictures included in and printed on a written procedure used by the inspector during inspection of the lining. Exemplary 2-D graphical models are illustrated in FIGS. 19–22, illustrating models used to determine the degree of blistering, cracking and corrosion.

As shown in FIG. 20, the blistering defect type is divided into five severity levels or degrees of size 3800 ranging from Number 10 (no blistering), Number 8 (smallest blister easily seen by eye), Number 6 (small blistering), Number 4 (medium blistering), and Number 2 (large blistering). Although the Number 10 condition is not depicted, the remaining defect severities are represented by reference numerals 3810, 3820, 3830, and 3840, respectively, depicting standardized models for each of these blistering severities. These models largely eliminate ambiguity as to how to appropriately characterize a particular defect type and severity. Additionally, provision is made for a frequency determination to describe the density of the number of blisters formed in a local area. Preferred codes are MD (medium dense), M (medium), and F (few), as represented by reference numerals 3850, 3860, 3870, respectively, which depict standardized models for each of these densities. The F category 3870 represents a situation wherein the blisters cover approximately 2.5% of the total area of a section of predetermined size surrounding the defect, such as an 8"×8" area. This increases to about 15% blister coverage for the M category 3860 and increases still further to about 45% blister coverage of the total area for the MD category 3850. This combination of defect size and defect density permits inspectors to easily and accurately characterize a defect severity and permits meaningful tracking and trending of the monitored condition.

Similarly in accord with the invention, the defect condition of cracking may be divided into three categories. Code I represents irregular pattern type cracking in which the breaks in the film are in no definite pattern. Code L represents line type cracking in which the breaks in the film are generally arranged in parallel lines, usually horizontally or vertically over the surface. Code S, the third type, represents Sigmoid type cracking in which the breaks in the film form a pattern consisting of curves meeting and intersecting usually on a large scale. Varying densities or severities of the Code S cracking 3900 are depicted in four categories in FIG. 21, ranging from a Number 8 (reference numeral 3910), Number 6 (reference numeral 3920), Number 4 (reference numeral 3930), and Number 2 (reference numeral 3940).

FIG. 22 further shows the defect condition of corrosiveness divided into four categories 4000 including Re1 (smallest corrosion easily seen by eye), Re2 (small amounts of corrosion), Re3 (medium amounts of corrosion), and Re4 (large amounts of corrosion), respectively represented by reference numerals 4010, 4020, 4030, and 4040.

It bears emphasis that the 2-D graphical models discussed above with reference to FIGS. 19–22 are merely illustrative of models which may be developed and are not limiting to either the number of severities that may be defined for a particular defect type, nor are the defect types confined to those depicted.

Step 3300 of the invention includes correlating each of the above noted models for one or more selected defect types to a corrosiveness of a transported commodity to determine a repair disposition of the lining in relation to the models. FIG. 18*a* represents, in a matrix form, this correlation of models for several selected defect types to a corrosiveness of a transported commodity to determine a repair disposition of the lining in relation to the models. The defect types 3600 are provided at the left side of the matrix and are divided into cracks, blisters, and corrosion. These defect types are further subdivided into defect conditions or severities 3610 illustrated in FIGS. 19–22. Along the top of the matrix is category "P.P." 3620 for "product purity". Product purity represents linings for product purity and is assigned to products which require an exacting degree of lining integrity, including commodities such as food grade material and the like, wherein contact with the metal of the container can induce contamination and lower or ruin the commercial value thereof. Accordingly, in the event that the product is assigned a so-called P.P. rating, even the slightest deterioration raises the risk of contamination and the matrix correspondingly mandates repair as indicated by "R".

Commodity corrosiveness is divided into four categories 3630 ranging in increments of two between a category 6, the most severe corrosiveness, to a category 2, which possesses minimal corrosiveness, typically less than 0.0025 thousands of an inch per year. In the case of a highly aggressive (viz., corrosive) commodity, such as hydrochloric acid (arbitrary assigned a value of 6), the presence of any cracks sufficient to achieve even the minimum rating, mandates repair (designated by the letter R) in that damage to the tank will occur once the material has passed through the cracks and reached the underlying substrate, such as carbon steel. On the other hand, in the case of a less aggressive material such as vegetable oil (which is not corrosive to skin for example but which does in fact have an interaction with metals) can be assigned a lower value or index such as 2. Thus, as shown in FIG. 18a, even though the condition of the liner used in combination with a commodity having a commodity corrosiveness rating of 2 may be found to have deteriorated from the last inspection from a crack rating of 8 (shown as numeral 3910 in FIG. 21) to a crack rating of 6 (shown as numeral 3920 in FIG. 21), the need for repair is not indicated as being necessary, wherein "A" indicates an accept as is disposition. However, if the crack rating had deteriorated to a Number 4 condition, as shown by numeral 3930 in FIG. 21, the matrix would indicate repair, "R", was necessary. In this or a like manner, therefore, each of a plurality of defect types are correlated to a corrosiveness of a transported commodity to determine a repair disposition of the lining in relation to the aforementioned models.

In view of the above, the theoretical life of each lining is based on it's use with an appropriate commodity. Linings(or coatings) may also be assigned a scaled value indicative of the lining's chemical resistance rating, wherein 6 is highly chemical resistant, 5 is moderately chemical resistant, and so on to 2, which is not chemical resistant. FIG. 18b shows lining operating characteristics for a variety of commonly used linings. The estimated life is based on immersion of the lining in the most aggressive chemicals considered acceptable for use with the lining and thus represent a lower end of the life expectancy. As shown in FIG. 18b, the lining materials may be used for wide varieties of commodities, but are generally better suited for particular types or families of commodities than they are for other types of commodities. For example, (unmodified)high bake phenolic (400° F.) is resistant against most solvents and concentrated acids, but is less suitable for strong alkalis, whereas (modified) high bake phenolic (400° F.) has good resistance against strong alkalis, but not against strong acids. Similarly, salt is known to be very corrosive to steel, but it is not particularly aggressive toward coatings.

Thus, the life cycle of the lining may vary significantly depending of the actual commodity carried. Many cars, in fact, carry commodities that are less aggressive than the ones that were carried when the lining was originally applied. Therefore, it can be assumed that the theoretical life of the lining can be extended based on use in less aggressive service. The life cycle multiplier (LCM) is a factor based on the chemical resistance rating of the lining divided by the corrosive rating of the commodity. Similarly, an "extended" lining age or cycle (ELC) can be computed by multiplying the theoretical lining age by the LCM. Generally, if the LCM is less than unity the lining is considered incompatible with the commodity and should be replaced.

Thus, if a commodity with a corrosiveness rating of 6 is paired with an unsuitable lining having a chemical resistance rating of 4, the LCM is 0.667. For a lining with a normal estimated life of 8 years would be reduced to a life-cycle or ELC of about 5 years. If, however, a commodity with a corrosiveness rating of 2 was paired with the same lining, the ELC would be about 16 years, based purely upon considerations of chemical resistance and corrosiveness. It is possible for a lining to last even longer. Realistically, however, the theoretical life is rarely realized due to the action of numerous other factors including mechanical damage, such as but not limited to cracking, denting, abrasion, and vibration.

FIG. 19 shows the lining conditions at the time of inspection in relation to both the ELC and the lining condition. FIG. 19 uses the above models for various defect types and defect severities to associate a lining condition to an ELC and to one of a plurality of distinct combinations of models of one defect type and severity with models of another defect type and severity. In other words, as shown in FIG. 19, the matrix data fields include combinations of defect types and severities 3700 and provides, for any pairing of commodity and lining, a normalized ELC-based assignment of a lining condition based on observed defect data. In one such representative data field 3710, a lining is rated excellent if, after completing 50% of its complete extended life cycle, there are no cracks, no corrosion, no staining or discoloration. Blisters of a Number 6 size (or smaller) with a 2.5% density (Few rating) are permitted. Also, a DFT reading of greater than 6 mils is required. The DFT reading represents, in a preferred aspect, an average of all of the readings or an average of all except the lowest and highest readings. Other data fields are similarly assigned combinations of defect types and severities representing, in the aggregate, and in combination with liner extended life cycle data, distinct lining conditions.

The above method of standardization provides a method for testing the tank car lining in accord with 49 C.F.R §180.509. As noted previously,the lining or coating installed on the tank car is inspected according an inspection interval, test technique, and acceptance criteria established by the owner of the lining or coating. Prerequisite to any lining inspection, whether conducted in accord with the method of inspection in accord with the invention or in accord with some other method of inspection in compliance with 49 C.F.R §180.509, requires first, determining whether or nota particular tank car possesses a lining or coating for the protection of the tank shell and second, the ownership thereof if the lining inspection is performed by a facility other than the entity owning the tank car lining. If the lining is owned by an entity different from the entity performing the inspection and the owner has inspection procedures for the performance of the inspection, such procedures are obtained from the owner of the lining and the inspection of the liner is carried out accord with the owner's requirements in accord with 49 C.F.R §180.509. The owner may, naturally, opt to adopt or request the inspection to be performed in accord with the method provided herein as discussed below.

The test procedure for inspecting a vehicle adapted to transport commodities in accord with the invention is depicted in FIG. 17. In step 4100, the tank car lining is inspected. Step 4100 may include inspection for staining or discoloration of the lining or coated surface. All surfaces are visually inspected for signs of contrast in color. If such discoloration is observed, the inspector must use a cleaning solution such as a solution of 1% hydrochloric acid diluted in water in combination with a light colored, preferably white, cloth to determine whether or not the cloth is itself discolored by the stain.

Step 4100 also includes inspection for any crack, blister, and/or corrosion conditions on the liner, which are measured, evaluated, and recorded as described in subsequent steps.

DFT measurements may be obtained using a calibrated Type 2 magnetic fixed (constant pressure) probe gauge or like device. Calibration is performed in a manner known to those skilled in the art by placing a plastic or non-magnetic metal shim of a known thickness (i.e., a calibrated shim such as a shim calibrated and traceable to the NIST) closest to the expected or design dry film thickness on a clean metal surface to calibrate the gauge to within +/−1 mil of the known thickness of the shim. To measure the DFT, the gauge probe is placed on the coated surface and a thickness reading in mils is obtained and recorded. Starting at one end of the tank car, such at the B end, and stopping at the opposite end (i.e., the A end), measurements are taken at a predetermined plurality of positions, preferably including at least five measurement positions at each of the A-end head and the B-end head and are spaced apart at approximately the 3:00, 6:00, 9:00, and 12:00 o'clock positions as well as the end head center positions. It is also preferred to obtain readings at a plurality of equally spaced sections of the tank car lining (e.g., rings) between the A-end head and the B-end head, such as the circumferential bun-welds, at approximately the 3:00, 6:00, 9:00, and 12:00 o'clock positions.

In step 4200, any crack, blister, and/or corrosion conditions observed on the liner during step 410 are compared in step 4200 to the predetermined models, as noted above, wherein the predetermined models convey to the user of the procedure a discrete range of severity levels of the crack, blister, and/or corrosion conditions. The user then determines in step 4300, based on the above comparison, a severity level for the compared condition(s) and records, in step 4400, the severity level for the compared condition(s).

This test procedure may further include, in step 4500, cross-referencing the compared condition severity level with indices indicative of the corrosiveness of a commodity to be transported in the tank to determine if lining repair is required. Thus, one of an accept or repair disposition may be assigned to the lining in step 4600 if any one of the indices cracks, blisters, and corrosion conditions exceeds a predetermined minimum threshold for a specified commodity corrosiveness. For reasons discussed above, the method may also include determining if the commodity has a predetermined product purity level and accordingly modifying the repair status to one indicating repair in the event that any one of the cracks, blisters and corrosion effects exceeds a minimum value.

The procedure may also advantageously include determining a percentage of lining complete extended life cycle in step 4700 for an inspected lining to permit, in step 4800, association of the combined defect severity level of a plurality of the compared conditions to a discrete lining condition value in accord with the percentage of lining complete extended life cycle. In one aspect, this permits, as shown in FIG. 19, an inspector of a lining with a known ELC of 46% observing Number 8 cracks, No. 6 blisters with a 2.5% density, no corrosion, an average DFT of 9 mils, and total staining of 8 square feet would assign a condition rating of "fair" because the crack rating exceeds the tolerance for the "good" rating. Alternatively, since the age of the liner is known, but the accuracy of the ELC calculation itself is an estimated quantity, correlation of the actual lining condition to the predicted percentage of completed ELC permits verification of the ELC calculation. If the inspection results are, for example, consistently excellent for a completed ELC of 83%+ for a given commodity/lining combination, the ELC calculation may be revised to better comport with observed "real-life" data for the commodity/lining pairing. In this way, the collected data permits estimation of the remaining useful life of the liner in the aggregate given a statistically sufficient number of data points.

In various aspects of the above invention, the procedure may set forth that only a location of the most severe of each of the compared conditions is recorded. Alternatively, the procedure may set forth that a location of each of the compared conditions exceeding a minimum threshold is recorded. Still further, the procedure may integrate approximate total surface areas covered by affected surfaces. The invention requires only that the liner conditions are compared with predetermined models conveying a discrete range of severity levels of the defect conditions and a severity level therefor is determined.

It is preferred that the combined defect severity level is a combination of cracks, blisters, and corrosion conditions, as well as dry film thickness and discoloration conditions. However, if desired, additional factors could be considered and incorporated into the matrix or index including, for example, a correlation between the type or composition of the lining or coating and the corrosiveness of the commodity to account for potential variances in the rate of defect propagation between different linings used for the same commodity. In this regard, it is desired not only to obtain information specific to an immediate determination of operability over a determined inspection interval, but to obtain and record other data points, such as but not limited to lining type and construction, for trending purposes. Based on trending analysis of the data so obtained, the matrix may be adjusted accordingly in accord with the invention.

Although one preferred aspect of the test procedure for inspecting a vehicle adapted to transport commodities includes hard-copy graphical models on the pages of a procedure used by the inspector, it is within the scope of the present invention to enter or convert this data into an electronically readable format and to compile it in a computer readable database. Although present implemented with an IBM AS400 Legacy system, the invention may be implemented in a variety of computer processor based platforms and mediums.

Following the lining inspection in accord with either step 2020 or 2021, a leakage pressure test is conducted in step 2022.

For general purpose tank cars, all loading and unloading valves (if so equipped) on top of the tank car must be closed. The vacuum relief valve should be inspected for proper operation and seal. If the car is equipped with a bottom outlet valve, the bottom outlet valve should be closed and sufficient water (mixed with alcohol to prevent freezing if necessary) should be input into the car to cover the bottom outlet valve and mounting flange. With the car still under pressure and the bottom outlet valve closed, the outlet cap should be removed and checked for leaks at the bottom outlet valve (leaks are defined as one-drop or greater forms and flows in 5 minutes). If leaks are found at any of the bottom components, the pressure in the car is slowly released by opening the 1" air inlet valve (if equipped) at the top fitting location. If leaks are found, the leaks must be repaired and the above steps repeated. If no leaks are found, the valve is opened and water removed.

The manway cover gasket should be inspected for position and condition, and then closed and tightened. The car should then be pressured to a maximum of 5 psig and maintained at that pressure for 10 minutes. It is permissible to leak test all fittings at the 5 psig pressure to detect leaks prior to applying the higher pressure of 35 psig, discussed later. Following maintenance of 5 psig for 10 minutes, the car is pressurized to 35 psig and held at that pressure for 10 minutes. Bubble leak tests should then be performed on all applicable service equipment attachments, including manway/unloading cover, air inlet valve, vacuum relief valves, loading/unloading valves, safety valve inspection, safety vent/rupture disc, thermowell inspection, sample valves, and gaging devices.

With car under the 35 psig pressure and the bottom outlet valve closed; the outlet cap is to be removed and the plug checked for stripped threads. The condition of the outlet cap gasket should also be checked. If the car is equipped with a flanged connection on the bottom outlet adapter, the flange is to be removed and the gasket inspected. The outlet cap and plug, or flange and plug, as applicable, is reapplied and the bottom outlet valve is slowly opened to check for leaks. If leaks are found at any of the bottom components, the bottom outlet valve is closed and the pressure is slowly released by opening the 1" air inlet valve (if equipped)at the top fitting location. To prevent hydraulic binding, it may be necessary to loosen the outlet cap plug to release water in the outlet leg while closing the bottom outlet valve. If leaks are found, they must be repaired and the test repeated. If no leaks are found, test is complete.

For pressure tank cars, following verification that the pressure plate and all fittings have been properly torqued and are in the closed position, 50 psi of air is applied to the car either through one of the vapor valves, for cars not in chlorine service, and through a fourth angle valve in chlorine service cars following closure of the three remaining angle valves. The valve is then closed and the airline disconnected. To test the valve mounting joints in the protective housing 4900, all drain holes in the pressure plate are sealed and clean water poured into the protective housing 4900 until the top of the nuts securing the pressure plate to nozzle and the valve mounting flanges are submerged. Air bubbles should be dislodged, if possible, and the water should be monitored for about 5 minutes. If bubbles are observed, note should be made of each location and a second 5 minute focused observation should be made for each bubble observed. Any evidence of bubble formation, regardless of size or quantity, is cause to reject valve 4910 mounting or valve seat joint. The valve must be tightened, replaced, or gasket replaced to stop this leak.

Figure 23:
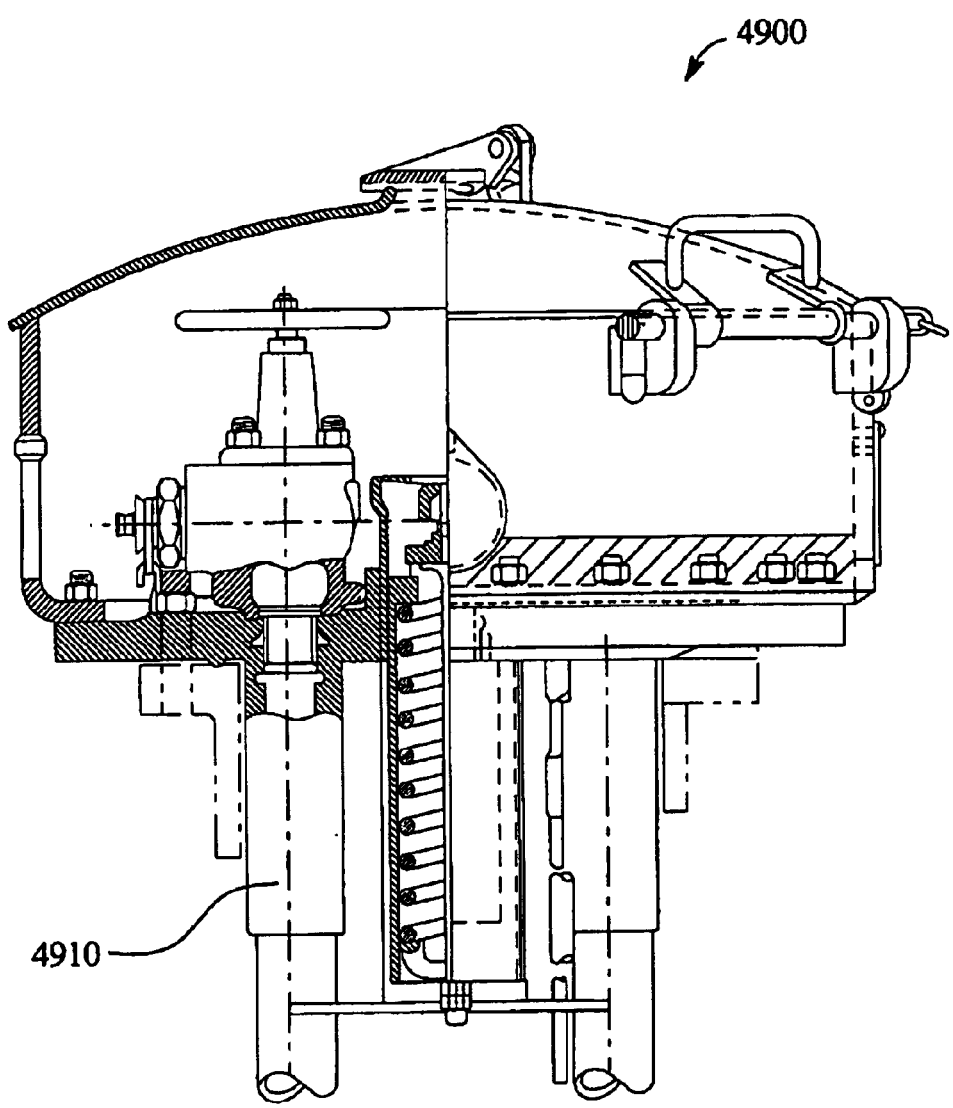
FIG. 23 depicts a typical protective housing arrangement.

If no bubbles are seen then the pressure plate to nozzle joint is tested. A circular piece of $\frac{1}{16}$", $\frac{1}{8}$" or $\frac{3}{16}$" closed-cell backing strip, gasket material, or appropriate caulking material approximately 103" in length for the 18" manway nozzle and approximately 109½" in length for the 20" manway nozzle is applied to the joint. This should create an open area approximately ¼" by ⅛". Ensure the gasket is tight in the joint and sealed all around the joint, as shown in FIG. 23. Alternatively,a circular gasket may be stretched around the outside of the pressure nozzle to create a sealed area between the pressure plate and nozzle and the gasket pulled down in a small area creating an opening approximately ¼" in length after which a tight gasket seal is verified. Leak detection solution is applied to the open area and the sealing gasket and 5 minutes is allowed to pass, to permit formation of bubbles, before inspection. Inspect for bubbles forming at the joint opening and at the top and bottom of the nuts securing the pressure plate to nozzle is then performed and any bubble formation or growth at the joint opening or at the stud bolts is sign of leakage and is cause for rejection. If leakage is found, the protective housing must be drained and the attachment bolts checked for appropriate torque. Following correction of any identified deficiencies, the test is repeated. If no evidence of leakage is found, the water is drained from the protective housing and the service equipment test performed.

The service equipment fittings test includes testing of the manway/unloading cover by application of leak detector solution to the gasketed joint between the manway and the manway cover and observation for 5 minutes. The air inlet valve is tested by applying leak detector solution to each threaded or flanged joint between the accessory plate and the valve bodies and attachment hardware. After checking the packing assembly to the valve stem and valve bodies,a dummy plug with a $\frac{1}{16}$" drilled hole is applied and the valve seats are checked by flowing leak detection fluid over the $\frac{1}{8}$" hole. The area should be observed for 5 minutes. For the vacuum relief valves, leak detector solution should be applied to each threaded or flanged joint between the accessory plate and the vacuum relief valves. The valve seats may be checked by flowing leak detection fluid over the vent or drain ports of the valve and completely covering the sealing surfaces of the seat. The vacuum relief valve area should be observed for 5 minutes. The loading and unloading valves should be leak tested per the appropriate manufacturer's recommended procedure.

The safety valve is inspected by applying leak detector solution to the top of the safety valve. Some valve designs may require removal of the vent stack or application of the leak detector solution to the exhaust ports of the safety valve. The safety valve area should be observed for 5 minutes. The safety vent/rupture disc is tested by applying leak detector solution to each threaded and/or flanged joint between the safety vent housing and the mounting nozzle. The disc seat is checked by applying leak detector solution over the disc and retainer ring and observing the safety vent area for 5 minutes. The thermowell is inspected by loosening the thermowell cap above the O-ring and applying leak detector solution to the joint of the cap to nozzle and to the exhaust ports on the cap. The thermowell area should be observed for 5 minutes. Alternatively, a ¼" pipe cap can be loosely applied to the threads and a leak detector solution applied around the threads at the cap. Yet another alternative is to apply a dummy thermowell cap with a $\frac{1}{16}$" diameter hole drilled through the center and exhaust holes closed off tightly to the threads and apply leak detector solution over the hole in the cap. Following any of these options,the area is observed for 5 minutes.

Sample valves are tested by loosening, but not removing, the ¼" plugs on any existing sample lines or gauging device and applying leak detector solution around the plug to valve body joint and around the joint of the sample valve to nozzle, followed by observation for 5 minutes. Gauging devices of the slip tube type are tested by applying leak detector solution to the packing gland nut at the stem and at the body joints and observing the packing gland nut areas for 5 minutes. Gauging devices of the magnetic type are tested by applying leak detector solution to the joint of the hex bushing to the gauging device body and to the joint between the rod and the hex bushing, followed by observation of the packing gland nut areas for 5 minutes.

Following acceptable performance of the service equipment fittings tests, the car is placed into the repair process in step 2023 or prepared for shipping. All loading/unloading valves are verified closed, closure plugs are removed from the valves that will be used to blow down the car, angle valves are opened, and the car is bled down to a slight positive pressure. Following the bleed down, all angle valves are closed closure plugs are applied using a pipe wrench. Compressed air is then used to blow the leak detector solution from the valves followed by application of seals and preparation of appropriate test completion documentation.

Figure 24C:
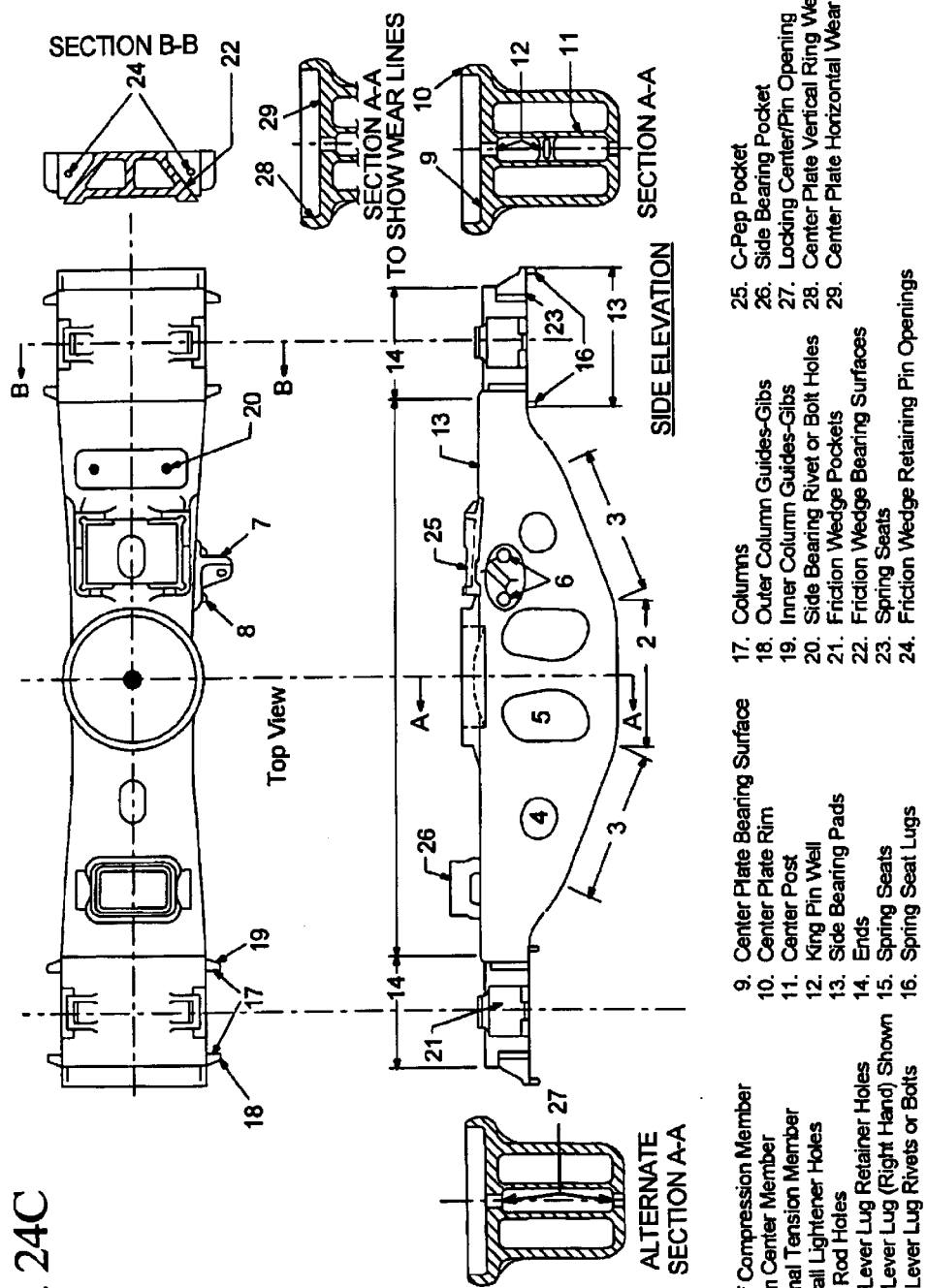

Additional inspections may also be added in accord with the invention to comply with Rule 88.B.2 of the Field Manual of the AAR Interchange Rules, as they relate to tank cars. An assembled truck, including friction plate 5000 mustache gage 5010, friction casting 5020 and limit of wear indicator groove 5030, and identification market 5040, is shown in FIG. 24*a*. For such an assembled truck, the friction shoe wedge rise may be measured using an appropriate mustache gage 5010 as shown. If the wedge guide exceeds the bolster and side frame clearance limits shown in FIG. 24*b*, then the trucks must be disassembled and inspected in accord with the requirements for disassembled trucks, provided below. If the trucks are to be disassembled, wear on truck side frame columns and bolster gibs must be measured before disassembly and when the wear exceeds the limits shown in FIG. 24*b*, they must be repaired. As shown in FIG. 24*a*, elements are in working order when the gage contacts point "X", as illustrated. If the gage does not contact the bolster at point "X" while resting upon both friction casting shoulders, repair is warranted. For typical truck bolsters, as shown in FIG. 24*c*, the truck bolster is inspected for broken, cracked, missing, bent, patched, or incorrect sizing. The truck bolster is also inspected for wear or corrosion wherein the section is reduced by 25%, with the exception of other wear limits provided herein. With respect to the center bowl, the diameters of the body center plate and the truck bolster bowl should be measured and the difference in diameter should not exceed 1⅜". However, the maximum worn bolster bowl diameter must not exceed 12⅞" (for a 12" diameter bowl) or 14⅞" (for a 14" diameter bowl) or 16⅞" (for a 16" diameter bowl).

Further in accord with Rule 88.B.2, the vertical wear liner is inspected for loose or missing pieces, two or more complete vertical cracks in the lining, and any cracks at the weld joint between the liner and the rim exceeding 50% of the total length, the latter requiring repair under an approved procedure. The horizontal wear liner is inspected for failure into two or more pieces or missing pieces. The horizontal shim is visually inspected to determine is it is wrong (i.e., not standard to the car) and the depth of the bolster bowl to the shim is measured and replaced if the bowl depth is greater than 1⁷⁄₁₆" (for a nominal bowl depth of 1⅛"), 2¹⁄₁₆" (for a nominal bowl depth of 1¾"), and 2⁵⁄₁₆" (for a nominal bowl depth of 2"). During the measurement, a ¹⁄₁₆" minimum clearance between the truck bolster rim and the body center plate must be maintained.

Figures 24D, 24E:
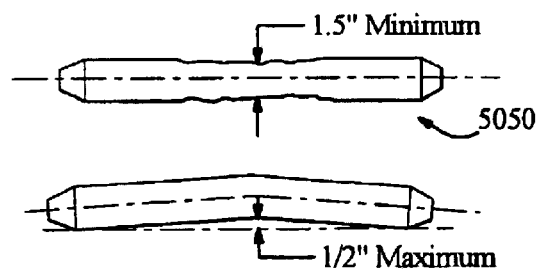

As shown in FIG. 24*d*, the center pin 5050 must be visually inspected to determine if it is cracked or broken more than ½". It must also be measured for wear and the diameter of the pin should not be less than 1½" and should be substantially straight, with a bend less than ½", as shown in FIG. 24*d*.

Figure 24F:
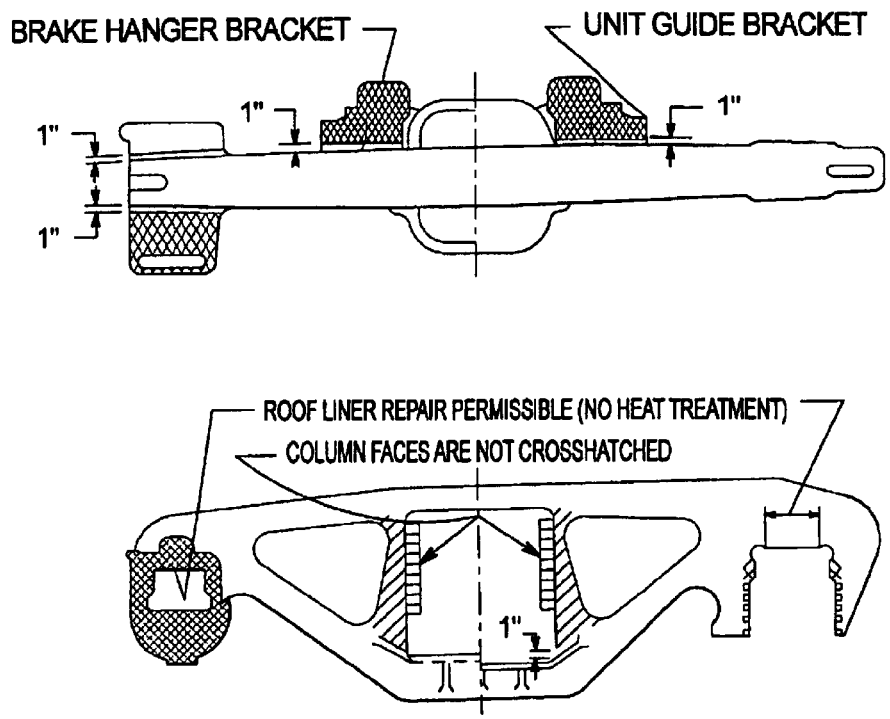

FIG. 24*f* shows a typical side frame. The side frame must be inspected to determine if it is broken, cracked, missing, bent, patched, incorrectly sized or missing. The side frame is also inspected for wear or corrosion in excess of 25% in any section of the side frame, except the brake hanger bracket, journal box column guide on which any section must not be reduced below 40% of the original section. Further, the side frames having "I", "T", or "L" section compression members, as well as frames having the pattern numbers listed in FIG. 24*e*, must be inspected and the number of buttons must match those within FIG. 24*e* within 1 for each side frame.

The wear indicator on the face of the friction casing must be inspected. Castings for ride control and barber trucks must be replaced when no evidence of the remaining wear indicator is visible. National trucks must be replaced when ¹⁄₁₆" or less of the wear indicator remains. The column guides must be visually inspected to determine if the measured wear exceeds the permitted wear shown in FIG. 24*b*. The brake hanger bracket is also inspected to determine if it is broken, bent, or worn oblong to a depth of one-half of its original diameter or if it is worn oblong so that remaining material is not less than 60 percent of the original section.

Lastly, for assembled trucks, the truck springs (e.g., coil, elliptic, snubbers, and packages) must be visually inspected for broken, missing or incorrectly sized springs. For snubbers equipped with sight glasses, the fluid should not be below the level of the sight glass. For snubbers not equipped with sight glasses, any evidence of fluid leakage within or more than three inches from the snubber should be noted and the side frame and spring group thoroughly cleaned. Any evidence of fire or heat damage must also be noted per Rule 95. Also, at the time of the above Rule 88.B.2 inspection, all tank cars equipped with D-3 truck springs must have double coil side springs and 609-D or appropriate castings applied, if not already equipped.

Figure 24G:
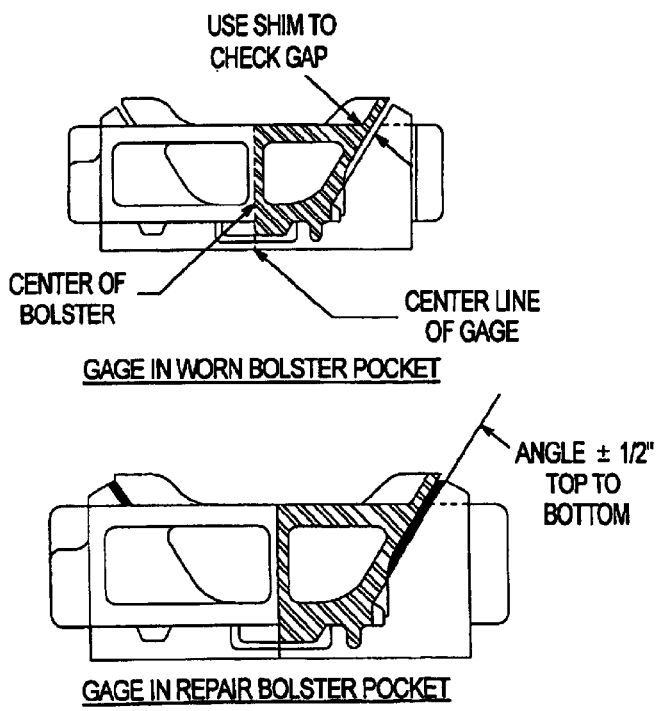

For disassembled trucks, the friction wear pockets must be measured with an appropriate gage, as shown in FIG. 24*g*. For Barber design bolsters, the gap should not exceed ⅛" and an SK-1698-6 gage is preferred. For Ride Control design bolsters, the gap should not exceed ³⁄₁₆" and an 1-7927-F gage is preferred. The pedestal thrust lugs of the side frames must be measured for lateral wear (not to exceed ⅛") and longitudinal wear (gauged to determine if buttons meet AAR standard S-378). The contour of the pedestal ceiling must also be measured for wear and must not exceed ¹⁄₁₆" depth using the ceiling wear gage described in Rule 48 of the Field Manual of the AAR Interchange Rules. Further, the free height of each load carrying spring must be measured to the limits provided in the table of FIG. 24*h*.

Further in accord with Rule 88.B.2, the draft systems and components are inspected, as generally illustrated in FIGS. 25*a*–25*k*. FIGS. 25*a*–25*g* relate to inspection of the coupler bodies. For an E-type coupler, shown in FIG. 25*a*, the contour is condemned when the measuring gage 5070, such as a 25623-1 gage, can be passed vertically through the contour in the position shown with points A and C contacting guard arm with the knuckle in the pull position, as shown. For an F-type coupler, shown in FIG. 25*a*, the contour is condemned when the measuring gage 5080, such as a 47120-2 gage, can be passed vertically through the contour in the position shown with point A contacting and substantially engaging the front face with the knuckle in the pull position, as shown.

Figure 25A:
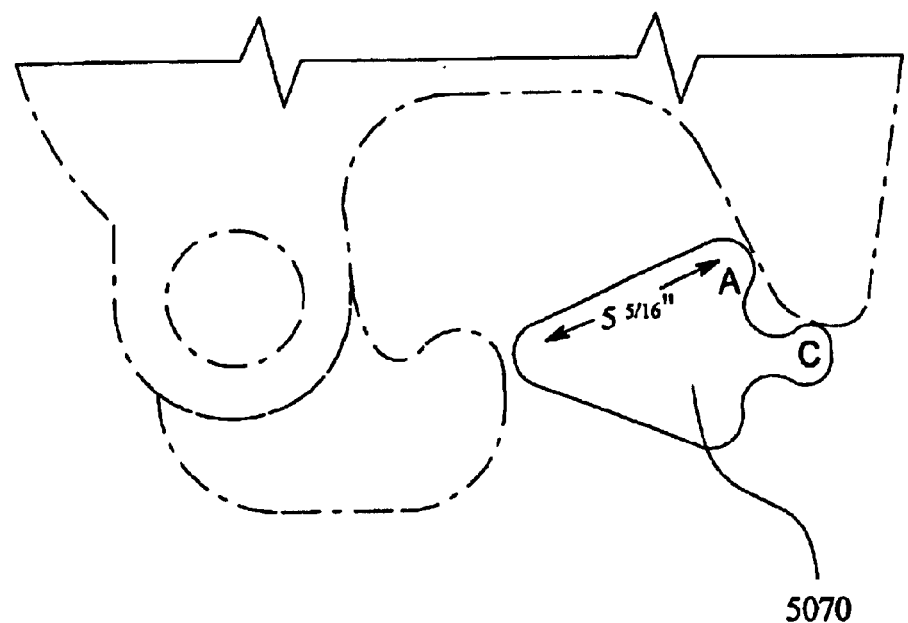
FIGS. 25a–k illustrate a draft system and component visual inspection method.
Figure 25B:
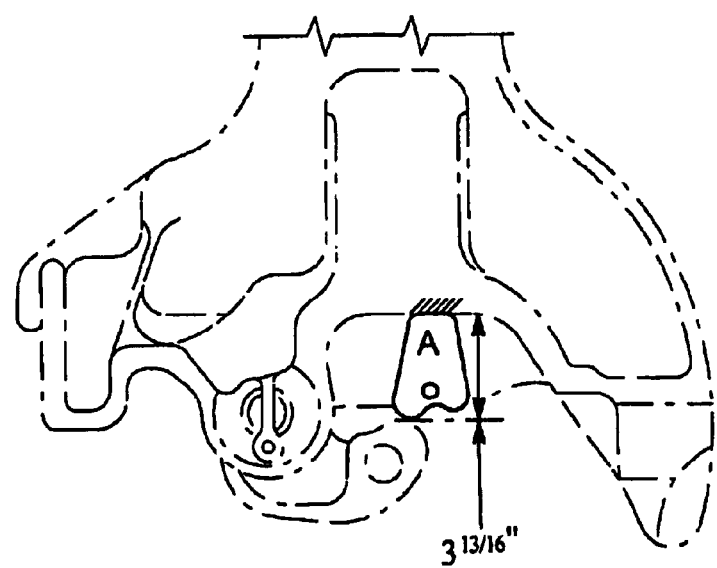
Figure 25C:
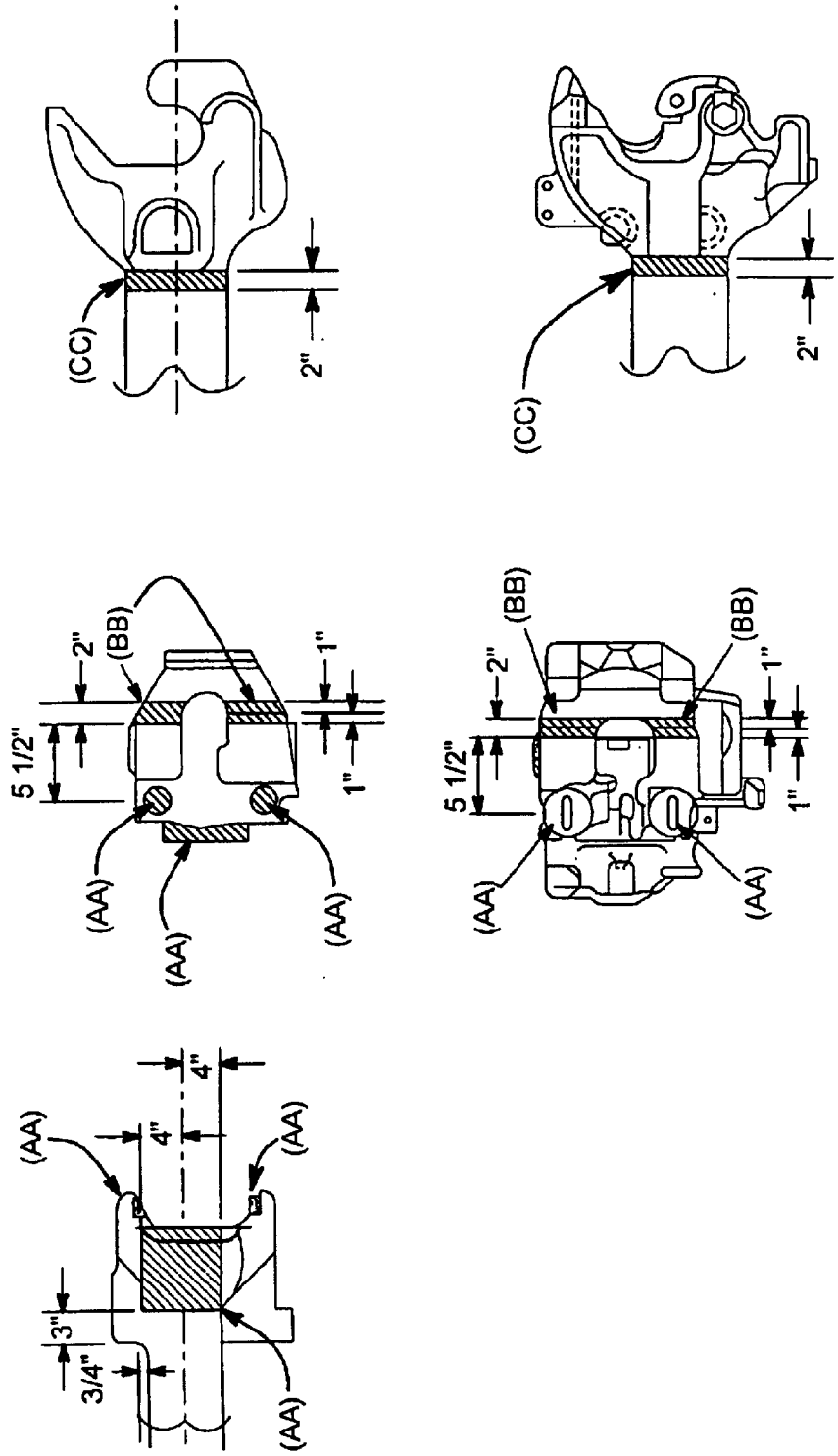

The coupler body is also inspected for cracks, defined as any fracture without complete separation into parts. Castings with shrinkage cracks or hot tears that do not significantly reduce the strength of the member are not considered cracked. Cracks are not acceptable when the extend beyond the shaded regions indicated in FIG. 25*c* by the label (AA). Cracks are also not acceptable if they extend 2" in length, or multiple cracks add to extend more than 2", within a panel 2" wide as indicated by the shaded areas labeled (BB) in FIG. 25*c*. Further, cracks the extend beyond the radius area between the horn and the shank as indicated by the shaded area (CC) in FIG. 25c, or one or more cracks extending 2" in length alone or in combination, are additive to such extent if multiple cracks are present, within the radius area between the horn and shank as indicated by the shaded areas labeled (CC). Also, the coupler bodies illustrated in FIG. 25c are inspected for cracks in the unshaded areas. The coupler bodies are also inspected for other defects, such as sections broken out in any area or bent or misaligned coupler body shanks out of alignment with the head by ½" or more. The coupler body shank is also to be visually inspected for wear greater than ⅜" deep in the bottom wall from contact with the coupler carrier.

Figure 25D:
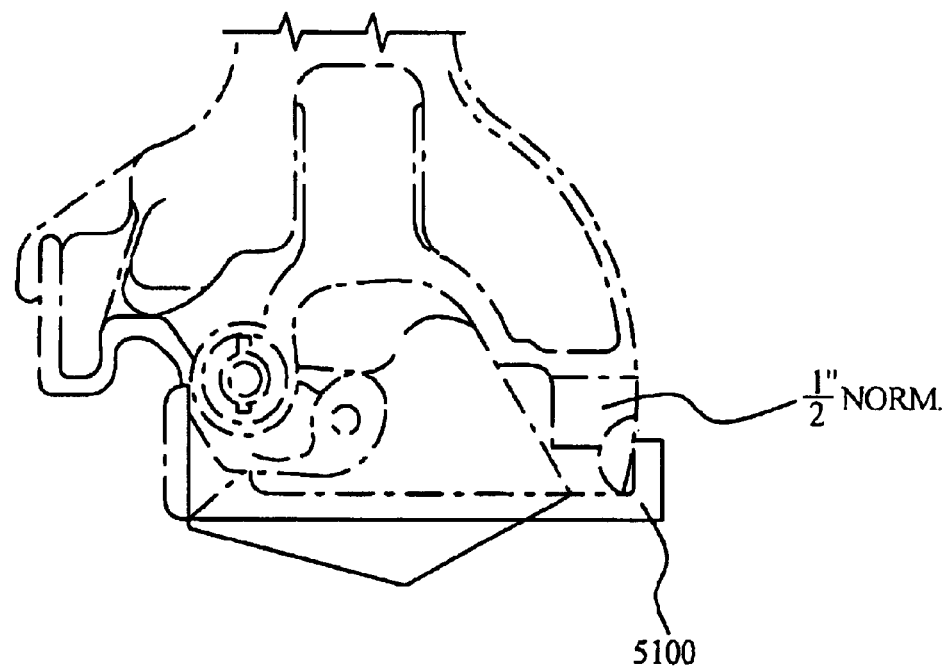
Figure 25E:
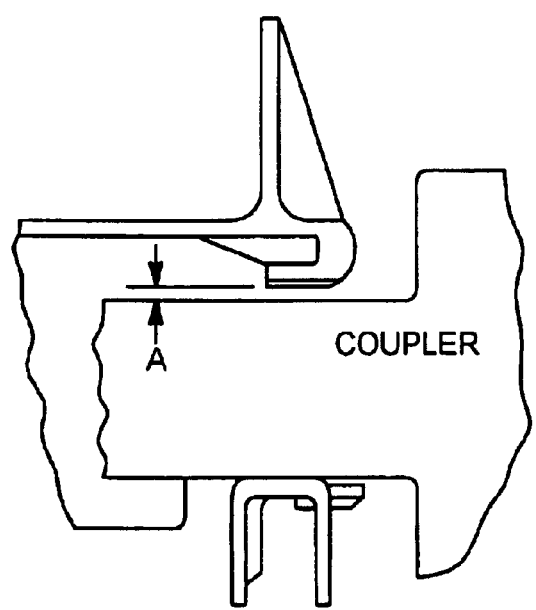
Figures 25F, 25G:
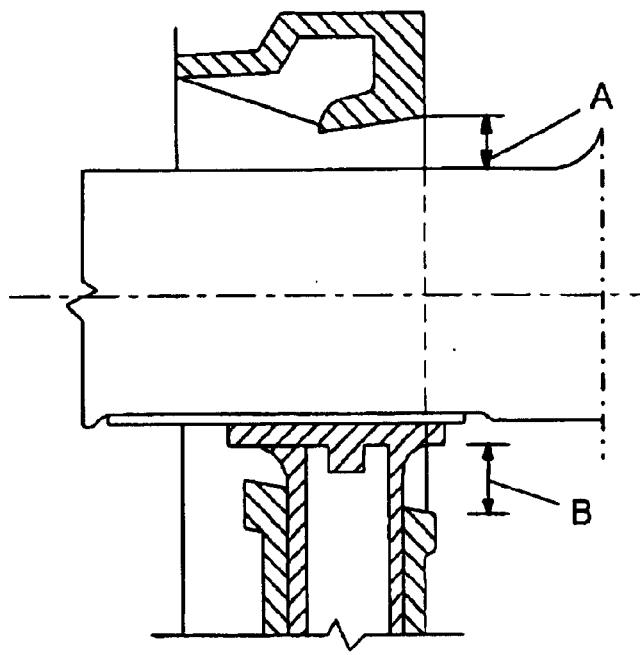

As shown in FIG. 25d, the guard arm distortion of an F-type coupler is tested with a gage 5100, such as a 36527-2A or 36527-3 gage. The gage must seat with the knuckle in the locked and pulled position. The minimum vertical clearances must also be checked. For an E-type coupler, as shown in FIG. 25e, the dimension "A" must be ⅞" or as near as practical thereto, but must not be below ½". For an F-type coupler, as shown in FIG. 25f, the dimensions "A" and "B" must fall within the values specified in the table of FIG. 25g.

Figure 25H:
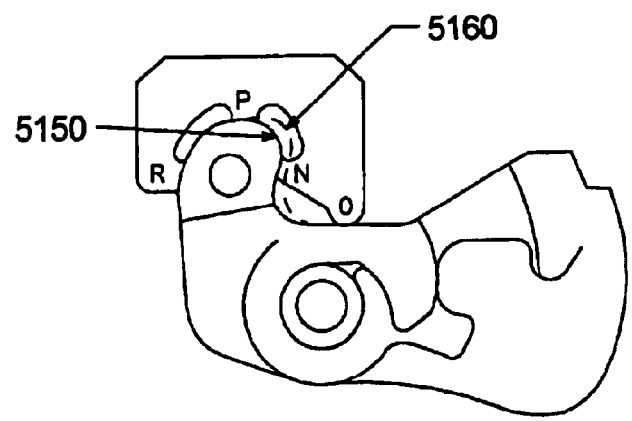
Figure 25:
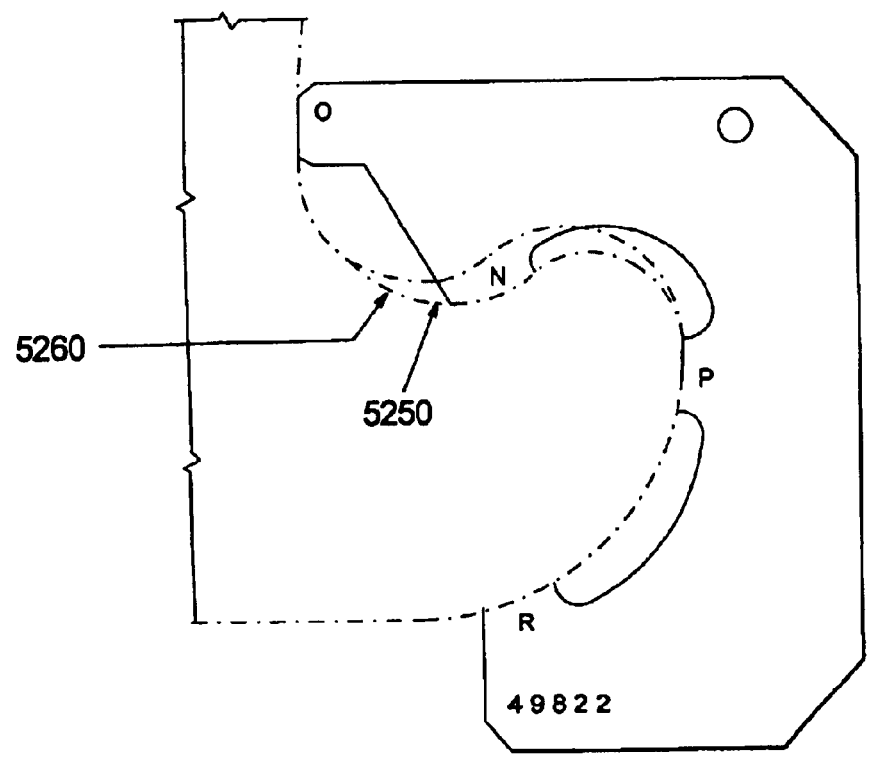

The knuckles must also be inspected, as shown in FIGS. 25h–25k. First, the knuckle must be visually inspected to determine that it is not an E50 type knuckle. Then, the contour of the nose of the knuckle is measured. Numeral 5150 of FIG. 25h depicts a worn knuckle, whereas dashed line 5160 depicts a new knuckle. For E-type couplers, when the wear exceeds the limits of gage no. 44057 when passed vertically over the nose as shown in FIG. 25h, the knuckle is not acceptable. In other words, when the point "N" can be passed vertically over one-half or more of nose length with points "O", "P", and "R" contacting the nose, the knuckle is condemned. For F-type couplers, numeral 5250 depicts a worn knuckle and dashed line 5260 depicts a new knuckle. For F-type couplers, when the wear exceeds the limits of gage no. 49822 when touching points "O", "P", and "R" and the gage can be passed vertically over one-half or more of the nose without touching point "N" as shown in FIG. 25i, the knuckle is not acceptable. Additionally, when the wear of the F-type coupler exceeds limits of gage no. 44250 (reference numeral 5300) when touching points A, B, and C passed vertically over the nose, as shown in FIG. 25j, the gage must touch or exceed ¼" at point D.

Yokes, shown in FIG. 25k, must be visually inspected for missing, bent, broken, or cracked portions through the web portion from the rear of the key slot, at one or both sides. The yoke strap is inspected for wear more than 25% of its cross-sectional area.

The bottom rotary lock lift lever or toggle for separate toggle and lock lifter or rotary assembly (single or double) are also inspected. These are not acceptable and must be scrapped, whether or not defective. The coupler draft key is also inspected for wear, the wear not to exceed 5/16" or more at any point. The draft key retainer must be visually inspected for non-approved coupler draft key retainers, which must be scrapped, and for "T" type retainers having an approved lock and a cotter key applied. Other miscellaneous coupler parts, such as the coupler carrier, are also inspected for worn out, bent, broken, cracked, or missing parts.

Draft gears are also inspected in accord with Rule 88.B.2 to determine if they are cracked, broken, or have split housings. The rear wall is inspected for bulging, which should not exceed 3/16". The follower should be visually inspected for broken or cracked parts, although small chips are not considered defects. The draft gears are also visually inspected for signs of obvious fire damage to the rubber or rubber friction draft gears, signs of stuck draft gears, and depressed friction elements movable by hand (except National NC-660 when not compressed). If the draft gears are found only to have broken or missing external retaining bolt or rod, it is not considered defective, but must be replaced when the draft gear is removed in conjunction with other work. When the draft gear is removed in conjunction with other work, defective or missing retaining bolts or rods should be replaced. The draft gears should also be visually inspected for broken shoes, none of which exist on the follower, are cause for renewal, however, draft gear removed for cause other than broken shoes should not be reinstalled if broken shoe is found.

Carriers are visually inspected for cracked, broken or worn portions more than ½" of the original thickness and followers are visually inspected for broken, bent ½" or more, or missing portions and are visually inspected for wear exceeding ⅛" at any location.

Uncoupling Levers are visually inspect for missing, broken, cracked or bent portions and are inspected for wear more than ½ of original thickness. The uncoupling lever is measured as follows, as shown in Figure. For E-Type couplers, the clearance between the uncoupling lever eye and the locklift lever when the coupler is centered in the carrier with the coupler knuckle fully closed and in the locked position must be between ¼" to ½". The measurement between the inside of the locklift lever handle and the locklift lever bracket must be between 3¾" and 4¼". For F-Type couplers, the clearance between the uncoupling lever eye and the rotor eye when the coupler is centered in the carrier with the coupler knuckle fully closed and in the locked position must be between ¼" to ½". The measurement between the inside of the locklift lever handle and the locklift lever bracket must be between 6½" and 7".

Additionally, the coupler height, as measured from the top of the rail to the vertical centerline of the coupler knuckle must be at least 32½" and less than 34½".

Figure 26A:
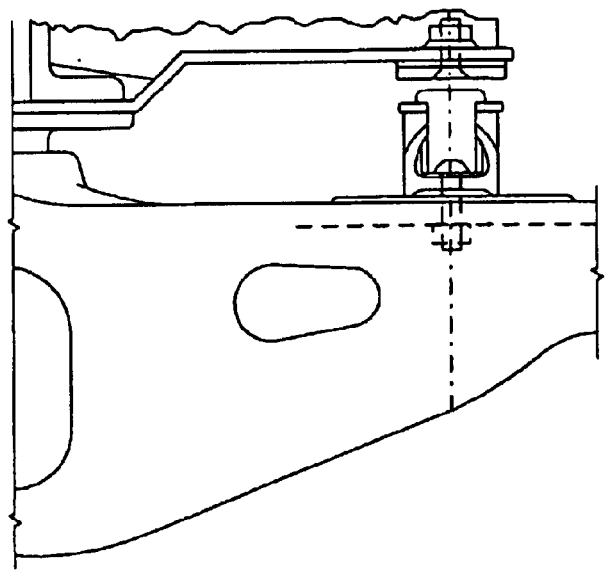
FIGS. 26a–b illustrate a body center plate and side bearing visual inspection method.
Figure 26B:
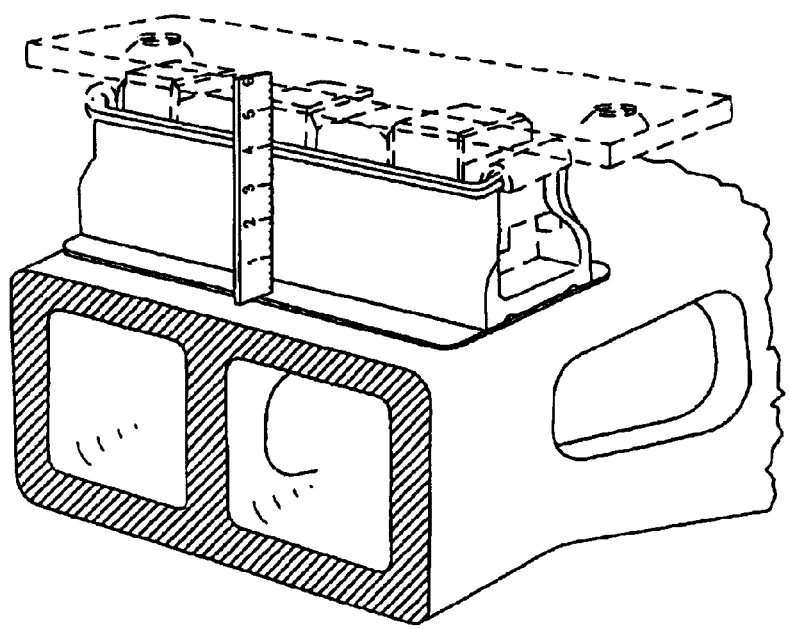

Further in accord with Rule 88.B.2, the body center plate and side bearings are inspected. For roller side bearings, illustrated in FIG. 26a, the side bearing clearance must be measured prior to removing the trucks from the car. A step gage or other suitable gage or instrument is used to measure the gap between the top of the roller and the side bearing. The gap should be between 3/16" and 5/16" as shown in FIG. 26a. It is acceptable to average two side bearings diagonally at each end of the car. For constant contact models, as shown in FIG. 26b, the trucks must first be removed and then the rockers removed from the side bearing cage. The height between the bottom of the roller cage and the side bearing is then measured and it should be between 5" and 5⅛", as shown in FIG. 26b. It is acceptable to average two side bearings diagonally at each end of the car. Following the above measurements,the trucks and rockers, as applicable, are replaced. The side bearings are visually inspected for cracked, broken, or missing portions and for worn or bent portions exceeding ⅛". The side bearings are checked to ensure they are the correct side bearing for the particular car and the side body bearing is inspected for wear to determine if the minimum thickness at the centerline of the fastener is below the minimum acceptable limit of ⅝" (or ⅜" for cars built prior to 1981 with flat bearings).

The body center plate is also inspected. Prior to removing the trucks, the clearance between the truck bolster rim and the body center plate is measured and must be at least 1/16".

Following removal of the trucks, the diameter of the bolster bowl and the diameter of the center plate is measured. The difference between these diameters should not exceed 1⅜". For the center plate, the wear limit is one inch less than the original diameter. In other words, 11" for an original 12" diameter center plate, 13" for a 14" diameter center plate, etc. For the bolster bowl having a nominal depth of 1⅛", replacement must be made when the bowl depth is greater than 1⁷⁄₁₆". Correspondingly, for nominal bolster bowl depths of 1⅓", replacement must be had if the bowl depth is greater than 2¹⁄₁₆" and for a 2" nominal bolster bowl depth, greater than 2⁵⁄₁₆".

In accord with the above detailed inspections, the results thereof may be compiled to permit tracking of the status of each of the vessels, tanks bogies and the like which are inspected, over a period of time and further enable a relatively accurate prediction as to the status of each unit of a fleet of units. Further, the inspection requirements in accord with the above invention offers a means for synchronization of the present varied inspection cycles required by the aforementioned regulations with a single comprehensive inspection at a set interval. This means for synchronization inheres in the ability to trend inspection results to provide assurance of tank car component integrity over longer inspection cycles. For example, stub sill inspections will be required on all stub sill designed tanks every five years, unless the car owner can demonstrate by DTA (Damage Tolerance Analysis) or other statistical performance data, that the design warrants a longer cycle. DTA has yet to demonstrate design capability beyond the 5-year minimum requirement. By rigorously inspecting the tank cars in accord with the invention, at an up-front cost in excess of the immediate benefit received, future costs can be reduced, such as costs associated with tank cars "coming off lease" while inactive.

Only several embodiment of the invention are shown to illustrate its versatility as shown and described in the present disclosure. It is to be understood that the methods and procedures provided herein are capable of implementation in other combinations and many variables changed or omitted while still remaining within the scope of the inventive concepts expressed herein. Moreover, although illustrative examples of the method of the present invention were discussed,the present invention is not limited by the examples provided herein and additional variations of the invention are embraced by the claims appended hereto.

What is claimed:

1. For a wheeled vehicle adapted to transport commodities, an inspection and requalification method comprising:
    selecting for inspection one of a regulated tank car and a non-regulated tank car;
    selecting from an instruction set comprising inspection sites covered by 49 C.F.R. §180.509, Stub Sill Inspection Program, and Rule 88.B.2, a comprehensive list of sites to be inspected for the selected regulated tank car or non-regulated tank car;
    inspecting each of the listed sites in accord with the instructions set forth for each of the listed sites in the instruction set; and
    recording data derived from implementation of the inspections conducted at each of said listed sites,
    wherein said comprehensive list of sites to be inspected comprises a plurality of inspection sites selected from at least two of 49 C.F.R. §180.509, Stub Sill Inspection Program, and Rule 88.B.2,
    wherein said comprehensive list of sites to be inspected is selected so as to align inspections for said at least two of 49 C.F.R. §180.509, Stub Sill Inspection Program, and Rule 88.B.2,
    wherein the inspecting step comprises:
        an enhanced visual inspection of all fillet welds greater than ¼" within 4 feet of a bottom longitudinal centerline of the tank car; and
        a visual structural integrity inspection of at least the following sites as applicable to an inspected tank car:
            at least one pad-to-tank weld,
            at least one sill-to-pad weld,
            at least one bolster-to-bolster weld,
            at least one BOV saddle weld,
            at least one sump weld,
            at least one BOV skid weld,
            at least one attachment weld, and
            at least one draft pocket weld,
    wherein inspecting the at least one draft pocket weld comprises:
        inspecting front and rear draft stops and gusset welds for both jacketed and non-jacketed tank cars;
        inspecting, for non-jacketed cars with sill reinforcement pads, at least one of longitudinal sill to reinforcement pad welds between draft lugs, transverse sill to reinforcement pad welds, longitudinal sill to reinforcement pad slot welds, and longitudinal sill to reinforcement pad welds above rear draft lug assemblies;
        inspecting, for jacketed cars with sill reinforcement pads, at least one of longitudinal to draft sill/reinforcement pad welds outside of a sill along a full length of a body bolster attachment, transverse draft sill/reinforcement pad outboard welds, longitudinal reinforcement pad to tank sill welds along a full length of a body bolster attachment, and transverse reinforcement pad to tank shell heat welds;
        inspecting, for non-jacketed cars without sill reinforcement pads, at least one of a top center 'CZ' angle butt weld, longitudinal draft sill to tank shell welds between the draft lugs, inside transverse draft sill to tank hell welds, longitudinal draft sill to tank shell slot welds, transverse draft sill to tank shell slot welds, and longitudinal draft sill to tank shell welds from rear lugs inboard toward center fillers, and
        inspecting for jacketed cars without sill reinforcement pads, at least one of longitudinal draft sill to tank shell welds along a full length back to body bolster attachments and transverse draft sill to tank shell welds,
    wherein for a jacketed tank car having a fiberglass or fiber faux insulation system said inspecting step further comprises:
        creating a plurality of cutout areas in the tank car jacket in areas corresponding to welds to be inspected;
        removing all insulation material from the cutout areas;
        pushing the insulation away from the entire area of the welds to be inspected; and
        inspecting welds using a flexible boroscope.

2. For a wheeled vehicle adapted to transport commodities, an inspection and requalification method in accord with claim 1, wherein the inspecting step includes a visual inspection of the tank shell interior and exterior; piping, valves, fittings and gaskets; brake rigging, safety appliances, draft system, valves and fittings; closures and protective housings on the tank car; and all required markings on the tank car.

3. For a wheeled vehicle adapted to transport commodities, an inspection and requalification method in accord with claim 2, wherein the inspecting step includes:
   determining whether the tank car has interior heater coils, and
   performing a hydrostatic coil test on interior heater coils.

4. For a wheeled vehicle adapted to transport commodities, an inspection and requalification method in accord with claim 3, wherein the inspecting step includes ultrasonic flaw detection on all circumferential butt welds of the tank shell at least within two feet of a bottom longitudinal centerline of the tank car.

5. For a wheeled vehicle adapted to transport commodities, an inspection and requalification method in accord with claim 4, wherein the inspecting step includes ultrasonic thickness examination of at least one of the tank shell, heads, sumps, manways, and nozzles for each of at least one compartment.

6. For a wheeled vehicle adapted to transport commodities, an inspection and requalification method in accord with claim 5, wherein the inspecting step includes visual inspection of at least one of the thermal protection systems, tank head puncture resistance systems, coupler vertical restraint systems, and systems used to protect discontinuities to ensure integrity.

7. For a wheeled vehicle adapted to transport commodities, an inspection and requalification method in accord with claim 6, wherein the inspecting step includes;
   removing the pressure relief device from the tank car and visually inspecting for damage, and,
   includes testing the pressure relief device with air to ensure conformance with start-to-discharge pressure requirements.

8. For a wheeled vehicle adapted to transport commodities, an inspection and requalification method in accord with claim 7, wherein the inspecting step includes:
   determining whether the tank car has a lining for the protection of the tank shell, and
   inspecting the lining.

9. For a wheeled vehicle adapted to transport commodities, an inspection and requalification method in accord with claim 8, wherein the inspecting step includes performing a leakage pressure test on at least one compartment of a tank and all fittings and openings corresponding to said at least one compartment.

10. For a wheeled vehicle adapted to transport commodities, an inspection and requalification method in accord with claim 1, wherein for a jacketed tank car having a fiberglass or fiber frax insulation system, said inspecting step further comprises:
   recording weld defects,
   repairing weld defects,
   replacing removed insulation with new insulation comprising at least one of fiber frax and fiberglass, and
   welding a patch over areas of the jacket which were removed in said creating step.

* * * * *